United States Patent
Takehara et al.

(10) Patent No.: US 10,009,624 B2
(45) Date of Patent: Jun. 26, 2018

(54) PICTURE ENCODING DEVICE, PICTURE ENCODING METHOD, PICTURE ENCODING PROGRAM, PICTURE DECODING DEVICE, PICTURE DECODING METHOD, AND PICTURE DECODING PROGRAM

(71) Applicant: JVC KENWOOD Corporation, Yokohama-shi (JP)

(72) Inventors: Hideki Takehara, Yokosuka (JP); Hiroya Nakamura, Yokohama (JP); Shigeru Fukushima, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days. days.

(21) Appl. No.: 15/843,054

(22) Filed: Dec. 15, 2017

(65) Prior Publication Data

US 2018/0109805 A1    Apr. 19, 2018

Related U.S. Application Data

(63) Continuation of application No. 15/422,694, filed on Feb. 2, 2017, now Pat. No. 9,854,266, which is a
(Continued)

(51) Int. Cl.
*H04N 11/02* (2006.01)
*H04N 19/513* (2014.01)
(Continued)

(52) U.S. Cl.
CPC ......... *H04N 19/521* (2014.11); *H04N 19/105* (2014.11); *H04N 19/46* (2014.11); *H04N 19/172* (2014.11); *H04N 19/176* (2014.11)

(58) Field of Classification Search
CPC .................................................. H04N 19/521
(Continued)

(56) References Cited

U.S. PATENT DOCUMENTS 8,989,271 B2 * 3/2015 Sugio ................... H04N 19/521
375/240.12
9,516,314 B2  12/2016 Takehara et al.
(Continued)

FOREIGN PATENT DOCUMENTS

CN     101018329 A     8/2007
JP     10-276439 A    10/1998
(Continued)

OTHER PUBLICATIONS

Jian-Liang Lin et al, "Improved Advanced Motion Vector Prediction", Joint Collaborative Team on Video Coding (JCT-VC) of ITU-T SG16 WP3 and ISO/IEC JTC1/SC29/WG11, JCTVC-D125_r2, 4th Meeting: Daegu, Korea, Jan. 2011, pp. 1-8. [Cited in parent].

(Continued)

*Primary Examiner* — Leron Beck
(74) *Attorney, Agent, or Firm* — Brundidge & Stanger, P.C.

(57) ABSTRACT

A candidate list construction unit selects a plurality of blocks each having one or two pieces of motion information containing at least information about a motion vector and information about a reference picture from a plurality of neighboring encoded blocks of an encoding target block and constructs a candidate list containing candidates of the motion information used for the motion compensation prediction from the motion information of the selected blocks. A selected candidate generator generates a new candidate of the motion information by combining the motion information of a first prediction list derived by the first motion information deriving unit and the motion information of the second prediction list derived by a second motion information deriving unit.

6 Claims, 67 Drawing Sheets

Related U.S. Application Data continuation of application No. 15/339,242, filed on Oct. 31, 2016, now Pat. No. 9,686,564, which is a continuation of application No. 14/109,629, filed on Dec. 17, 2013, now Pat. No. 9,516,314, which is a continuation of application No. PCT/JP2012/004148, filed on Jun. 27, 2012.

(51) Int. Cl.
| | | |
|---|---|---|
| *H04N 19/46* | (2014.01) | |
| *H04N 19/105* | (2014.01) | |
| *H04N 19/172* | (2014.01) | |
| *H04N 19/176* | (2014.01) | |

(58) Field of Classification Search
USPC .................................... 375/240.01–240.29
See application file for complete search history.

(56) References Cited

U.S. PATENT DOCUMENTS

| | | | |
|---|---|---|---|
| 9,686,564 | B2 | 6/2017 | Takehara et al. |
| 2012/0263235 | A1 | 10/2012 | Sugio et al. |
| 2012/0307902 | A1* | 12/2012 | Sugio ............ H04N 19/513 375/240.16 |
| 2012/0320984 | A1* | 12/2012 | Zhou ............ H04N 19/50 375/240.16 |
| 2012/0328021 | A1* | 12/2012 | Sugio ............ H04N 19/56 375/240.16 |
| 2014/0105302 | A1 | 4/2014 | Takahara et al. |
| 2017/0048549 | A1 | 2/2017 | Takehara et al. |
| 2017/0150173 | A1 | 5/2017 | Takehara et al. |

FOREIGN PATENT DOCUMENTS

| | | |
|---|---|---|
| JP | 2013-509745 A | 2/2012 |
| KR | 20090086610 A | 8/2009 |
| WO | 2012/140821 A1 | 10/2012 |

OTHER PUBLICATIONS

J. Jung et al., "Temporary MV Predictor modification for MV-Comp, Skip, Direct and Merge schemes,", Joint Collaborative Team on Video Coding (JCT-VC) of ITU-T SG16 WP3 and ISO/IEC JTC1/SC29/WG11, JCTVC-D164, 4th Meeting: Daegu, Korea, Jan. 2011, pp. 1-5. [cited in parent].

Yungei Zheng et al., "Extended Motion Vector Prediciton for Bi predictive Mode," Joint Collaborative Team on Video Coding (JCT-VC) of ITU-T SG16 WP3 and ISO/IEC JTC1/SC29/WG11, JCTVC-E343, 5th Meeting: Geneva, Switzerland, Mar. 2011, pp. 1-4.[cited in parent].

Hideki Takehara et al, "Bi-derivative merge candidate," Joint Collaborative Team on Video Coding (JCT-VC) of ITU-TSG16 WP3 and ISO/IEC JTC1/SC29/WG11, JCTVC-F372, 6th Meeting: Torino, Italy, Jul. 2011, pp. 1-5. [cited in parent].

International Search Report and Written Opinion in PCT International Application No. PCT/JP2012/004148, dated Sep. 18, 2012. [cited in parent].

Notification of Reasons for Refusal in Japanese Patent Application No. 2012-143341, dated Aug. 12, 2014. [cited in parent].

Notification of Reasons for Refusal in Japanese Patent Application No. 2012-143340, dated May 12, 2015, [cited in parent].

Notification of Reasons for Refusal in Korean Patent Application No. 10-2014-7002407, dated May 15, 2015 [Cited in parent].

* cited by examiner

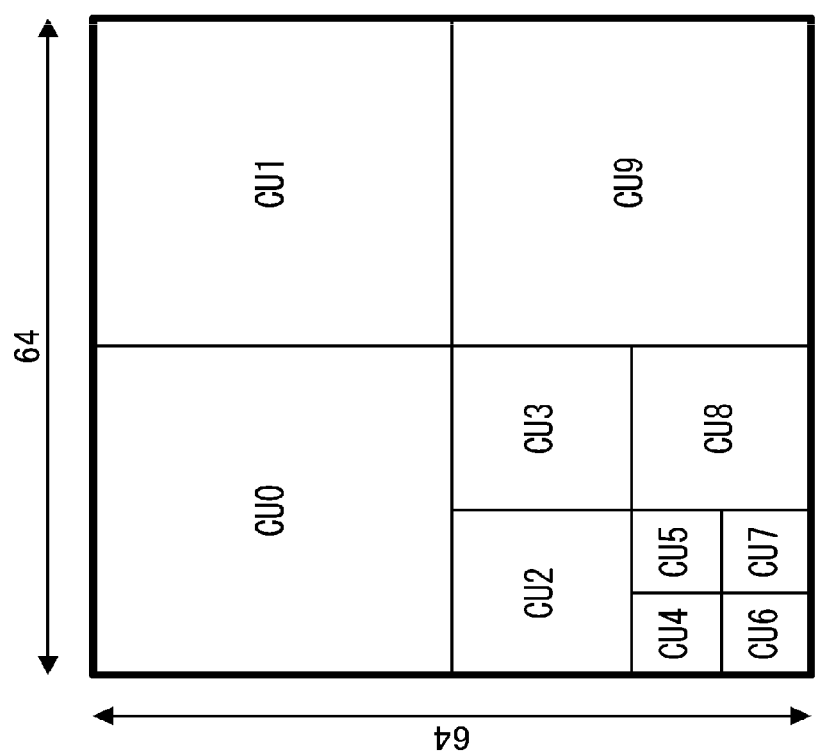

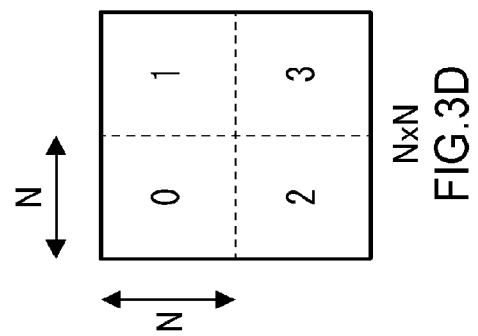
FIG.3D NxN
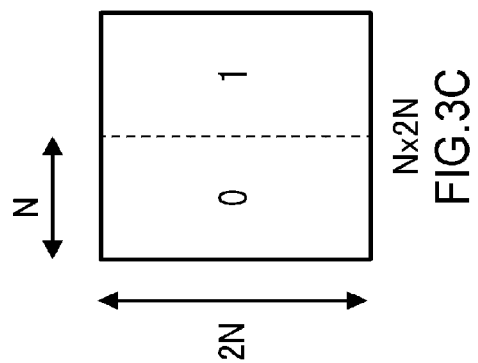
FIG.3C Nx2N
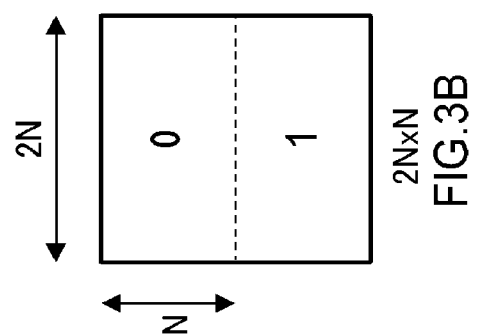
FIG.3B 2NxN
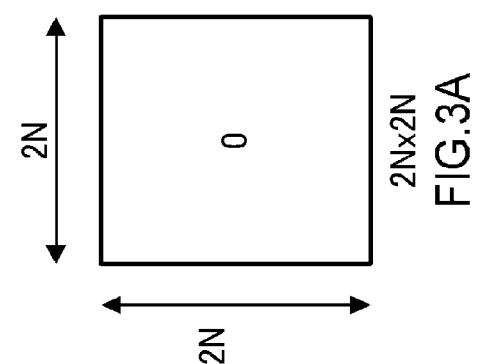
FIG.3A 2Nx2N

FIG.4

| NUMBER OF CU PARTITIONS | PREDICTION BLOCK SIZE | | | |
|---|---|---|---|---|
| 0 | 64x64 | 64x32 | 32x64 | - |
| 1 | 32x32 | 32x16 | 16x32 | - |
| 2 | 16x16 | 16x8 | 8x16 | - |
| 3 | 8x8 | 8x4 | 4x8 | 4x4 |

FIG.5

| PREDIC-TION CODING MODE | MOTION COMPENSATION PREDICTION DIRECTION | NUMBER OF CODING VECTORS | NUMBER OF REFERENCE PICTURE INDEXES | NUMBER OF VECTOR PREDICTOR INDEXES | NUMBER OF MERGE INDEXES |
|---|---|---|---|---|---|
| UniPred | UNIDIRECTIONAL | 1 | 1 | 1 | 0 |
| BiPred | BIDIRECTIONAL | 2 | 2 | 2 | 0 |
| MERGE | UNIDIRECTIONAL/ BIDIRECTIONAL | 0 | 0 | 0 | 1 |
| Intra | — | 0 | 0 | 0 | 0 |

UNIDIRECTIONAL 1

UNIDIRECTIONAL 2

BIDIRECTIONAL 1

BIDIRECTIONAL 2

FIG.7

```
PU()
{
   ...
   {
      merge_flag
      if (merge_flag) {
         if (NumMergeCand() > 1)
            merge_idx
      } else {
         if (slice_type == B)
            inter_pred_type
         if (inter_pred_type != Pred_L1) {
            if (num_ref_idx_l0_active_minus1 > 0)
               ref_idx_l0
            mvd_l0[0]
            mvd_l0[1]
            if (NumMVPCand(L0) > 1)
               mvp_idx_l0
         }
         if (inter_pred_type != Pred_L0) {
            if (num_ref_idx_l1_active_minus1 > 0)
               ref_idx_l1
            mvd_l1[0]
            mvd_l1[1]
            if (NumMVPCand(L1) > 1)
               mvp_idx_l1
         }
      }
   }
}
```

FIG.8A

| merge_idx | BIT ASSIGNMENT |
|---|---|
| 0 | 0 |
| 1 | 1 |

BITSTREAM WHEN THE NUMBER OF CANDIDATES IS 2

FIG.8B

| merge_idx | BIT ASSIGNMENT |
|---|---|
| 0 | 0 |
| 1 | 10 |
| 2 | 11 |

BITSTREAM WHEN THE NUMBER OF CANDIDATES IS 3

FIG.8C

| merge_idx | BIT ASSIGNMENT |
|---|---|
| 0 | 0 |
| 1 | 10 |
| 2 | 110 |
| 3 | 111 |

BITSTREAM WHEN THE NUMBER OF CANDIDATES IS 4

FIG.14

| | | | | | | | |
|---|---|---|---|---|---|---|---|
| | D | $B_4$ | $B_3$ | $B_2$ | $B_1$ | C | |
| | $A_4$ | $I_1$ | $I_2$ | $I_3$ | $I_4$ | $F_4$ | |
| | $A_3$ | $I_5$ | $I_6$ | $I_7$ | $I_8$ | $F_3$ | |
| | $A_2$ | $I_9$ | $I_{10}$ | $I_{11}$ | $I_{12}$ | $F_2$ | |
| | $A_1$ | $I_{13}$ | $I_{14}$ | $I_{15}$ | $I_{15}$ | $F_1$ | |
| | E | $G_4$ | $G_3$ | $G_2$ | $G_1$ | H | |
| | | | | | | | |

BLOCKS ON ColPic IN THE SAME
POSITIONS AS BLOCKS TO BE PROCESSED

FIG.18

| MERGE CANDIDATE NUMBER | COMBINED MOTION INFORMATION CANDIDATE |
|---|---|
| 0 | A |
| 1 | B |
| 2 | COL |
| 3 | C |
| 4 | E |
| 5 | BD0 |
| 6 | BD1 |

FIG.19A

| MERGE CANDIDATE NUMBER | VALIDITY | MERGE INDEX |
|---|---|---|
| 0 | VALID | 0 |
| 1 | VALID | 1 |
| 2 | VALID | 2 |
| 3 | VALID | 3 |
| 4 | VALID | 4 |
| 5 | VALID | 5 |
| 6 | VALID | 6 |

ALL VALID

FIG.19B

| MERGE CANDIDATE NUMBER | VALIDITY | MERGE INDEX |
|---|---|---|
| 0 | VALID | 0 |
| 1 | VALID | — |
| 2 | VALID | 1 |
| 3 | VALID | 2 |
| 4 | VALID | — |
| 5 | VALID | 3 |
| 6 | VALID | 4 |

PARTIALLY INVALID

FIG.30

| | LX DIRECTION VALID | INVALID |
|---|---|---|
| LY DIRECTION VALID | BI | LY |
| INVALID | LX | INVALID |

FIG.31A

| LY DIRECTION \ LX DIRECTION | VALID | INVALID |
|---|---|---|
| VALID | BI | INVALID |
| INVALID | INVALID | INVALID |

FIG.31B

| LY DIRECTION \ LX DIRECTION | VALID | INVALID |
|---|---|---|
| VALID | BI | BI <br> < mvLX=(0,0),ref_idxLX=0 > |
| INVALID | BI <br> < mvLY=(0,0),ref_idxLY=0 > | BI <br> < mvLX=(0,0),ref_idxLX=0 > <br> < mvLY=(0,0),ref_idxLY=0 > |

FIG.31C

| LY DIRECTION \ LX DIRECTION | VALID | INVALID |
|---|---|---|
| INVALID | BI | BI <br> < mvLX=−mvLY,ref_idx=0 > |
| INVALID | BI <br> < mvLY=−mvLX,ref_idx=0 > | INVALID |

| MERGE CANDIDATE NUMBER | COMBINED MOTION INFORMATION CANDIDATE |
|---|---|
| 0 | A |
| 1 | B |
| 2 | COL |
| 3 | BD0 |
| 4 | BD1 |
| 5 | C |
| 6 | E |

FIG.40A

| MERGE CANDIDATE NUMBER | COMBINED MOTION INFORMATION CANDIDATE |
|---|---|
| 0 | A |
| 1 | B |
| 2 | COL |
| 3 | BD0 |
| 4 | C |

| MERGE CANDIDATE NUMBER | COMBINED MOTION INFORMATION CANDIDATE |
|---|---|
| 0 | A |
| 1 | B |
| 2 | COL |
| 3 | BD0 |
| 4 | BD1 |
| 5 | C |
| 6 | E |
| 7 | BD2 |
| 8 | BD3 |

FIG.47

| | REFERENCE DIRECTION = L0 | | REFERENCE DIRECTION = L1 | |
|---|---|---|---|---|
| | REFERENCE DIRECTION INSPECTION ORDER | REVERSE DIRECTION INSPECTION ORDER | REFERENCE DIRECTION INSPECTION ORDER | REVERSE DIRECTION INSPECTION ORDER |
| (a) | A/B/COL/C/E | A/B/COL/C/E | A/B/COL/C/E | A/B/COL/C/E |
| (b) | A/B/COL/C/E | A/B/COL/C/E | COL/B/A/C/E | COL/B/A/C/E |

FIG.48

```
dir = BI, mvL0X = (2,2), refIdxL0 = 2
       mvL1X = (-2,2), refIdxL1 = 0
```

| Cands | dir | mvL0<br>mvL1 | refIdxL0<br>refIdxL1 |
|---|---|---|---|
| A | × | × | × |
| B | UNI | (2,2)<br>– | 2<br>– |
| COL | UNI | (-2,2)<br>– | 0<br>– |
| C | × | × | × |
| E | × | × | × |
| BD0 | BI | (2,2)<br>(-2,2) | 2<br>0 |
| BD1 | × | × | × |

FIG.49A

|  | dir | mv | refIdx |
|---|---|---|---|
| BD0 | BI | mvL0A<br>mvL1B | refL0A<br>refL1B |
| BD1 | BI | mvL1A<br>mvL0B | refL1A<br>refL0B |

FIG.49B

|  | dir | mv | refIdx |
|---|---|---|---|
| BD0 | UNI | mvL0A | refL0A |
| BD1 | UNI | mvL1A | refL1A |

FIG.50 dir = BI, mvL0X = (2,8), refIdxL0 = 0
mvL1X = (4,2), refIdxL1 = 0

| Cands | dir | mvL0<br>mvL1 | refIdxL0<br>refIdxL1 |
|---|---|---|---|
| A | BI | (2,8)<br>(-2,-2) | 0<br>0 |
| B | BI | (2,2)<br>(4,2) | 0<br>0 |
| COL | × | × | × |
| C | BI | (4,3)<br>(-2,-2) | 1<br>0 |
| E | × | × | × |
| BD0 | BI | (2,8)<br>(4,2) | 0<br>0 |
| BD1 | BI | (2,2)<br>(-2,-2) | 0<br>0 |

FIG.51 dir=UNI, mvL0X = (0,8), refIdxL1 = 2

| Cands | dir | mvL0<br>mvL1 | refIdxL0<br>refIdxL1 |
|---|---|---|---|
| A | BI | (0,8)<br>(2,2) | 2<br>1 |
| B | × | × | × |
| COL | × | × | × |
| C | × | × | × |
| E | UNI | (−2,2)<br>− | 0<br>− |
| BD0 | UNI | (0,8)<br>− | 2<br>− |
| BD1 | BI | (−2,2)<br>(2,2) | 0<br>1 |

FIG.52 dir = BI, mvL0X = (2,2), refIdxL0 = 0
mvL1X = (−2,2), refIdxL1 = 0

| Cands | dir | mvL0<br>mvL1 | refIdxL0<br>refIdxL1 |
|---|---|---|---|
| A | × | × | × |
| B | UNI | (2,2)<br>— | 0<br>— |
| COL | × | × | × |
| C | × | × | × |
| E | UNI | (−2,2)<br>— | 0<br>— |
| BD0 | BI | (2,2)<br>(−2,2) | 0<br>0 |
| BD1 | × | × | × |

FIG.53A

```
    Sequence_header()
{
  ...
  modified_merge_index_flag
  if( modified_merge_index_flag ) {
    max_no_of_merge_index_minus1
    for( i=0; i<=max_no_of_merge_index_minus1; i++) {
      merge_mode[i];
      if( MergeType( merge_mode[i] ) == BD_MERGE ) {
        bd_merge_base_direction;
      }
    }
  }
  ...
}
```

FIG.53B

```
   Slice_header()
{
  ...
  modified_merge_index_flag
  if( modified_merge_index_flag ) {
    max_no_of_merge_index_minus1
    for( i=0; i<=max_no_of_merge_index_minus1; i++) {
      merge_mode[i];
      if( MergeType( merge_mode[i] ) == BD_MERGE ) {
        bd_merge_base_direction;
      }
    }
  }
  ...
}
```

FIG.54

| MERGE CANDIDATE NUMBER | COMBINED MOTION INFORMATION CANDIDATE |
|---|---|
| 0 | A |
| 1 | B |
| 2 | COL |
| 3 | C |
| 4 | E |

FIG.58A

| MERGE CANDIDATE NUMBER | COMBINED MOTION INFORMATION CANDIDATE | | |
|---|---|---|---|
| | BEFORE CHANGE | VALIDITY | AFTER CHANGE |
| 0 | A | VALID | A |
| 1 | B | INVALID | BD0 |
| 2 | COL | VALID | COL |
| 3 | C | VALID | C |
| 4 | E | VALID | E |

FIG.58B

| MERGE CANDIDATE NUMBER | COMBINED MOTION INFORMATION CANDIDATE | | |
|---|---|---|---|
| | BEFORE CHANGE | VALIDITY | AFTER CHANGE |
| 0 | A | VALID | A |
| 1 | B | VALID | B |
| 2 | COL | INVALID | BD0 |
| 3 | C | VALID | C |
| 4 | E | INVALID | BD1 |

FIG.58C

| MERGE CANDIDATE NUMBER | COMBINED MOTION INFORMATION CANDIDATE | | |
|---|---|---|---|
| | BEFORE CHANGE | VALIDITY | AFTER CHANGE |
| 0 | A | VALID | A |
| 1 | B | VALID | B |
| 2 | COL | INVALID | BD1 |
| 3 | C | VALID | C |
| 4 | E | INVALID | - |

FIG.60A

| MERGE CANDIDATE NUMBER | COMBINED MOTION INFORMATION CANDIDATE | | |
|---|---|---|---|
| | BEFORE CHANGE | VALIDITY | AFTER CHANGE |
| 0 | A | VALID | A |
| 1 | B | INVALID | COL |
| 2 | COL | VALID | C |
| 3 | C | VALID | E |
| 4 | E | VALID | BD0 |

FIG.60B

| MERGE CANDIDATE NUMBER | COMBINED MOTION INFORMATION CANDIDATE | | |
|---|---|---|---|
| | BEFORE CHANGE | VALIDITY | AFTER CHANGE |
| 0 | A | VALID | A |
| 1 | B | VALID | B |
| 2 | COL | INVALID | C |
| 3 | C | VALID | BD0 |
| 4 | E | INVALID | BD1 |

FIG.65

| MERGE CANDIDATE NUMBER | COMBINED MOTION INFORMATION CANDIDATE |
|---|---|
| 0 | A |
| 1 | B |
| 2 | COL |
| 3 | C |
| 4 | E |
| 5 | BD |

PICTURE ENCODING DEVICE, PICTURE ENCODING METHOD, PICTURE ENCODING PROGRAM, PICTURE DECODING DEVICE, PICTURE DECODING METHOD, AND PICTURE DECODING PROGRAM

CROSS REFERENCE TO RELATED APPLICATIONS

This application is a Continuation of U.S. patent application Ser. No. 15/422,694, filed Feb. 2, 2017; which is a Continuation of U.S. patent application Ser. No. 15/339,242, filed Oct. 31, 2016, now U.S. Pat. No. 9,686,564; which is a Continuation of U.S. patent application Ser. No. 14/109,629, filed Dec. 17, 2013, now U.S. Pat. No. 9,516,314; which is a Continuation of PCT International Application No. PCT/JP2012/004148, filed Jun. 27, 2012, which claims the benefit of Japanese Patent Application Nos. 2011-146065 and 2011-146066, filed Jun. 30, 2011, and 2012-143340 and 2012-143341, filed Jun. 26, 2012.

BACKGROUND OF THE INVENTION

Field of the Invention

The present invention relates to a moving picture encoding technology using a motion compensation prediction, and in particular, relates to a picture encoding device, a picture encoding method, a picture encoding program, a picture decoding device, a picture decoding method, and a picture decoding program that encode or decode motion information used for a motion compensation prediction.

The motion compensation prediction is used in general moving picture compression encoding. The motion compensation prediction is a technology that partitions a target picture into fine blocks and uses a decoded picture as a reference picture to generate a signal in a position moved from a target block of the target picture to a reference block of the reference picture as a prediction signal based on the amount of motion represented by a motion vector. The motion compensation prediction uses one motion vector to make a unidirectional prediction or uses two motion vectors to make a bidirectional prediction.

Regarding the motion vector, the compression efficiency is improved by selecting the motion vector of a neighboring encoded block of the processing target block as a motion vector predictor (also simply called a vector predictor), determining a difference between the motion vector of the processing target block and the vector predictor, and transmitting the vector difference as a coding vector.

In MPEG-4AVC, the efficiency of the motion compensation prediction is improved by making the block size of the motion compensation prediction finer and more diverse than in MPEG-2. On the other hand, the number of motion vectors increases with a finer block size, posing a problem of the code amount of coding vectors.

Thus, while the motion vector of the left neighboring block is simply selected as the vector predictor in MPEG-2, the precision of the vector predictor is improved and an increase of the code amount of coding vectors is inhibited in MPEG-4AVC by selecting a median of motion vectors of a plurality of neighboring blocks as the vector predictor. Further in MPEG-4AVC, a direct motion compensation prediction is known. The direct motion compensation prediction realizes a motion compensation prediction by generating a new motion vector by scaling the motion vector of the block located in the same position as the processing target block of another encoded picture based on distances between the target picture and two reference pictures without transmitting any coding vector.

Also, a motion compensation prediction that realizes a motion compensation prediction by using motion information of neighboring blocks of the processing target block without transmitting any coding vector is known (see, for example, Japanese Patent Application Laid-Open Publication No. 10-276439).

CITATION LIST

Patent Literature

Patent Literature 1: Japanese Patent Application Laid-Open Publication No. 10-276439

As described above, the direct motion compensation prediction that transmits no coding vector focuses on continuity of motion between the processing target block and the block located in the same position as the processing target block of another encoded picture. In addition, Japanese Patent Application Laid-Open Publication No. 10-276439 focuses on continuity of motion between the processing target block and a neighboring block of the processing target block. Accordingly, the encoding efficiency is improved by not encoding motion information containing a vector difference by using motion information of other blocks.

According to the conventional motion compensation prediction, however, if the motion of the processing target block is shifted from the motion of a neighboring block of the processing target block or the motion of a block located in the periphery of the same position as of the processing target block of another encoded picture, information containing a vector difference needs to be encoded, posing a difficult aspect that the improvement of encoding efficiency is not sufficiently achieved.

The present invention is made in view of such circumstances and an object thereof is to provide a technology that further improves the encoding efficiency of motion information containing a motion vector.

SUMMARY OF THE INVENTION

To solve the above task, a picture encoding device according to an aspect of the present invention is a picture encoding device with a motion compensation prediction including a candidate list construction unit configured to select a plurality of blocks each having one or two pieces of motion information containing at least information about a motion vector and information about a reference picture from a plurality of neighboring encoded blocks of an encoding target block and to construct a candidate list containing candidates of the motion information used for the motion compensation prediction from the motion information of the selected blocks, a first motion information deriving unit configured to derive the motion information of a first prediction list from a first candidate contained in the candidates, a second motion information deriving unit configured to derive the motion information of a second prediction list from a second candidate contained in the candidates, and a selected candidate generator configured to generate a new candidate of the motion information by combining the motion information of the first prediction list derived by the first motion information deriving unit and the motion information of the second prediction list derived by the second motion information deriving unit.

When a number of the candidates does not reach a set maximum number, the candidate list construction unit may construct a candidate list including a new candidate generated by the selected candidate generator.

The candidate list construction unit may construct the candidate list including at least the one candidate generated by the selected candidate generator such that the number of the candidates does not exceed the maximum number.

A bitstream generator configured to encode candidate identification information to identify the candidate of the motion information used for the motion compensation prediction in the candidate list may further be included.

The candidate list construction unit may assign the candidate identification information larger than that of the candidates to the new candidate generated by the selected candidate generator.

The first prediction list and the second prediction list may be different prediction lists.

The candidate list construction unit may include the motion information derived from the motion information of the block of a picture temporally different from the picture including the encoding target block in the candidate list.

The first motion information deriving unit may search for the candidates according to a first priority order for the candidate that becomes valid to set the candidate as the first candidate. The second motion information deriving unit may search for the candidates according to a second priority order for the candidate that becomes valid to set the candidate as the second candidate.

The first motion information deriving unit may set a preset candidate among the candidates as the first candidate. The second motion information deriving unit may set another preset candidate among the candidates as the second candidate.

When both of the motion information of the first prediction list and the motion information of the second prediction list derived by the first motion information deriving unit and the second motion information deriving unit respectively are valid, the selected candidate generator may generate the new candidate.

The new candidate may hold two pieces of the motion information. The new candidate may hold one piece of the motion information.

Another aspect of the present invention is a picture encoding method. The method is a picture encoding method with a motion compensation prediction including selecting a plurality of blocks each having one or two pieces of motion information containing at least information about a motion vector and information about a reference picture from a plurality of neighboring encoded blocks of an encoding target block and constructing a candidate list containing candidates of the motion information used for the motion compensation prediction from the motion information of the selected blocks, deriving the motion information of a first prediction list from a first candidate contained in the candidate list, deriving the motion information of a second prediction list from a second candidate contained in the candidate list, and generating a new candidate of the motion information by combining the motion information of the first prediction list and the motion information of the second prediction list.

A picture decoding device according to an aspect of the present invention is a picture decoding device with a motion compensation prediction including a candidate list construction unit configured to select a plurality of blocks each having one or two pieces of motion information containing at least information about a motion vector and information about a reference picture from a plurality of neighboring decoded blocks of a decoding target block and to construct a candidate list containing candidates of the motion information used for the motion compensation prediction from the motion information of the selected blocks, a first motion information deriving unit configured to derive the motion information of a first prediction list from a first candidate contained in the candidates, a second motion information deriving unit configured to derive the motion information of a second prediction list from a second candidate contained in the candidates, and a selected candidate generator configured to generate a new candidate of the motion information by combining the motion information of the first prediction list derived by the first motion information deriving unit and the motion information of the second prediction list derived by the second motion information deriving unit.

If a number of the candidates does not reach a set maximum number, the candidate list construction unit may construct a candidate list including a new candidate generated by the selected candidate generator.

The candidate list construction unit may construct the candidate list including at least the one candidate generated by the selected candidate generator such that the number of the candidates does not exceed the maximum number.

A bitstream analysis unit configured to decode candidate identification information to identify the candidate of the motion information used for the motion compensation prediction in the candidate list and a selection unit configured to select one candidate from selection candidates contained in the candidate list generated by the candidate list construction unit by using the decoded candidate identification information may further be included.

The candidate list construction unit may assign the candidate identification information larger than that of the candidates to the new candidate generated by the selected candidate generator.

The first prediction list and the second prediction list may be different prediction lists.

The candidate list construction unit may include the motion information derived from the motion information of the block of a picture temporally different from the picture including the decoding target block in the candidate list.

The first motion information deriving unit may search for the candidates according to a first priority order for the candidate that becomes valid to set the candidate as the first candidate. The second motion information deriving unit may search for the candidate according to a second priority order to set the candidate that becomes valid as the second candidate.

The first motion information deriving unit may set a preset candidate among the candidates as the first candidate. The second motion information deriving unit may set another preset candidate among the candidates as the second candidate.

If both of the motion information of the first prediction list and the motion information of the second prediction list derived by the first motion information deriving unit and the second motion information deriving unit respectively are valid, the selected candidate generator may generate the new candidate.

The new candidate may hold two pieces of motion information. The new candidate may hold one piece of motion information.

Another aspect of the present invention is a picture decoding method. The method includes:

selecting a plurality of blocks each having one or two pieces of motion information containing at least information about a motion vector and information about a reference picture from a plurality of neighboring decoded blocks of a decoding target block and constructing a candidate list containing candidates of the motion information used for the motion compensation prediction from the motion information of the selected blocks, deriving the motion information of a first prediction list from a first candidate contained in the candidate list, deriving the motion information of a second prediction list from a second candidate contained in the candidate list; and generating a new candidate of the motion information by combining the motion information of the first prediction list and the motion information of the second prediction list.

Any combination of the above elements and what is converted of the representation of the present invention among the method, device, system, recording medium, and computer program are also valid as an aspect of the present invention.

BRIEF DESCRIPTION OF THE DRAWINGS

Embodiments will now be described, byway of example only, with reference to the accompanying drawings which are meant to be exemplary, not limiting, and wherein like elements are numbered alike in several Figures, in which:

FIGS. 2A and 2B are diagrams illustrating a coding block;

FIGS. 3A to 3D are diagrams illustrating a prediction block;

FIG. 4 is a diagram illustrating a prediction block size;

FIG. 5 is a diagram illustrating a prediction coding mode;

FIG. 7 is a diagram illustrating an example of syntax of the prediction block;

FIGS. 8A to 8C are diagrams illustrating a Truncated Unary bitstream of a merge index;

FIG. 14 is a diagram illustrating a temporal candidate block group;

FIG. 18 is a diagram illustrating a candidate number management table;

FIGS. 19A and 19B are diagrams illustrating conversion from a merge candidate number into a merge index;

FIG. 30 is a diagram illustrating a decision of the prediction direction of bidirectional combined motion information candidates;

FIGS. 31A to 31C are diagrams illustrating extension examples of the decision of the prediction direction of bidirectional combined motion information candidates;

FIGS. 40A and 40B are diagrams illustrating candidate number management tables according to a first modification;

FIG. 41 is a diagram illustrating another candidate number management table according to the first modification of the first embodiment;

FIG. 47 is a diagram illustrating the operation of a reference direction motion information decision unit and the operation of a reverse direction motion information decision unit according to the fourth modification of the first embodiment;

FIG. 48 is a diagram illustrating combinations of motion information in which two prediction directions according to a fifth modification of the first embodiment are the same;

FIGS. 49A and 49B are diagrams illustrating preset combinations of BD0 and BD1 according to a sixth modification of the first embodiment;

FIG. 50 is a diagram (part 1) illustrating an effect of the first embodiment;

FIG. 51 is a diagram (part 2) illustrating the effect of the first embodiment;

FIG. 52 is a diagram (part 3) illustrating the effect of the first embodiment;

FIGS. 53A and 53B are diagrams illustrating syntax that encodes a candidate number management table according to a second embodiment in a bitstream;

FIG. 54 is a diagram illustrating a candidate number management table according to a third embodiment;

FIGS. 58A to 58C are diagrams illustrating change examples of the candidate number management table of the candidate number management table changing unit according to the third embodiment;

FIGS. 60A and 60B are diagrams illustrating the candidate number management tables of the candidate number management table changing unit according to the first modification of the third embodiment;

FIG. 65 is a diagram illustrating a candidate number management table according to a sixth embodiment;

DETAILED DESCRIPTION OF THE INVENTION

First, technologies assumed for the embodiments of the present invention will be described.

Currently, devices and systems conforming to encoding schemes such as MPEG (Moving Picture Experts Group) are widely used. In such encoding schemes, a sequence of a plurality of pictures on a time base is handled as information of a digital signal. For the purpose of broadcasting, transmitting, or accumulating highly efficient information, compression encoding is performed by using the motion compensation prediction using redundancy in the time direction and orthogonal transformation such as a discrete cosine transform using redundancy in the space direction.

In 1995, the MPEG-2 video (ISO/IEC 13818-2) encoding scheme was drawn up as a general video compression encoding scheme and has been widely used for accumulation media such as DVD and magnetic tape of digital VTR conforming to the D-VHS (registered trademark) standard and applications of digital broadcasting and the like.

Further, in 2003, the encoding scheme called MPEG-4 AVC/H.264 (the standard number of 14496-10 is given in ISO/IEC and H.264 in ITU-T. Hereinafter, the encoding scheme will be called MPEG-4AVC) was drawn up as an international standard by cooperative work between the joint technical committee (ISO/IEC) of the ISO (International Standards Organization) and IEC (International Electrotechnical Commission) and ITU-T (International Telecommunication Union-Telecommunication Sector).

Currently, standardization of the encoding scheme called HEVC is under way by cooperative work between the joint technical committee (ISO/IEC) of the ISO (International Standards Organization) and IEC (International Electrotechnical Commission) and ITU-T (International Telecommunication Union-Telecommunication Sector).

(Coding Block)

Figure 1:
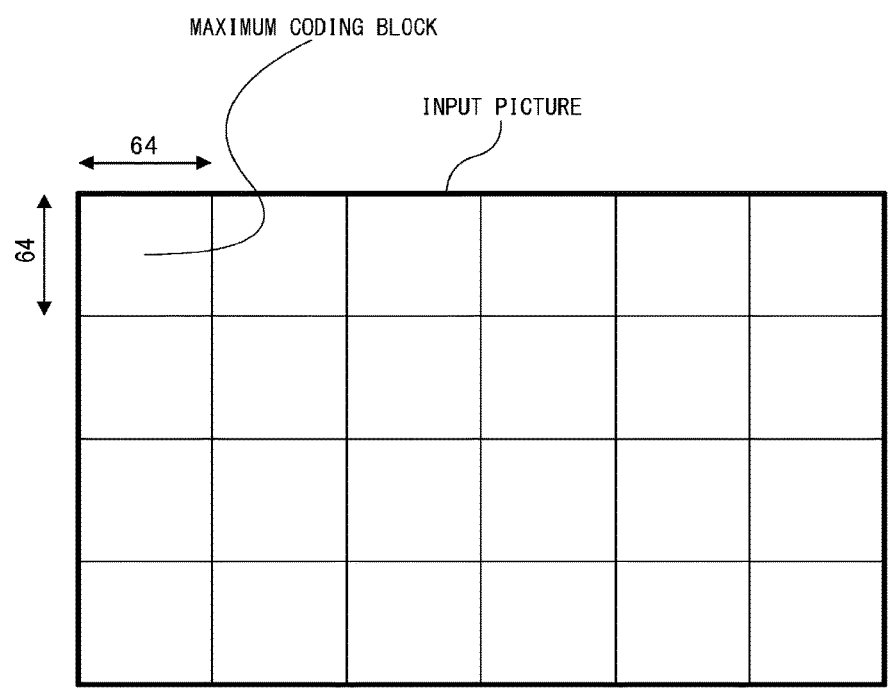
FIG. 1 is a diagram illustrating an example of partitioning a picture into maximum coding blocks.

In the embodiments of the present invention, an input picture signal is partitioned into maximum coding block units as shown in FIG. 1 and the partitioned coding blocks are processed in a raster-scan order. The coding block has a hierarchical structure and can be partitioned into smaller coding blocks by successive equal quadrisection in consideration of the encoding efficiency and the like. Coding blocks obtained by quadrisection are encoded in a zigzag scan order. The coding block that can no longer partitioned is called the minimum coding block. The coding block becomes the unit of encoding and the maximum coding block also becomes a coding block when the number of partitions is 0. In the present embodiment, it is assumed that the maximum coding block is 64 pixels.times.64 pixels and the minimum coding block is 8 pixels.times.8 pixels.

FIGS. 2A and 2B show examples of partition of the maximum coding block. In the example of FIG. 2A, the coding block is partitioned into 10 coding blocks. CU0, CU1, and CU9 are coding blocks of 32 pixels.times.32 pixels, CU2, CU3, and CU8 are coding blocks of 16 pixels.times.16 pixels, and CU4, CU5, CU6, and CU7 are coding blocks of 8 pixels.times.8 pixels.

(Prediction Block)

In the embodiments of the present invention, a coding block is further partitioned into prediction blocks. FIGS. 3A to 3D show patterns of partition of the prediction block. FIG. 3A shows 2N.times.2N that does not partition the coding block, FIG. 3B shows 2N.times.N that horizontally partitions the coding block, FIG. 3C shows N.times.2N that vertically partitions the coding block, and FIG. 3D shows N.times.N that horizontally and vertically partitions the coding block. That is, as shown in FIG. 4, 13 prediction block sizes ranging from the 64 pixels.times.64 pixels as the maximum prediction block size for which the number of CU partitions is 0 to 4 pixels.times.4 pixels as the minimum prediction block size for which the number of CU partitions is 3.

In the present embodiment, the maximum coding block is set to 64 pixels.times.64 pixels and the minimum coding block is set to 8 pixels.times.8 pixels, but the embodiments are not limited to such combinations. Also, patterns of partition of prediction blocks are set as shown in FIGS. 3A to 3D, but the coding block only needs to be partitioned into one prediction block or more and patterns are not limited to the above patterns.

(Prediction Coding Mode)

In the embodiments of the present invention, the prediction direction of the motion compensation prediction or the number of coding vectors can be switched by the block size of the prediction block. An example of the prediction coding mode associating the prediction direction of the motion compensation prediction and the number of coding vectors will briefly be described using FIG. 5.

The prediction coding mode shown in FIG. 5 include a unidirectional mode (UniPred) in which the prediction direction of the motion compensation prediction is unidirectional and the number of coding vectors is 1, a bidirectional mode (BiPred) in which the prediction direction of the motion compensation prediction is bidirectional and the number of coding vectors is 2, and a merge mode (MERGE) in which the prediction direction of the motion compensation prediction is unidirectional or bidirectional and the number of coding vectors is 0. In addition, an intra mode (Intra) which is a prediction coding mode that not perform a motion compensation prediction is provided.

(Reference Picture Index)

In the embodiments of the present invention, the optimum reference picture can be selected from a plurality of reference pictures in a motion compensation prediction to improve the precision of the motion compensation prediction. Thus, the reference picture used for a motion compensation prediction is encoded in a bitstream as a reference picture index together with a coding vector. The reference picture index used for the motion compensation prediction is a numerical value larger than or equal to 0. A plurality of reference images selected by the reference picture index is managed by a reference index list. If the prediction direction of the compensation prediction is unidirectional, one reference picture index is encoded and if the prediction direction of the compensation prediction is bidirectional, a reference picture index indicating a reference picture of each of the prediction directions is encoded (see FIG. 5).

(Vector Predictor Index)

In HEVC, selecting the optimum vector predictor from a plurality of vector predictor candidates to improve the precision of the vector predictor and encoding a vector predictor index to indicate the selected vector predictor are under discussion. In the embodiments of the present invention, the above vector predictor index is introduced. If the prediction direction of the compensation prediction is unidirectional, one vector predictor index is encoded and if the prediction direction of the compensation prediction is bidirectional, a vector predictor index indicating a vector predictor of each of the prediction directions is encoded (see FIG. 5).

(Merge Index)

In HEVC, selecting the optimum block from blocks located in the same positions as a plurality of neighboring block candidates and processing target blocks of other encoded pictures and encoding and decoding a merge index indicating the selected block to further improve the encoding efficiency are under discussion. This is a motion compensation prediction technology (merge technology) to use motion information comprising the prediction direction of the motion compensation prediction of the selected block indicated by the merge index, motion vector information, and reference picture information for the processing target block. In the embodiments of the present invention, the above merge index (merger technology) is introduced. As shown in FIG. 5, one merge index is encoded when the prediction coding mode is the merge mode. If the motion information is bidirectional, the motion information contains motion vector information and reference picture information of each prediction direction.

Hereinafter, motion information possessed by a block that may be indicated by a merge index will be called a combined motion information candidate and an aggregate of combined motion information candidates will be called a combined motion information candidate list.

(Prediction Direction)

Figure 6A:
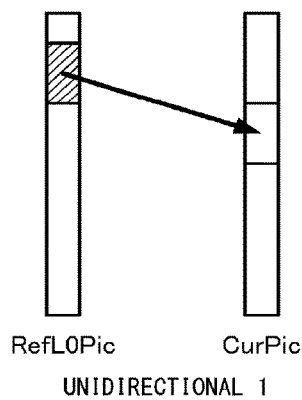
FIGS. 6A to 6D are diagrams illustrating a prediction direction of a motion compensation prediction.
Figure 6B:
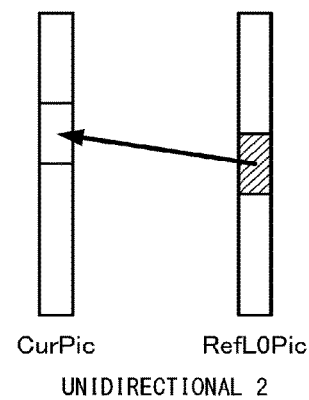

In the embodiments of the present invention, two directions, an L0 direction and an L1 direction, are set as the prediction direction of the motion compensation prediction. The prediction direction of the motion compensation prediction will briefly be described using FIGS. 6A to 6D. When the prediction direction of the motion compensation prediction is unidirectional, one of the L0 direction and the L1 direction is used. FIG. 6A shows a case when the prediction direction of the motion compensation prediction is unidirectional and a reference picture (RefL0Pic) in the L0 direction is a time prior to a coding target picture (CurPic). FIG. 6B shows a case when the prediction direction of the motion compensation prediction is unidirectional and the reference picture in the L0 direction is a time subsequent to the coding target picture. The reference picture in the L0 direction in FIGS. 6A and 6B can be replaced by a reference picture (RefL1Pic) in the L1 direction.

Figure 6C:
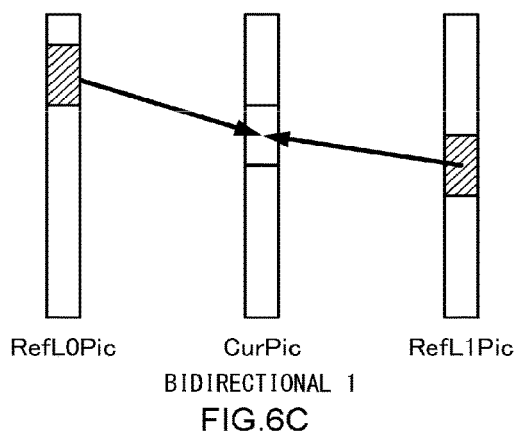
Figure 6D:
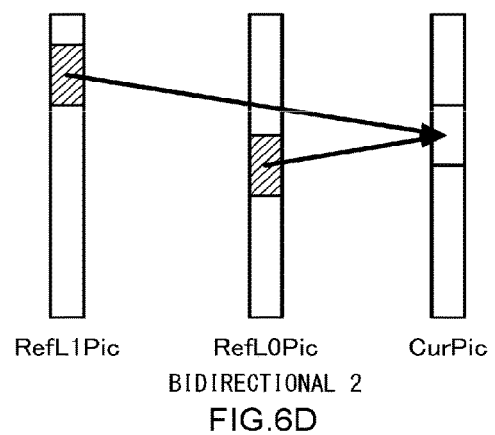

When the prediction direction of the motion compensation prediction is bidirectional, both of the L0 direction and the L1 direction are used are represented as a BI direction. FIG. 6C shows a case when the prediction direction of the motion compensation prediction is bidirectional and the reference picture in the L0 direction is a time prior to the coding target picture and the reference picture in the L1 direction is a time subsequent to the coding target picture. FIG. 6D shows a case when the prediction direction of the motion compensation prediction is bidirectional and the reference picture in the L0 direction and the reference picture in the L1 direction are times prior to the coding target picture. The reference picture in the L0 direction in FIGS. 6C and 6D can be replaced by the reference picture (RefL1Pic) in the L1 direction and the reference picture in the L1 direction can be replaced by the reference picture in the L0 direction. As has been described above, the L0 direction and the L1 direction as the prediction directions of the motion compensation prediction can each be represented as temporally forward or backward. A plurality of reference pictures can be present in each of the L0 direction and the L1 direction and reference pictures are determined after reference pictures in the L0 direction are added to a reference picture list L0, reference pictures in the L1 direction are added to a reference picture list L1, and the position of the reference picture in the reference picture list is specified by the reference picture index in each prediction direction. Hereinafter, that the prediction direction is the L0 direction means that motion information associated with reference pictures added to the reference picture list L0 is used in the prediction direction and that the prediction direction is the L1 direction means that motion information associated with reference pictures added to the reference picture list L1 is used in the prediction direction.

(Syntax)

An example of syntax of a prediction block according to an embodiment of the present invention will be described using FIG. 7. Whether a prediction block is intra or inter is specified by an upper coding block and FIG. 7 shows syntax when the prediction block is inter. In a prediction block, a merge flag (merge flag), a merge index (merge_idx), a motion compensation prediction direction (inter_pred_type), reference indexes (ref_idx_l0 and ref_idx_l1), vector differences (mvd_l0[0], mvd_l0[1], mvd_l1[0], mvd_l1[1]), and vector predictor indexes (mvp_idx_l0 and mvp_idx_l1) are set up. [0] of a vector difference indicates a horizontal component and [1] indicates a vertical component.

ref_idx_l0, mvd_l0[0], mvd_l0[1], and mvp_idx_l0 are information related to the L0 direction and ref_idx_l1, mvd_l1[0], mvd_l1[1], and mvp_idx_l1 are information related to the L1 direction. inter_pred_type includes three types of Pred_L0 (unidirectional in the L0 direction), Pred_L1 (unidirectional in the L1 direction), and Pred_BI (bidirectional in BI).

(Code Amount of Motion Information)

As is evident from the syntax in FIG. 7, the merge mode can transmit motion information using one merge index. Thus, if a prediction error of the merge mode (with the merge flag set to 1) and that of the non-merge mode (with the merge flag set to 0) are comparable, the merge mode can encode motion information more efficiently. That is, the encoding efficiency of motion information can be improved by increasing the selection rate of the merge mode.

While the syntax of a prediction block according to an embodiment of the present invention is set as shown in FIG. 7, the merge mode only needs to be able to encode motion information with less information than non-merge modes according to an embodiment of the present invention and thus, the syntax is not limited to the above example. For example, motion information may include only a vector difference.

(Properties of the Merge Index)

In FIG. 7, NumMergeCands( ) as a function to calculate the number of merge candidates is set up before decoding (encoding) of merge indexes and NumMergeCands( ) as a function to calculate the number of vector predictor candidates is set up before decoding (encoding) of vector predictor indexes. These functions are needed to derive the numbers of candidates because the number of merge candidates and the number of vector predictor candidates change from prediction block to prediction block based on validity of motion information of neighboring blocks. That motion information of a neighboring block is valid means that the neighboring block is not a block outside the region and is not in intra mode and that motion information of a neighboring block is invalid means that the neighboring block is a block outside the region and is in intra mode.

If the number of merge candidates is 1, the merge index is not decoded (encoded). This is because if the number of merge candidates is 1, the candidate can uniquely be decided without being specified. This also applies to the vector predictor index.

The bitstring of a merge index will be described using FIGS. 8A to 8C. In the embodiments of the present invention, a Truncated Unary bitstring will be used as a merge index bitstring. FIG. 8A shows a merge index bitstring using the Truncated Unary bitstring when the number of merge candidates is 2, FIG. 8B shows a merge index bitstring using the Truncated Unary bitstring when the number of merge candidates is 3, and FIG. 8C shows a merge index bitstring using the Truncated Unary bitstring when the number of merge candidates is 4.

It is evident from FIGS. 8A to 8C that even if the same merge index value is encoded, the number of code bits assigned to the merge index decreases with a decreasing number of merge candidates. When, for example, the merge index is 1, while the number of bits is 1 with '1' if the number of merge candidates is 2, the number of bits is 2 with '10' if the number of merge candidates is 3.

As described above, the encoding efficiency of merge index improves with a decreasing number of merge candidates. That is, the encoding efficiency can be improved by eliminating candidates of a low selection rate while retaining candidates of a high selection rate. If the numbers of candidates are the same, a smaller merge index has a smaller code amount and thus, the encoding efficiency can be improved by assigning a smaller merge index to a candidate of a high selection rate.

(POC)

In the embodiments of the present invention, POC (Picture Order Count) is used as time information (distance information) of pictures. POC is a counter defined in MPEG-4AVC and indicating the display order of pictures. If the display order of pictures increases by 1, POC also increases by 1. Thus, a time difference (distance) between pictures can be derived from a POC difference between pictures.

(Properties of Motion Information of Neighboring Blocks)

In general, a correlation between motion information of the processing target block and motion information of a neighboring block of the processing target block (hereinafter, called a neighboring block) becomes high when the processing target block and the neighboring block makes the same motion, for example, when a region including the processing target block and the neighboring block is being translated. Also in general, a correlation between motion information of the processing target block and motion information of the neighboring block depends on the length in contact between the processing target block and the neighboring block.

(Properties of Motion Information of Other Pictures)

On the other hand, a correlation between a block in the same position as the processing target block in another decoded picture (hereinafter, called the same position block) used in time direct mode or space direct mode in general and the processing target block becomes high when the same position block and the processing target block are in a resting state.

Hereinafter, preferred embodiments of the moving picture encoding device, moving picture encoding method, and moving picture encoding program according to the present invention will be described in detail together with drawings. The same reference signs are attached to the same elements in the description of drawings to omit a duplicate description.

First Embodiment (Configuration of a Moving Picture Encoding Device 100)

Figure 9:
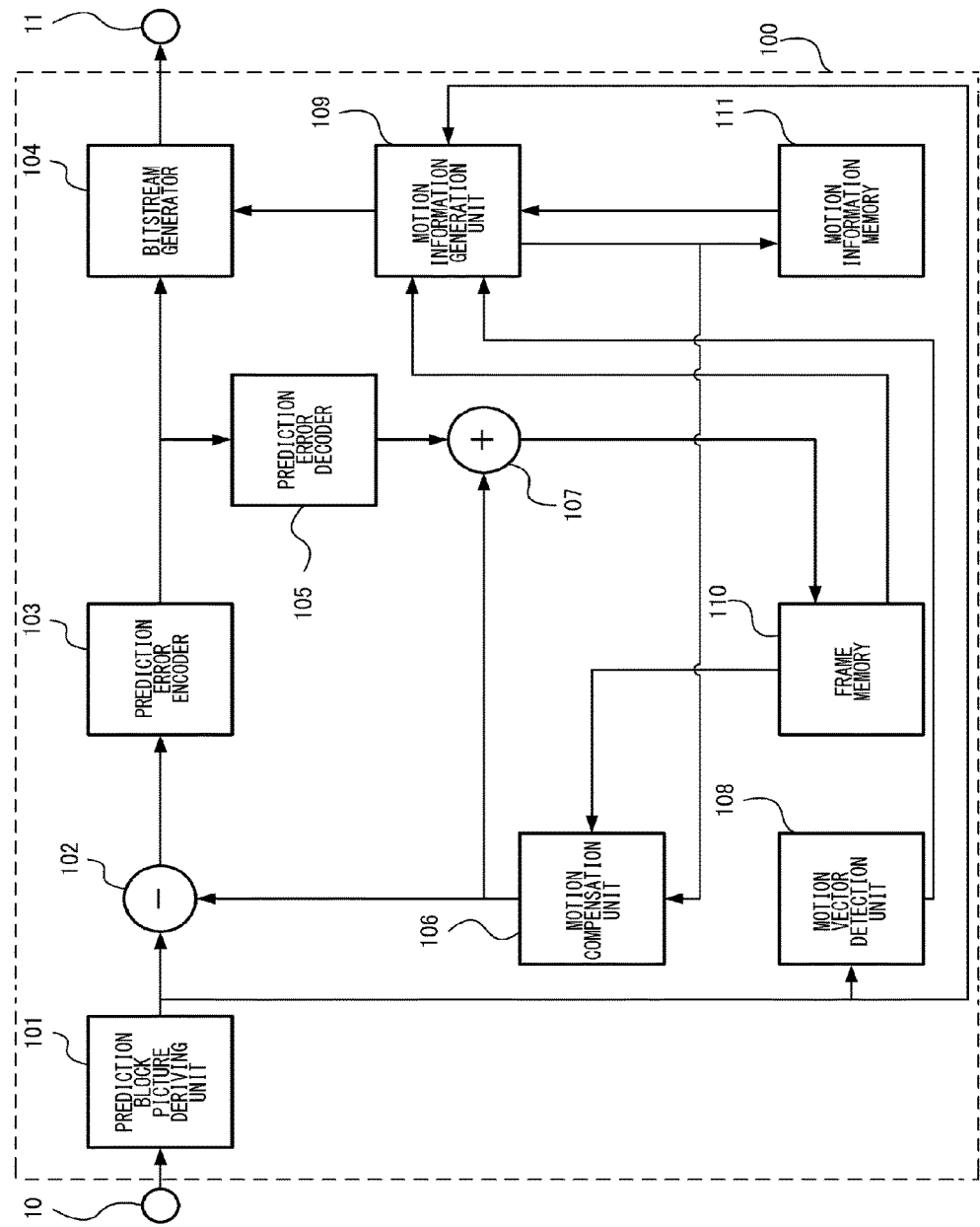
FIG. 9 is a diagram illustrating a configuration of a moving picture encoding device according to a first embodiment of the present invention.

FIG. 9 shows the configuration of the moving picture encoding device 100 according to the first embodiment of the present invention. The moving picture encoding device 100 is a device that encodes a moving picture signal in prediction block units in which a motion compensation prediction is performed. It is assumed that the partition of the coding block, the decision of the prediction block size, and the decision of the prediction coding mode are decided by an upper coding controller.

The moving picture encoding device 100 is realized by hardware such as an information processing apparatus including a CPU (Central Processing Unit), frame memory, and hard disk. The moving picture encoding device 100 realizes functional elements described below with the above elements operating. The position information of the prediction block to be processed, the prediction block size, and the prediction direction of motion compensation prediction are assumed to be shared inside the moving picture encoding device 100 and are not illustrated.

The moving picture encoding device 100 according to the first embodiment includes a prediction block picture deriving unit 101, a subtraction unit 102, a prediction error encoder 103, a bitstream generator 104, a prediction error decoder 105, a motion compensation unit 106, an addition unit 107, a motion vector detection unit 108, a motion information generator 109, a frame memory 110, and a motion information memory 111.

(Function of the Moving Picture Encoding Device 100)

The function of each unit will be described below. The prediction block picture deriving unit 101 derives a picture signal of the prediction block to be processed from a picture signal supplied from a terminal 10 based on the position information of the prediction block and the prediction block size and supplies the picture signal of the prediction block to the subtraction unit 102, the motion vector detection unit 108, and the motion information generator 109.

The subtraction unit 102 calculates a prediction error signal by subtracting a picture signal supplied by the prediction block picture deriving unit 101 from a prediction signal supplied by the motion compensation unit 106 and supplies the prediction error signal to the prediction error encoder 103.

The prediction error encoder 103 generates prediction error coding data by performing processing such as quantization and orthogonal transformation on a prediction error signal supplied by the subtraction unit 102 and supplies the prediction error coding data to the bitstream generator 104 and the prediction error decoder 105.

The bitstream generator 104 generates a bitstream by entropy-encoding prediction error coding data supplied by the prediction error encoder 103 and the merge flag, merge candidate number, prediction direction of a motion compensation prediction, reference picture index, vector difference, and vector index supplied by the motion information generator 109 together with the prediction direction of the motion compensation prediction according to the syntax and supplies the bitstream to a terminal 11.

Here, the merge candidate number is converted into a merge index to generate a bitstream. The merge candidate number is the number indicating the selected combined motion information candidate. The conversion of the merge candidate number into a merge index will be described later. In the first embodiment, as described above, the Truncated Unary bitstream is used to encode the merge index and the vector predictor index, but the present embodiment is not limited to the Truncated Unary bitstream if a bitstream is capable of encoding using a decreasing number of bits with a decreasing number of candidates.

The prediction error decoder 105 generates a prediction error signal by performing processing such as inverse quantization and inverse orthogonal transformation on prediction error coding data supplied by the prediction error encoder 103 and supplies the prediction error signal to the addition unit 107.

The motion compensation unit 106 generates a prediction signal by making motion compensation for a reference picture in the frame memory 110 indicated by the reference picture index supplied by the motion information generator 109 based on a motion vector supplied by the motion information generator 109. If the prediction direction is bidirectional, an average of prediction signals in the L0 direction and the L1 direction is set as a prediction signal.

The addition unit 107 generates a decoded picture signal by adding a prediction error signal supplied by the prediction error decoder 105 and a prediction signal supplied by the motion compensation unit 106 and supplies the decoded picture signal to the frame memory 110.

The motion vector detection unit 108 detects a motion vector and a reference picture index indicating a reference picture from a picture signal supplied by the prediction block picture deriving unit 101 and a picture signal corresponding to a plurality of reference pictures and supplies the motion vector and the reference picture index to the motion information generator 109. If the prediction direction is bidirectional, motion vectors and reference picture indexes in the L0 direction and the L1 direction are detected.

In a general detection method of a motion vector, an error evaluation value is calculated for a picture signal corresponding to a reference picture moved by a predetermined amount of movement from the same position of a picture signal of a target picture and the amount of movement that minimizes the error evaluation value is set as the motion vector. As the error evaluation value, SAD (Sum of Absolute Difference) showing a sum of absolute differences or MSE (Mean Square Error) showing a mean square error can be used.

The motion information generator 109 generates a merge candidate number, or a vector difference and a vector predictor index from a motion vector and a reference picture index supplied by the motion vector detection unit 108, a candidate block group supplied by the motion information memory 111, and a reference picture indicated by a reference picture index in the frame memory 110 and supplies the merge flag, merge candidate number, reference picture index, vector difference, or vector predictor index to the bitstream generator 104, the motion compensation unit 106, and the motion information memory 111 when necessary. A detailed configuration of the motion information generator 109 will be described later.

The frame memory 110 stores a decoded picture signal supplied by the addition unit 107. In addition, as many decoded pictures whose decoding of the whole picture is completed as a predetermined number larger than or equal to 1 are stored as reference pictures. The frame memory 110 supplies a stored reference picture signal to the motion compensation unit 106 and the motion information generator 109. A storage area to store reference pictures is controlled by the FIFO (First In First Out) method.

The motion information memory 111 stores motion information supplied by the motion information generator 109 as a predetermined number of pictures in minimum prediction block size units. Motion information of neighboring blocks of the block to be processed is set as a spatial candidate block group.

In addition, the motion information memory 111 sets the block on ColPic in the same position as the prediction block to be processed and neighboring blocks thereof are set as a temporal candidate block group. The motion information memory 111 supplies the spatial candidate block group and the temporal candidate block group to the motion information generator 109 as a candidate block group. The motion information memory 111 is synchronized with the frame memory 110 and is controlled by the FIFO (First In First Out) method.

ColPic is refers to a decoded picture separate from the prediction block to be processed and a picture stored in the frame memory 110 as a reference picture. In the first embodiment, ColPic is assumed to be the reference picture decoded immediately before. ColPic is assumed to be the reference picture decoded immediately before in the first embodiment, but ColPic only needs to be an encoded picture and may be, for example, the reference picture immediately before in the display order or immediately after in the display order and can also be specified in a bitstream.

Figure 10:
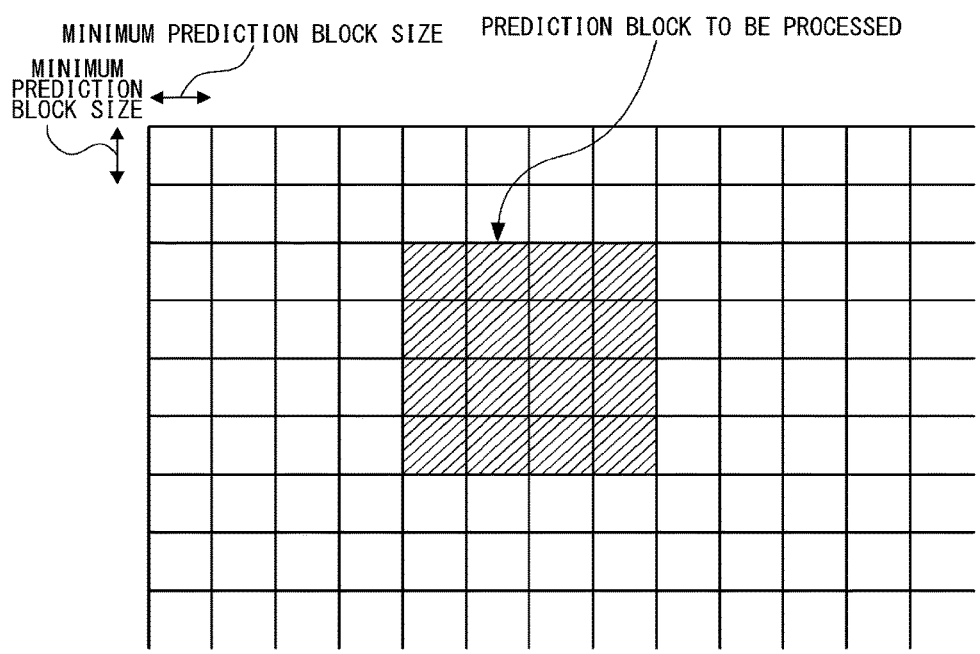
FIG. 10 is a diagram illustrating a management method of motion information in a motion information memory in FIG. 9.

The management method of motion information in the motion information memory 111 will be described using FIG. 10. The motion information is stored in each memory area in minimum prediction block units. FIG. 10 shows a state when the prediction block size to be processes is 16 pixels.times.16 pixels. In this case, motion information of the prediction block is stored in 16 shaded memory areas in FIG. 10.

When the prediction coding mode is the intra mode, (0, 0) is stored as a motion vector in the L0 direction and the L1 direction and "−1" is stored as a reference picture index in the L0 direction and the L1 direction. "−1" of the reference picture index may be any value allowing one to determine to be a mode in which no motion compensation prediction is performed. Hereinafter, if not specifically mentioned, a block simply expressed as such is assumed to indicate the minimum prediction block unit. When the block is a block outside the region, like when the mode is the intra mode, (0, 0) is stored as a motion vector in the L0 direction and the L1 direction and "−1" is stored as a reference picture index in the L0 direction and the L1 direction. That the LX direction (X is 0 or 1) is valid means that the reference picture index in the LX direction is larger than or equal to 0 and that the LX direction (X is 0 or 1) is invalid (not valid) means that the reference picture index in the LX direction is "−1".

Figure 11:
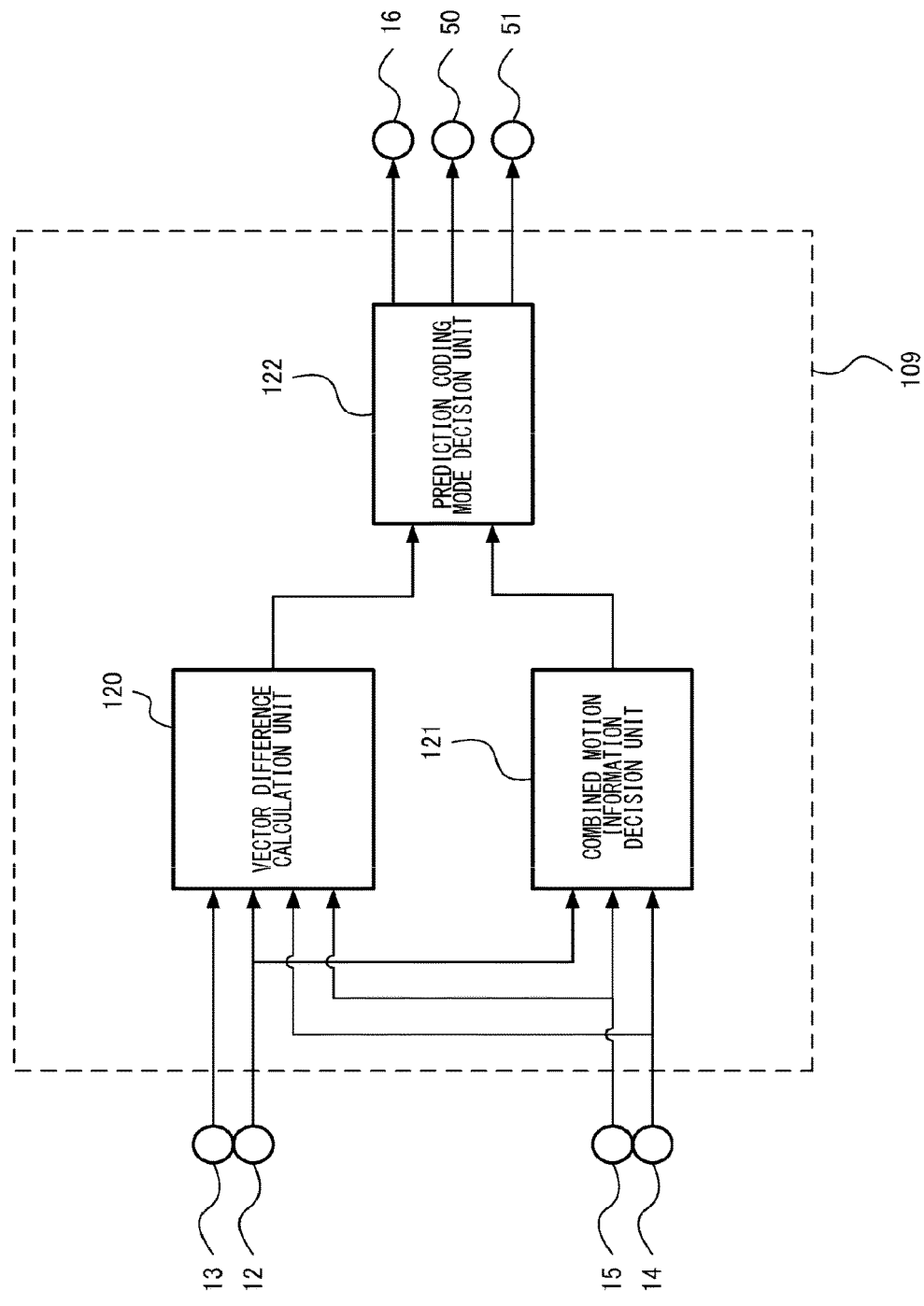
FIG. 11 is a diagram illustrating the configuration of a motion information generator in FIG. 9.

Subsequently, a detailed configuration of the motion information generator 109 will be described using FIG. 11. FIG. 11 shows the configuration of the motion information generator 109. The motion information generator 109 includes a vector difference calculation unit 120, a combined motion information decision unit 121, and a prediction coding mode decision unit 122. A terminal 12 is connected to the motion information memory 111, a terminal 13 is connected to the motion vector detection unit 108, a terminal 14 is connected to the frame memory 110, a terminal 15 is connected to the prediction block picture deriving unit 101, a terminal 16 is connected to the bitstream generator 104, a terminal 50 is connected to the motion compensation unit 106, and a terminal 51 is connected to the motion information memory 111.

The function of each unit will be described below. The vector difference calculation unit 120 decides a vector predictor index from a candidate block group supplied from the terminal 12, a motion vector and a reference picture index supplied from the terminal 13, a reference picture supplied from the terminal 14, and a picture signal supplied from the terminal 15 to calculate a vector difference and a rate distortion evaluation value. Then, the vector difference calculation unit supplies the reference picture index, the motion vector, the vector difference, the vector predictor index, and the rate distortion evaluation value to the prediction coding mode decision unit 122. A detailed configuration of the vector difference calculation unit 120 will be described later.

The combined motion information decision unit 121 constructs a combined motion information candidate list from the candidate block group supplied from the terminal 12, the reference picture supplied from the terminal 14, and the picture signal supplied from the terminal 15. Then, the combined motion information decision unit 121 selects a combined motion information candidate from the constructed combined motion information candidate list and decides its merge candidate number and also calculates a rate distortion evaluation value before supplying motion information, the merge candidate number, and the rate distortion evaluation value of the combined motion information candidate to the prediction coding mode decision unit 122. A detailed configuration of the combined motion information decision unit 121 will be described later.

The prediction coding mode decision unit 122 compares the rate distortion evaluation value supplied by the vector difference calculation unit 120 and the rate distortion evaluation value supplied by the combined motion information decision unit 121. If the former is less than the latter, the merge flag is set to "0". The prediction coding mode decision unit 122 supplies the merge flag and the reference picture index, vector difference, and vector predictor index supplied by the vector difference calculation unit 120 to the terminal 16 and supplies the motion vector and reference picture index supplied by the vector difference calculation unit 120 to the terminal 50.

If the former is larger than or equal to the latter, the merge flag is set to 1. The prediction coding mode decision unit 122 supplies the merge flag and the merge candidate number supplied by the combined motion information decision unit 121 to the terminal 16 and supplies the motion vector of motion information and reference picture index supplied by the combined motion information decision unit 121 to the terminal 50 and the terminal 51. While details of a concrete calculation method of a rate distortion evaluation value are not a principal objective of the present invention and so are omitted, the rate distortion evaluation value is an evaluation value having a property that the encoding efficiency increases with a decreasing rate distortion evaluation value.

Figure 12:
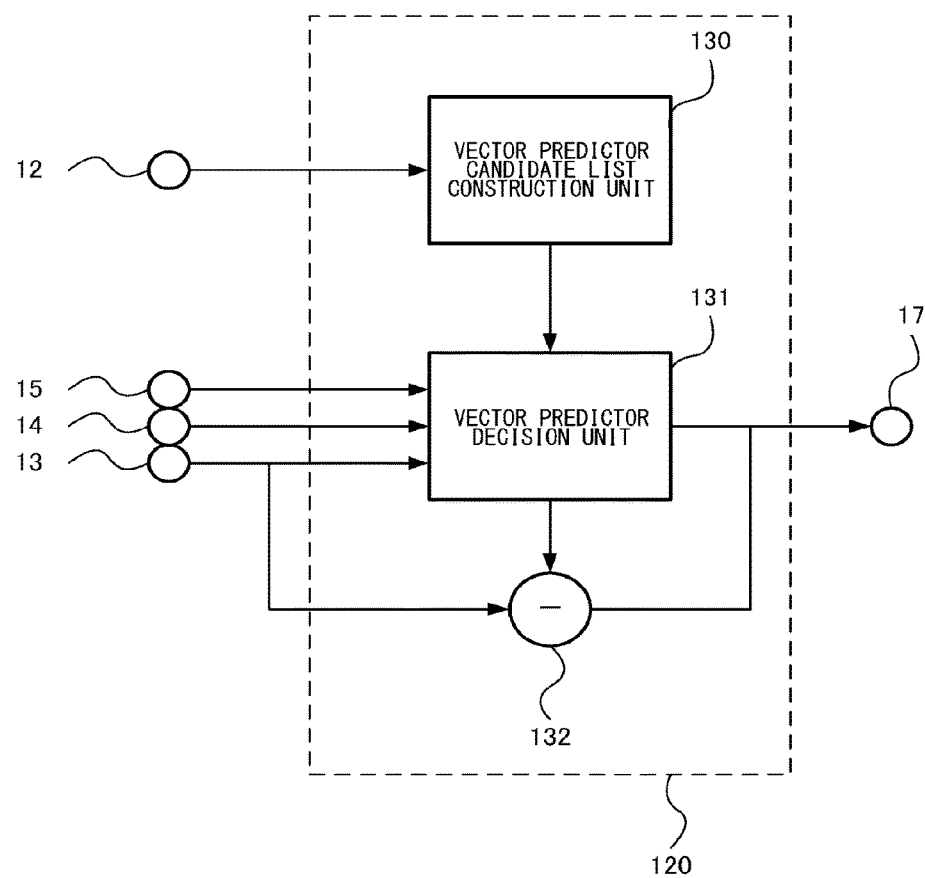
FIG. 12 is a diagram illustrating the configuration of a vector difference calculation unit in FIG. 9.

Subsequently, a detailed configuration of the vector difference calculation unit 120 will be described using FIG. 12. FIG. 12 shows the configuration of the vector difference calculation unit 120. The vector difference calculation unit 120 includes a vector predictor candidate list construction unit 130, a vector predictor decision unit 131, and a subtraction unit 132. A terminal 17 is connected to the prediction coding mode decision unit 122.

The vector predictor candidate list construction unit 130 is similarly set up in a moving picture decoding device 200 that decodes a bitstream generated by the moving picture encoding device 100 according to the first embodiment to construct a vector predictor candidate list that is consistent in the moving picture encoding device 100 and the moving picture decoding device 200.

The function of each unit will be described below. The vector predictor candidate list construction unit 130 deletes candidates blocks outside the region and candidates blocks whose mode is the intra mode from the candidate block group supplied from the terminal 12. Further, if a plurality of candidate blocks having duplicate motion vectors is present, the vector predictor candidate list construction unit 130 retains one candidate block and deletes other candidate blocks. The vector predictor candidate list construction unit 130 constructs a vector predictor candidate list from candidate blocks after the deletion and supplies the vector predictor candidate list to the vector predictor decision unit 131. The vector predictor candidate list constructed as described above contains one vector predictor candidate or more without duplication. When, for example, there is no candidate block having a motion vector, a vector (0, 0) is added to the vector predictor candidate list. If the prediction direction is bidirectional, a vector predictor candidate list is generated and supplied for the L0 direction and the L1 direction.

The vector predictor decision unit 131 selects the optimum vector predictor to the motion vector supplied from the terminal 13 from the vector predictor candidate list supplied by the vector predictor candidate list construction unit 130. The vector predictor decision unit 131 supplies the selected vector predictor to the subtraction unit 132 and also supplies a reference picture index and a vector predictor index as information indicating the selected vector predictor to the terminal 17. If the prediction direction is bidirectional, the optimum vector predictor is selected and supplied for the L0 direction and the L1 direction.

As the optimum vector predictor, a prediction error amount is calculated from a reference picture supplied from the terminal 14 and a picture signal supplied from the terminal 15 based on a motion vector possessed by the vector predictor candidate. Then, a rate distortion evaluation value is calculated from code amounts of a reference picture index, vector difference, and vector predictor index and the above prediction error amount and the vector predictor candidate that minimizes the rate distortion evaluation value is selected.

The subtraction unit 132 calculates a vector difference by subtracting the vector predictor supplied by the vector predictor decision unit 131 from the motion vector supplied from the terminal 13 and supplies the vector difference to the terminal 17. If the prediction direction is bidirectional, a vector difference is calculated and supplied for the L0 direction and the L1 direction.

(Candidate Block Group Supplied to the Vector Predictor Candidate List Construction Unit 130)

A candidate block group supplied to the vector predictor candidate list construction unit 130 will be described using FIGS. 13 and 14. A candidate block group contains a spatial candidate block group and a temporal candidate block group.

Figure 13:
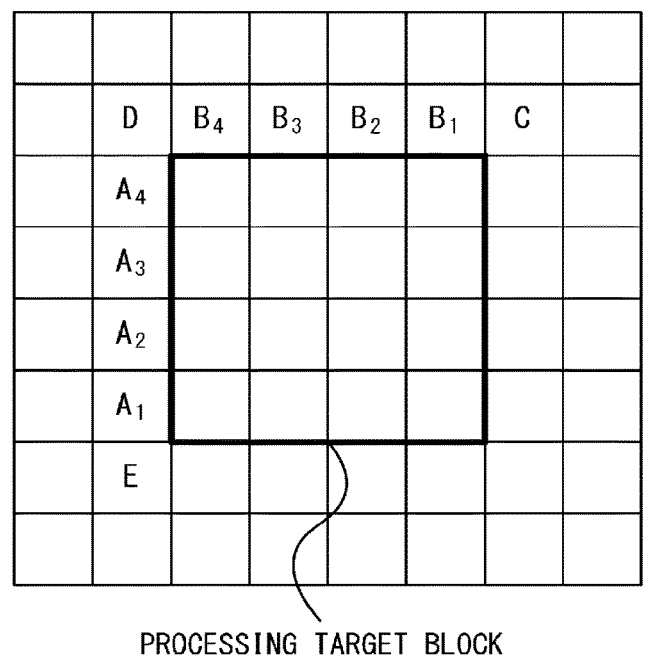
FIG. 13 is a diagram illustrating a spatial candidate block group.

FIG. 13 shows neighboring blocks of the prediction block to be processed when the prediction block size to be processed is 16 pixels.times.16 pixels. In the first embodiment, the spatial candidate block group is assumed to include five blocks of a block A1, a block C, a block D, a block B1, and a block E shown in FIG. 13. It is assumed here that the spatial candidate block group includes five blocks of the block A1, the block C, the block D, the block B1, and the block E, but the spatial candidate block group only needs to include at least one neighboring processed block of the prediction block to be processed and is not limited to the above example. For example, all of the block A1, a block A2, a block A3, a block A4, the block B1, a block B2, a block B3, a block B4, the block C, the block D, and the block E may be set as spatial candidate blocks.

Next, a temporal candidate block group will be described using FIG. 14. FIG. 14 shows blocks in the prediction block on ColPic in the same position as the prediction block to be processed and neighboring blocks thereof. In the first embodiment, the temporal candidate block group includes two blocks of a block H and a block I6 shown in FIG. 6.

It is assumed here that the temporal candidate block group is assumed to include two blocks of the block H and the block 16 on ColPic, but the temporal candidate block group only needs to be at least one block on a decoded picture other than the prediction block to be processed and is not limited to the above example. For example, all of a block 11 to a block I16, a block A to a block A4, a block B1 to a block B4, a block C, a block D, a block E, a block F1 to a block F4, a block G1 to a block G4, and the block H on ColPic may be set as temporal candidate blocks.

Hereinafter, if not specifically mentioned, the block A4 is written as the block A and the block B4 is written as the block B. Hereinafter, if not specifically mentioned, blocks of the block H and the block 16 are written as temporal blocks.

(Configuration of the Combined Motion Information Decision Unit 121)

Figure 15:
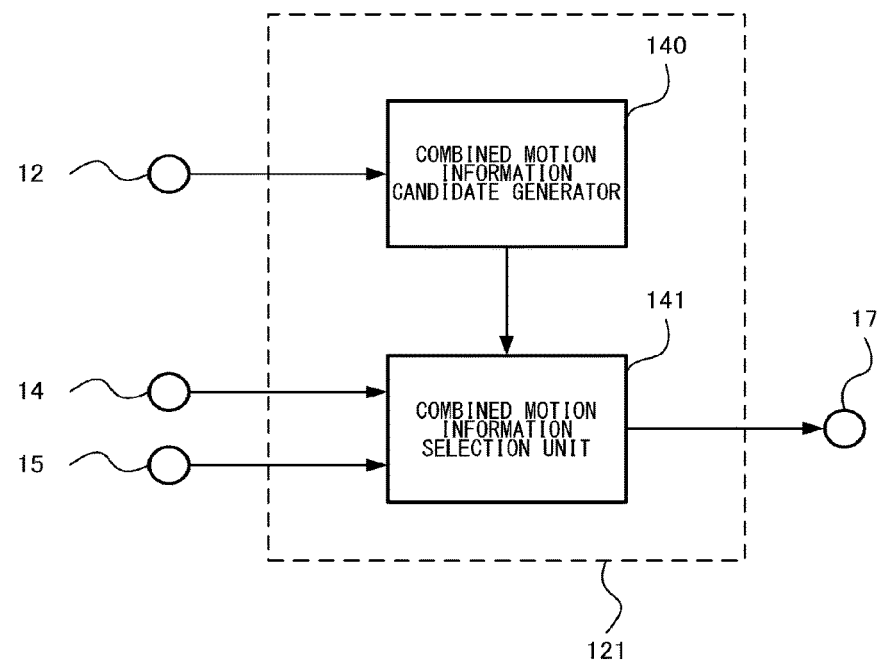
FIG. 15 is a diagram illustrating the configuration of a combined motion information decision unit in FIG. 11.

Subsequently, a detailed configuration of the combined motion information decision unit 121 will be described using FIG. 15. FIG. 15 shows the configuration of the combined motion information decision unit 121. The combined motion information decision unit 121 includes a combined motion information candidate generator 140 and a combined motion information selection unit 141. The combined motion information candidate generator 140 is similarly set up in the moving picture decoding device 200 that decodes a bitstream generated by the moving picture encoding device 100 according to the first embodiment to construct a combined motion information list that is consistent and identical in the moving picture encoding device 100 and the moving picture decoding device 200.

The function of each unit will be described below. The combined motion information candidate generator 140 constructs a combined motion information candidate list from a candidate block group supplied from the terminal 12 and supplies the combined motion information candidate list to the combined motion information selection unit 141. A detailed configuration of the combined motion information candidate generator 140 will be described later.

The combined motion information selection unit 141 selects the optimum combined motion information candidate from the combined motion information candidate list supplied by the combined motion information candidate generator 140 and supplies the merge candidate number as information indicating the selected combined motion information candidate to the terminal 17.

As the optimum combined motion information candidate, a prediction error amount is calculated from a reference picture obtained based on the prediction direction, motion vector, and reference picture index of the combined motion information candidate and supplied from the terminal 14 and a picture signal supplied from the terminal 15. A rate distortion evaluation value is calculated from the code amount of the merge candidate number and the prediction error amount to select the combined motion information candidate that minimizes the rate distortion evaluation value.

(Candidate Block Group Supplied to the Combined Motion Information Candidate Generator 140)

The candidate block group supplied to the combined motion information candidate generator 140 will be described using FIGS. 13 and 14. A candidate block group contains a spatial candidate block group and a temporal candidate block group. In the first embodiment, the spatial candidate block group is assumed to include four blocks of the block A4, the block B4, the block C, and the block E shown in FIG. 13. It is assumed here that the spatial candidate block group includes four blocks of the block A4, the block B4, the block C, and the block E, but the spatial candidate block group only needs to include at least one neighboring processed block of the prediction block to be processed and is not limited to the above example.

Next, the temporal candidate block group will be described using FIG. 14. In the first embodiment, the temporal candidate block group includes two blocks of the block H and the block I6 shown in FIG. 14. It is assumed here that the temporal candidate block group is the same as the temporal candidate block group supplied to the vector predictor candidate list construction unit 130, but the temporal candidate block group only needs to be at least a block larger than or equal to 0 on a decoded picture other than the prediction block to be processed and is not limited to the above example.

(Configuration of the Combined Motion Information Candidate Generator 140)

Figure 16:
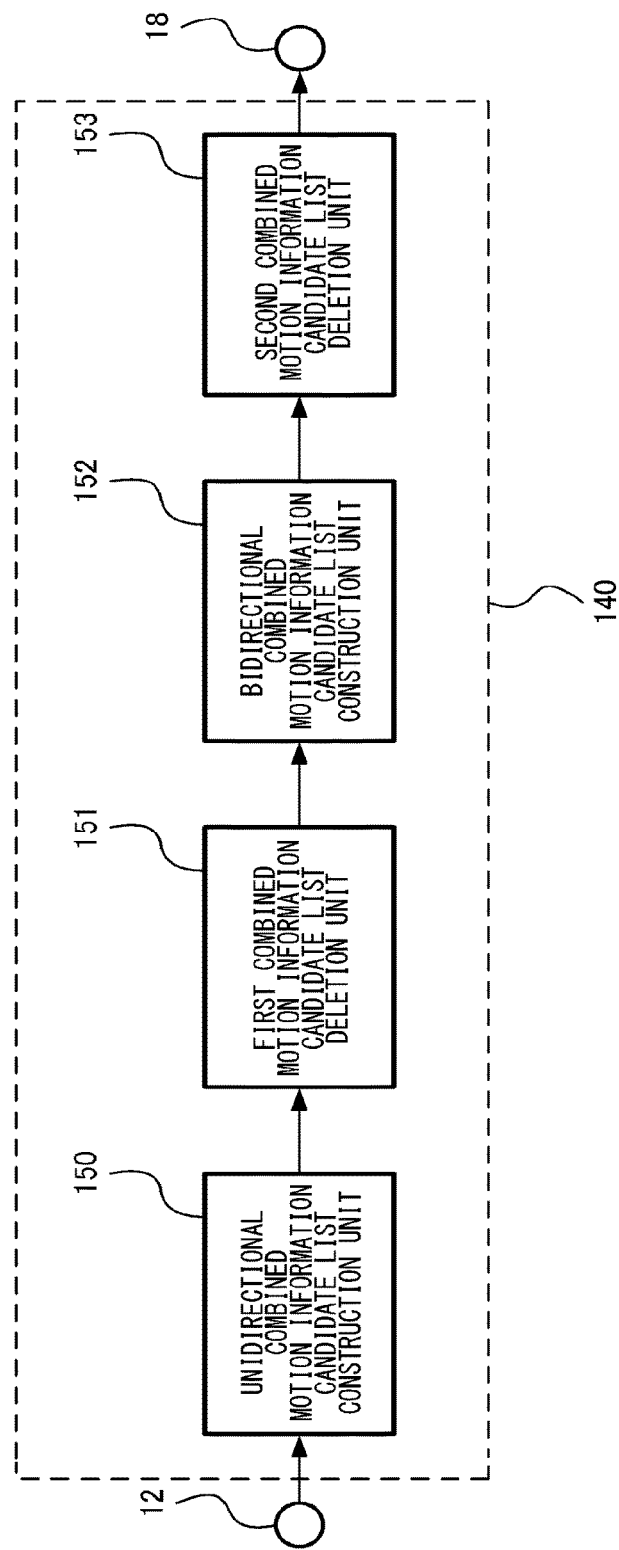
FIG. 16 is a diagram illustrating the configuration of a combined motion information candidate generator in FIG. 15.

Subsequently, a detailed configuration of the combined motion information candidate generator 140 featuring the first embodiment will be described using FIG. 16. FIG. 16 shows the configuration of the combined motion information candidate generator 140. A terminal 18 is connected to the combined motion information selection unit 141. The combined motion information candidate generator 140 includes a unidirectional combined motion information candidate list construction unit 150, a first combined motion information candidate list deletion unit 151, a bidirectional combined motion information candidate list construction unit 152, and a second combined motion information candidate list deletion unit 153.

The function of each unit will be described below. The unidirectional combined motion information candidate list construction unit 150 constructs a first combined motion information candidate list from a candidate block group supplied from the terminal 12 and supplies the first combined motion information candidate list to the first combined motion information candidate list deletion unit 151.

If a plurality of combined motion information candidates having duplicate motion information is present in the first combined motion information candidate list supplied by the unidirectional combined motion information candidate list construction unit 150, the first combined motion information candidate list deletion unit 151 constructs a second combined motion information candidate list by retaining one combined motion information candidate while deleting other combined motion information candidates before supplying the second combined motion information candidate list to the bidirectional combined motion information candidate list construction unit 152.

The bidirectional combined motion information candidate list construction unit 152 constructs a bidirectional combined motion information candidate list from the second combined motion information candidate list supplied by the first combined motion information candidate list deletion unit 151 and generates a third combined motion information candidate list by combining the bidirectional combined motion information candidate list with the second combined motion information candidate list before supplying the third combined motion information candidate list to the second combined motion information candidate list deletion unit 153. A detailed configuration of the bidirectional combined motion information candidate list construction unit 152 will be described later.

In the first embodiment, the bidirectional combined motion information candidate list construction unit 152 is assumed to construct a bidirectional combined motion information candidate (BD0) whose reference direction is L0 and a bidirectional combined motion information candidate (BD1) whose reference direction is L1. Thus, the above bidirectional combined motion information candidate list may contain BD0 and BD1.

If a plurality of combined motion information candidates having duplicate motion information is present in the third combined motion information candidate list supplied by the bidirectional combined motion information candidate list construction unit 152, the second combined motion information candidate list deletion unit 153 constructs a combined motion information candidate list by retaining one combined motion information candidate while deleting other combined motion information candidates before supplying the combined motion information candidate list to the terminal 18.

The unidirectional combined motion information candidate is a motion information candidate of a candidate block used by the so-called merge technology and motion information obtained from one candidate block. On the other hand, the bidirectional combined motion information is a feature technology of the first embodiment and is motion information obtained by using two pieces of motion information of two candidate blocks. In the present embodiment, as two pieces of motion information, one piece of motion information in the L0 direction and one piece of motion information in the L1 direction are used.

(Bidirectional Combined Motion Information Candidate List Construction Unit 152)

Figure 17:
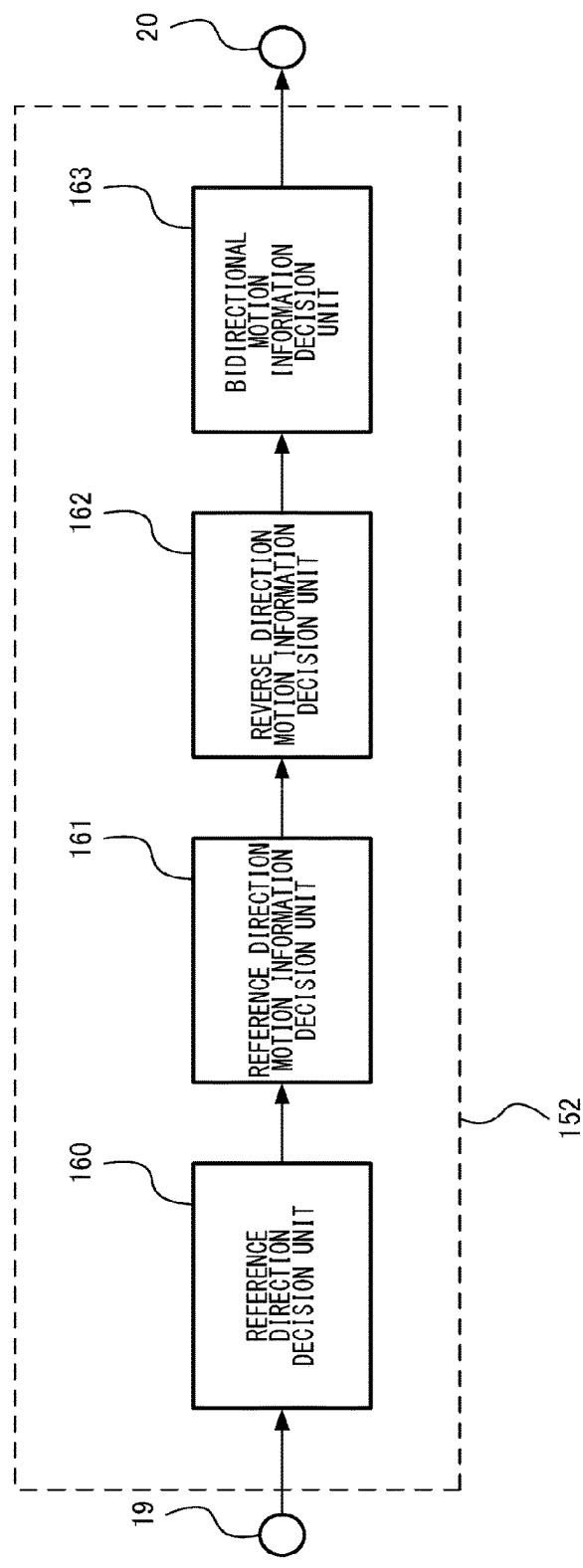
FIG. 17 is a diagram illustrating the configuration of a bidirectional combined motion information candidate list construction unit in FIG. 16.

Subsequently, a detailed configuration of the bidirectional combined motion information candidate list construction unit 152 will be described using FIG. 17. FIG. 17 shows the configuration of the bidirectional combined motion information candidate list construction unit 152. A terminal 19 is connected to the first combined motion information candidate list deletion unit 151 and a terminal 20 is connected to the second combined motion information candidate list deletion unit 153. The bidirectional combined motion information candidate list construction unit 152 includes a reference direction decision unit 160, a reference direction motion information decision unit 161, a reverse direction motion information decision unit 162, and a bidirectional motion information decision unit 163.

The function of each unit will be described below. The reference direction decision unit 160 decides a reference direction of a bidirectional combined motion information candidate from a second combined motion information candidate list and sends the reference direction and the second combined motion information candidate list supplied from the terminal 19 to the reference direction motion information decision unit 161. The reference direction for the bidirectional combined motion information candidate (BD0) whose reference direction is L0 is the L0 direction and the reference direction for the bidirectional combined motion information candidate (BD1) whose reference direction is L1 is the L1 direction.

The reference direction motion information decision unit 161 decides a motion vector and a reference picture index in the reference direction of a bidirectional combined motion information candidate from the reference direction and the second combined motion information candidate list supplied by the reference direction decision unit 160 and sends the reference direction, the motion vector and the reference picture index in the reference direction, and the second combined motion information candidate list to the reverse direction motion information decision unit 162.

The reverse direction motion information decision unit 162 decides a motion vector and a reference picture index in the reverse direction of the bidirectional combined motion information candidate from the reference direction, the motion vector and the reference picture index in the reference direction, and the second combined motion information candidate list supplied by the reference direction motion information decision unit 161. The reverse direction motion information decision unit 162 sends the motion vector and the reference picture index in the reference direction, the motion vector and the reference picture index in the reverse direction, and the second combined motion candidate list to the bidirectional motion information decision unit 163. In the first embodiment, if the reference direction is the L0 direction, the reverse direction is set to the L1 direction and if the reference direction is the L1 direction, the reverse direction is set to the L0 direction.

The bidirectional motion information decision unit 163 decides a bidirectional combined motion information candidate from the motion vector and the reference picture index in the reference direction and the motion vector and the reference picture index in the reverse direction supplied by the reverse direction motion information decision unit 162. The bidirectional motion information decision unit 163 also constructs a third combined motion information candidate list from the second combined motion information candidate list and sends the third combined motion information candidate list to the terminal 20.

(Candidate Number Management Table)

A candidate number management table showing the relationship between the merge candidate number used in the first embodiment and a combined motion information candidate will be described using FIG. 18. The merge candidate numbers 0 to 6 indicate a combined motion information candidate (A) of the block A contained in the combined motion information candidate list, a combined motion information candidate (B) of the block B, a combined motion information candidate (COL) of a temporal block, a combined motion information candidate (C) of the block C, a combined motion information candidate (E) of the block E, the bidirectional combined motion information candidate (BD0) whose reference direction is L0, and the bidirectional combined motion information candidate (BD1) whose reference direction is L1 respectively. The maximum number of combined motion information candidates contained in the combined motion information candidate list is assumed to be 7 (the maximum number of merge indexes is 6). As shown above, the merge candidate numbers of the bidirectional combined motion information candidate (BD0) whose reference direction is L0 and the bidirectional combined motion information candidate (BD1) whose reference direction is L1 are assigned so as to be larger than the merge candidate numbers of unidirectional combined motion information candidates. The candidate number management table used in the first embodiment is assumed to be the one shown in FIG. 18, but the table is only required that a decreasing merge candidate number should be assigned to a combined motion information candidate with an increasing selection rate and the present embodiment is not limited to the above table.

The maximum number of combined motion information candidates contained in the candidate number management table and the combined motion information candidate list is assumed to be shared in the moving picture encoding device 100 and is not illustrated. Hereinafter, the conversion from the merge candidate number into a merge index will be described using FIGS. 19A and 19B.

FIG. 19A shows that the merge candidate number directly becomes the merge index when a combined motion information candidate of the block A, a combined motion information candidate of the block B, a combined motion information candidate of the temporal block, a combined motion information candidate of the block C, a combined motion information candidate of the block E, a bidirectional combined motion information candidate whose reference direction is L0, and a bidirectional combined motion information candidate whose reference direction is L1 are all valid.

FIG. 19B shows a case in which when combined motion information candidates contain invalid blocks, the merge index is assigned in ascending order of merge candidate number by skipping invalid merge candidate numbers. If, as shown in FIG. 19B, combined motion information candidates of the block B whose merge candidate number is 1 and the block E whose merge candidate number is 4 are invalid, the merge index 0 is converted into the merge candidate number 0, the merge index 1 is converted into the merge candidate number 2, the merge index 2 is converted into the merge candidate number 3, the merge index 3 is converted into the merge candidate number 5, and the merge index 4 is converted into the merge candidate number 6. As shown above, the merge indexes of the bidirectional combined motion information candidate (BD0) whose reference direction is L0 and the bidirectional combined motion information candidate (BD1) whose reference direction is L1 are assigned so as to be larger than the merge indexes of unidirectional combined motion information candidates.

In the moving picture decoding device 200 that decodes a bitstream generated by the moving picture encoding device 100 according to the first embodiment, a reverse conversion from the merge index into the merge candidate number is performed to generate the consistent and identical candidate number management table in the moving picture encoding device 100 and the moving picture decoding device 200.

(Operation of the Moving Picture Encoding Device 100)

Figure 20:
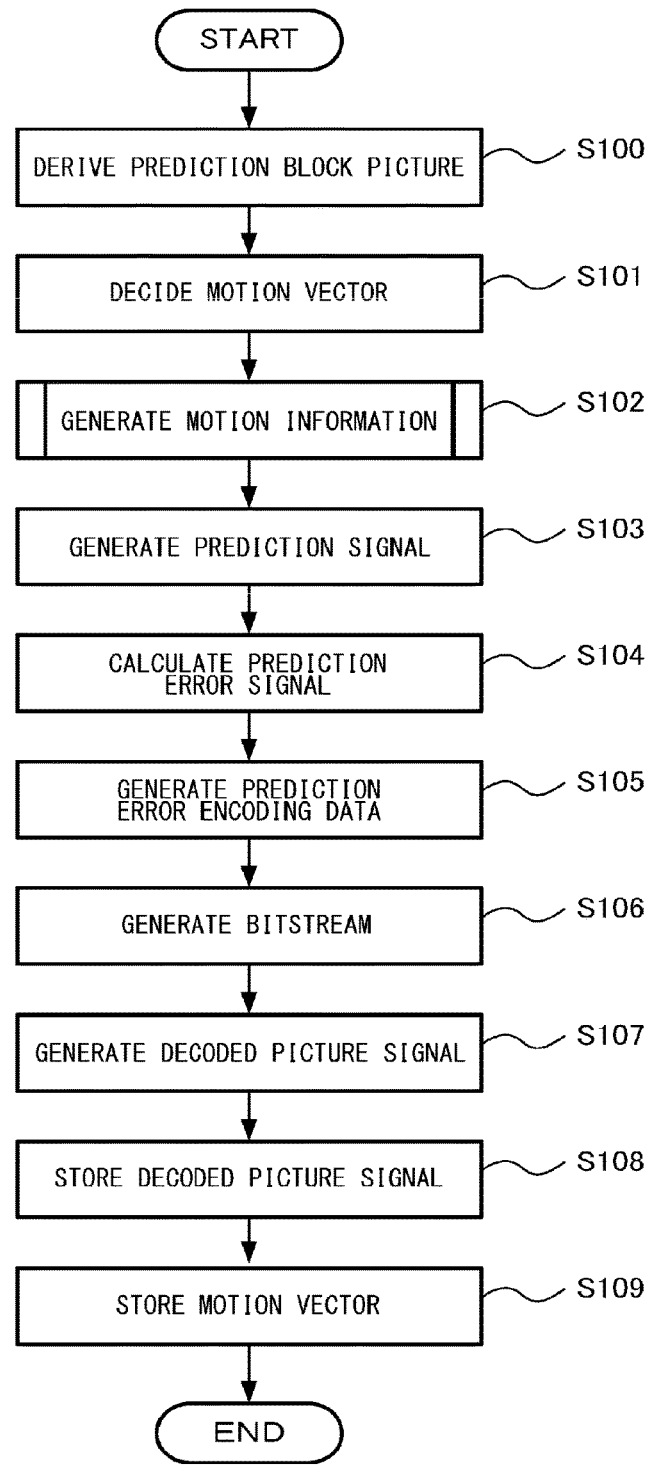
FIG. 20 is a flow chart illustrating an operation of encoding of the moving picture encoding device according to the first embodiment of the present invention.

Subsequently, the operation of encoding by the moving picture encoding device 100 according to the first embodiment will be described using the flow chart in FIG. 20. The prediction block picture deriving unit 101 derives a picture signal of the prediction block to be processed from a picture signal supplied from the terminal 10 based on position information of the prediction block and the prediction block size (S100).

The motion vector detection unit 108 detects a motion vector and a reference picture index indicating a reference picture from the picture signal supplied by the prediction block picture deriving unit 101 and a picture signal corresponding to a plurality of reference pictures (S101).

The motion information generator 109 generates a merge candidate number, or a vector difference and a vector predictor index from the motion vector and reference picture index supplied from the motion vector detection unit 108 and a candidate block group supplied by the motion information memory 111 (S102).

The motion compensation unit 106 generates a prediction signal by making motion compensation for the reference picture in the frame memory 110 indicated by the reference picture index based on the motion vector supplied by the motion vector detection unit 108. If the prediction direction is bidirectional, an average of prediction signals in the L0 direction and the L1 direction is generated as a prediction signal (S103).

The subtraction unit 102 calculates a difference between the picture signal supplied by the prediction block picture deriving unit 101 the prediction signal supplied by the motion compensation unit 106 to calculate a prediction error signal (S104). The prediction error encoder 103 generates prediction error coding data by performing processing such as quantization and orthogonal transformation on the prediction error signal supplied by the subtraction unit 102 (S105).

The bitstream generator 104 generates a bitstream by entropy-encoding the prediction error coding data supplied by the prediction error encoder 103 and the merge flag, merge candidate number, reference picture index, vector difference, and vector predictor index supplied by the motion information generator 109 together with the prediction direction according to the syntax (S106).

The addition unit 107 generates a decoded picture signal by adding the prediction error signal supplied by the prediction error decoder 105 and the prediction signal supplied by the motion compensation unit 106 (S107). The frame memory 110 stores the decoded picture signal supplied by the addition unit 107 (S108). The motion information memory 111 stores one picture of the motion vector supplied by the motion vector detection unit 108 in the minimum prediction block size unit (S109).

Figure 21:
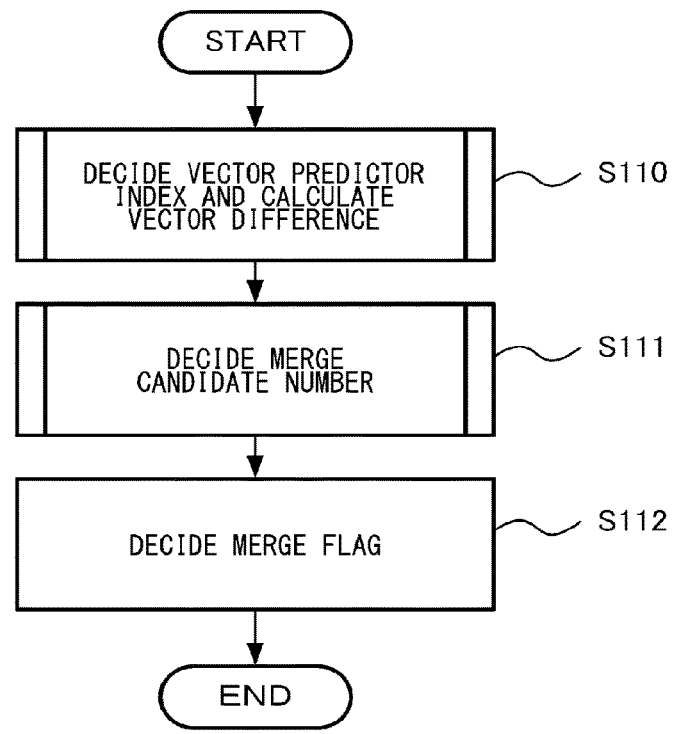
FIG. 21 is a flow chart illustrating the operation of the motion information generator in FIG. 9.

Subsequently, the operation of the motion information generator 109 will be described using the flow chart in FIG. 21. The vector difference calculation unit 120 decides a vector predictor index from a candidate block group supplied from the terminal 12, a motion vector and a reference picture index supplied from the terminal 13, a reference picture supplied from the terminal 14, and a picture signal supplied from the terminal 15 to calculate a vector difference and a rate distortion evaluation value (S110).

The combined motion information decision unit 121 decides a merge candidate number from the candidate block group supplied from the terminal 12, the reference picture supplied from the terminal 14, and the picture signal supplied from the terminal 15 to calculate a rate distortion evaluation value (S111).

The prediction coding mode decision unit 122 compares the rate distortion evaluation value supplied by the vector difference calculation unit 120 and the rate distortion evaluation value supplied by the combined motion information decision unit 121. If the former is smaller than the latter, the merge flag is set to "0" and otherwise, the merge flag is set to "1" (S112).

Figure 22:
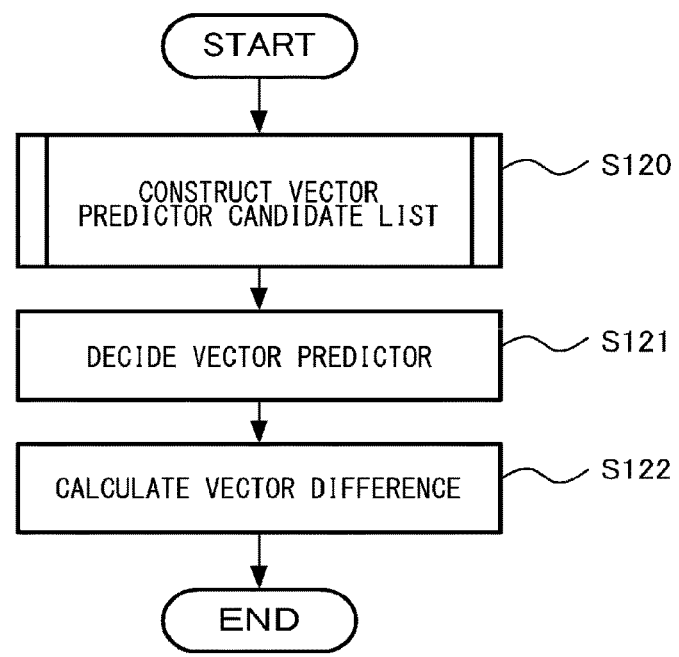
FIG. 22 is a flow chart illustrating the operation of the vector difference calculation unit in FIG. 11.

Subsequently, the operation of the vector difference calculation unit 120 will be described using the flow chart in FIG. 22. The vector predictor candidate list construction unit 130 constructs a vector predictor candidate list from candidate blocks obtained by deleting candidate blocks outside the region, candidate blocks whose mode is the intra mode, and candidate blocks having duplicate motion vectors from the candidate block group supplied from the terminal 12. If the prediction direction is bidirectional, a vector predictor candidate list is constructed for the L0 direction and the L1 direction (S120).

The vector predictor decision unit 131 selects the optimum vector predictor to the motion vector supplied from the terminal 13 from the vector predictor candidate list supplied by the vector predictor candidate list construction unit 130. If the prediction direction is bidirectional, the optimum vector predictor is selected for the L0 direction and the L1 direction (S121). The subtraction unit 132 calculates a vector difference by subtracting the vector predictor supplied by the vector predictor decision unit 131 from the motion vector supplied from the terminal 13. If the prediction direction is bidirectional, a vector difference is calculated and supplied for the L0 direction and the L1 direction (S122).

(Operation of the Combined Motion Information Decision Unit 121)

Figure 23:
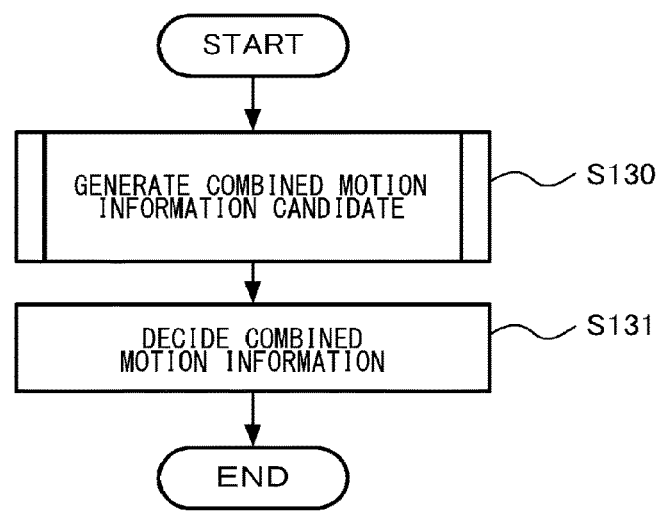
FIG. 23 is a flow chart illustrating the operation of the combined motion information decision unit in FIG. 11.

Subsequently, the operation of the combined motion information decision unit 121 will be described in detail using the flow chart in FIG. 23. The combined motion information candidate generator 140 constructs a combined motion information candidate list from a candidate block group supplied from the terminal 12 (S130). The combined motion information selection unit 141 decides the optimum combined motion information to the motion vector reference picture index, and prediction direction supplied from the terminal 13 from the combined motion information candidate generator 140 (S131).

(Operation of the Combined Motion Information Candidate Generator 140)

Figure 24:
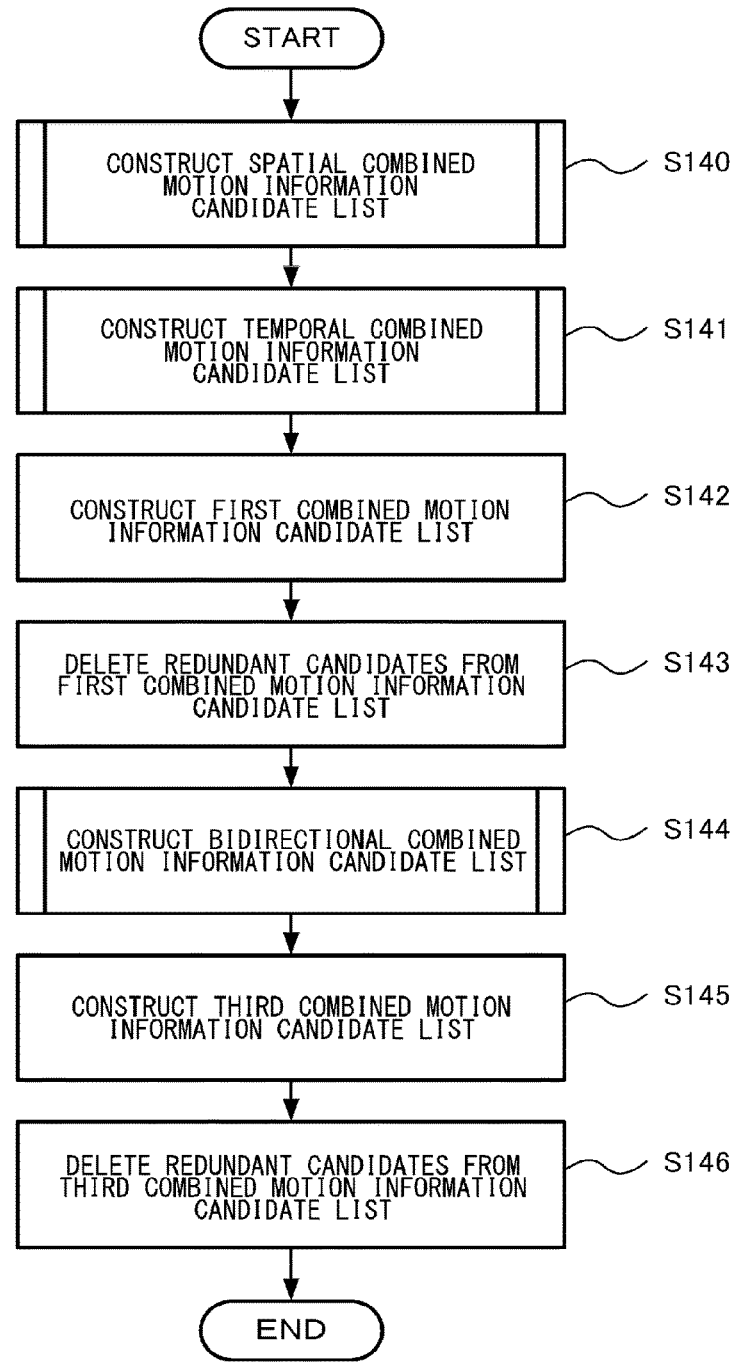
FIG. 24 is a flow chart illustrating the operation of the bidirectional combined motion information candidate list construction unit in FIG. 16.

Subsequently, the operation of the combined motion information candidate generator 140 will be described in detail using the flow chart in FIG. 24. The unidirectional combined motion information candidate list construction unit 150 constructs a spatial combined motion information candidate list from candidate blocks obtained by deleting candidate blocks outside the region and candidate blocks whose mode in the intra mode from a spatial candidate block group supplied from the terminal 12 (S140). A detailed operation of constructing a spatial combined motion information candidate list will be described later.

The unidirectional combined motion information candidate list construction unit 150 constructs a temporal combined motion information candidate list from candidate blocks obtained by deleting candidate blocks outside the region and candidate blocks whose mode in the intra mode from a temporal candidate block group supplied from the terminal 12 (S141). A detailed operation of constructing a temporal combined motion information candidate list will be described later.

The unidirectional combined motion information candidate list construction unit 150 combines the spatial combined motion information candidate list and the temporal combined motion information candidate list in the order of the merge candidate number to construct a first combined motion information candidate list (S142).

If a plurality of combined motion information candidates having duplicate motion information is present in the first combined motion information candidate list supplied by the unidirectional combined motion information candidate list construction unit 150, the first combined motion information candidate list deletion unit 151 constructs a second combined motion information candidate list by retaining one combined motion information candidate while deleting other combined motion information candidates (S143).

The bidirectional combined motion information candidate list construction unit 152 constructs a bidirectional combined motion information candidate list from the second combined motion information candidate list supplied by the first combined motion information candidate list deletion unit 151 (S144). A detailed operation of constructing a bidirectional combined motion information candidate list will be described later.

The bidirectional combined motion information candidate list construction unit 152 constructs a third combined motion information candidate list by combining the second combined motion information candidate list and the bidirectional combined motion information candidate list in the order of merge candidate number (S145).

If a plurality of combined motion information candidates having duplicate motion information is present in the third combined motion information candidate list supplied by the bidirectional combined motion information candidate list construction unit 152, the second combined motion information candidate list deletion unit 153 constructs a combined motion information candidate list by retaining one combined motion information candidate while deleting other combined motion information candidates (S146).

Figure 25:
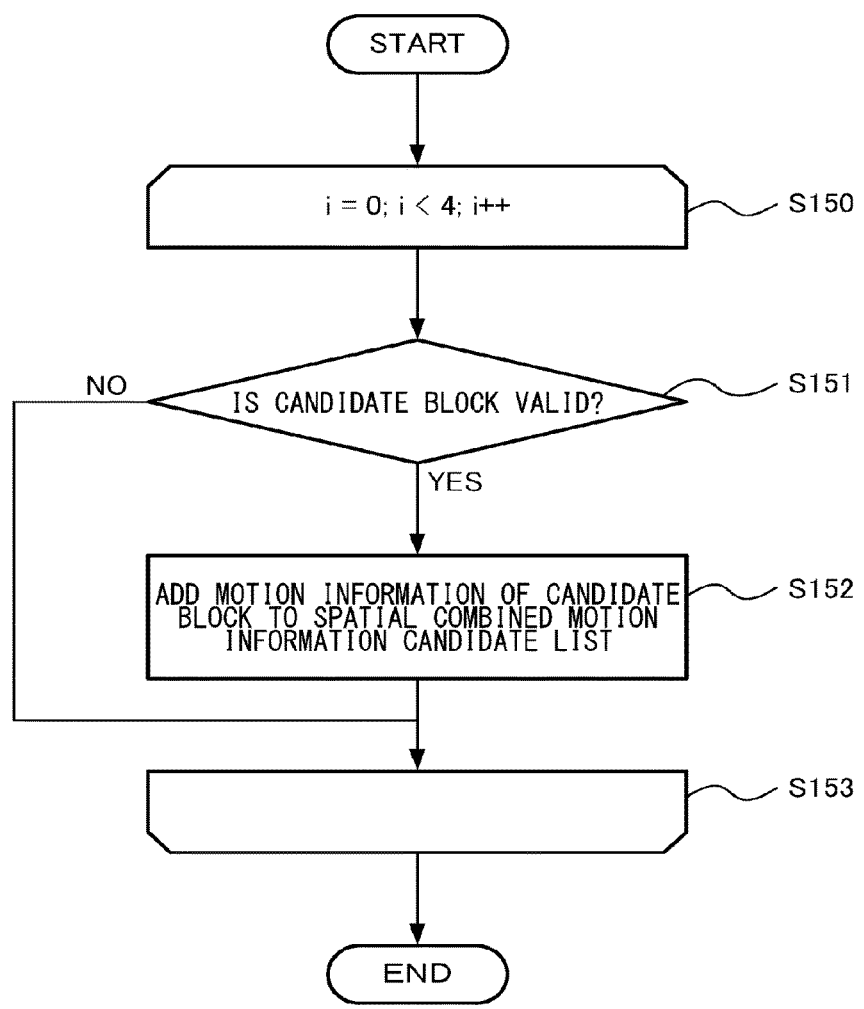
FIG. 25 is a flow chart illustrating the operation of constructing a spatial combined motion information candidate list.

Subsequently, a detailed operation of constructing a spatial combined motion information candidate list will be described using the flow chart in FIG. 25. In the first embodiment, it is assumed that the spatial combined motion information candidate list contains motion information of smaller than or equal to four candidate blocks.

The following processing is repeatedly performed for the block A, block B, block C, and block E as the four candidate blocks contained in the spatial candidate block group (S150 to S153). Whether each candidate block is valid is inspected (S151). If a candidate block is not outside the region and whose mode is not the intra mode, the candidate block is valid. If a candidate block is valid (YES in S151), motion information of the candidate block is added to the spatial combined motion information candidate list (S152). If a candidate block is not valid (NO in S151), step S152 is skipped.

In the first embodiment, it is assumed that motion information of smaller than or equal to four candidate blocks is contained in the spatial combined motion information candidate list, but it is only necessary that the number of candidate blocks in the spatial combined motion information candidate list should fluctuate depending on validity of the candidate block and the present embodiment is not limited to the above example.

Figure 26:
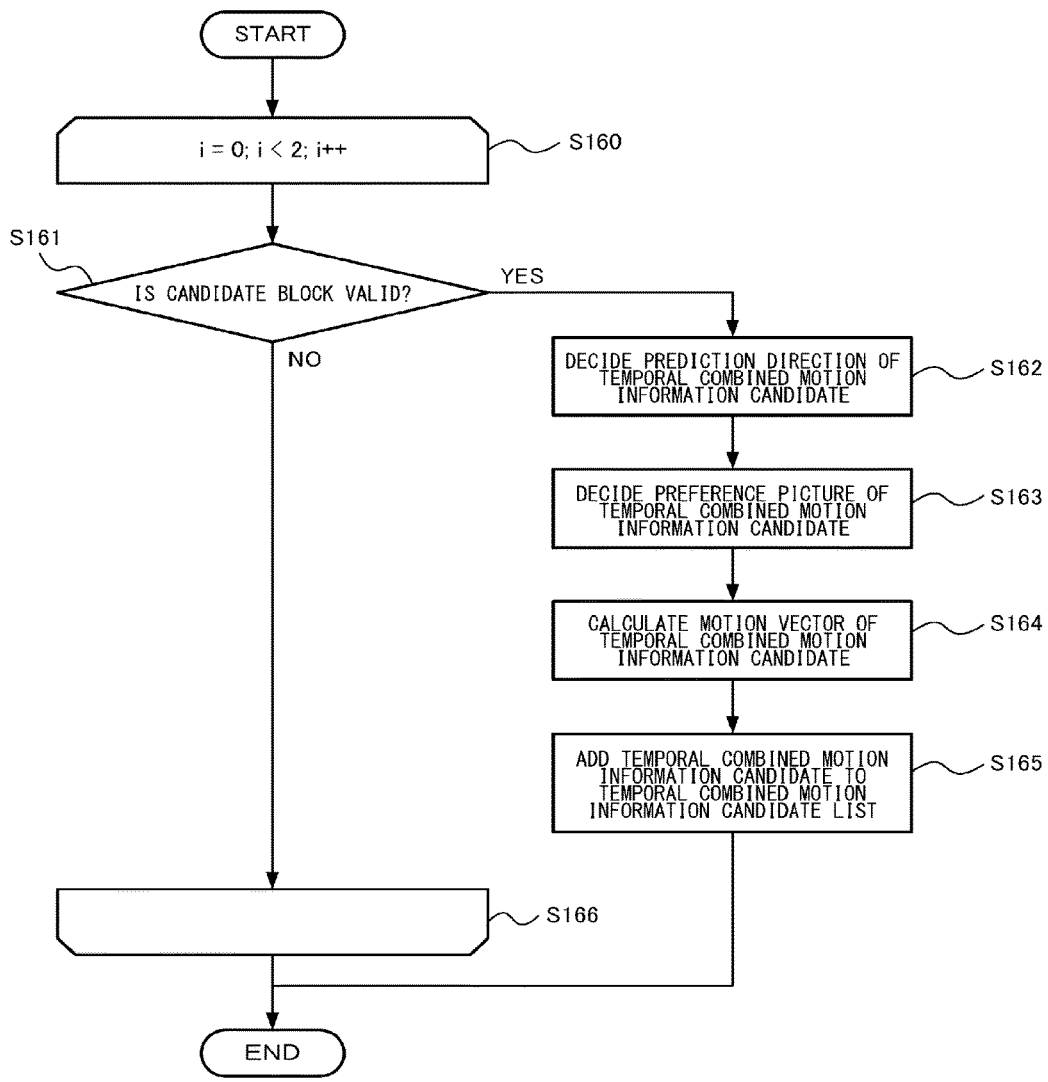
FIG. 26 is a flow chart illustrating the operation of constructing a temporal combined motion information candidate list.

Subsequently, a detailed operation of constructing a temporal combined motion information candidate list will be described using the flow chart in FIG. 26. In the first embodiment, it is assumed that the temporal combined motion information candidate list contains motion information of smaller than or equal to one candidate block.

The following processing is repeatedly performed for temporal blocks as two candidate blocks contained in the temporal candidate block group (S160 to S166). Whether each candidate block is valid is inspected (S161). If a candidate block is not outside the region and whose mode is not the intra mode, the candidate block is valid. If a candidate block is valid (YES in S161), a temporal combined motion information candidate is generated and the temporal combined motion information candidate is added to the temporal combined motion information candidate list (step S162 to step S165) before the processing being terminated. If a candidate block is not valid (NO in S161), the next candidate block is inspected (S166).

If a candidate block is valid, the prediction direction of a temporal combined motion information candidate is decided (S162). In the first embodiment, the prediction direction of a temporal combined motion information candidate is assumed to be bidirectional. Next, the reference picture in the L0 direction and the L1 direction of the temporal combined motion information candidate is decided (S163). In the first embodiment, the reference picture closest to the processing target picture of reference pictures in the L0 direction is defined as the reference picture in the L0 direction and the reference picture closest to the processing target picture of reference pictures in the L1 direction is defined as the reference picture in the L1 direction. While the reference picture closest to the processing target picture of reference pictures in the L0 direction is defined as the reference picture in the L0 direction and the reference picture closest to the processing target picture of reference pictures in the L1 direction is defined as the reference picture in the L1 direction here, it is only necessary to be able to decide the reference picture in the L0 direction and the reference picture in the L1 direction and the present embodiment is not limited to the above example. For example, reference pictures in the L0 direction or the L1 direction in a bitstream may be encoded, reference picture indexes in the L0 direction or the L1 direction may be set to 0, or most frequently used reference pictures of reference pictures in the L0 direction and reference pictures in the L1 direction used by neighboring blocks of the processing target block may be set as the reference picture in the L0 direction and the L1 direction respectively.

Next, a motion vector of the temporal combined motion information candidate is calculated (S164). For the temporal combined motion information candidate in the present embodiment, bidirectional motion information is calculated in reference to a reference picture ColRefPic and a motion vector mvCol in the prediction direction valid in motion information of the candidate block. If the prediction direction of the candidate block is unidirectional (the L0 direction of the L1 direction), a reference picture and a motion vector in the prediction direction are selected as a reference. If the prediction direction of the candidate block is bidirectional, a reference picture and a motion vector in one of the L0 direction and the L1 direction are selected as a reference. Various selections such as selecting a reference picture and a motion vector present in the same time direction as ColPic as a reference, selecting a reference image in the L0 direction or the L1 direction of the candidate block having a shorter inter-picture distance to ColPic as a reference, and selecting a motion vector in the L0 direction or the L1 direction of the candidate block crossing the processing target image as a reference can be considered. After the reference picture and the motion vector to be a reference for generating bidirectional motion information are selected, a motion vector of the temporal combined motion information candidate is calculated.

The temporal combined motion information candidate is generated as described above here, but it is only necessary to be able to decide bidirectional motion information by using motion information of another encoded picture and the present embodiment is not limited to the above example. For example, as is the case with the direct motion compensation, a motion vector scaled in accordance with the distance between the reference picture in each direction and the processing target picture may be used as a bidirectional motion vector. If a candidate block is not valid (NO in S163), the next candidate block is inspected (S165).

It is assumed here that the temporal combined motion information candidate list contains motion information of smaller than or equal to one candidate block, but it is only necessary that the number of candidate blocks in the temporal combined motion information candidate list should fluctuate depending on validity of the candidate block and the present embodiment is not limited to the above example. The decision methods of the prediction direction, the reference picture, and the motion vector are similarly not limited to the above examples.

(Construction of a Bidirectional Combined Motion Information Candidate List)

Figure 27:
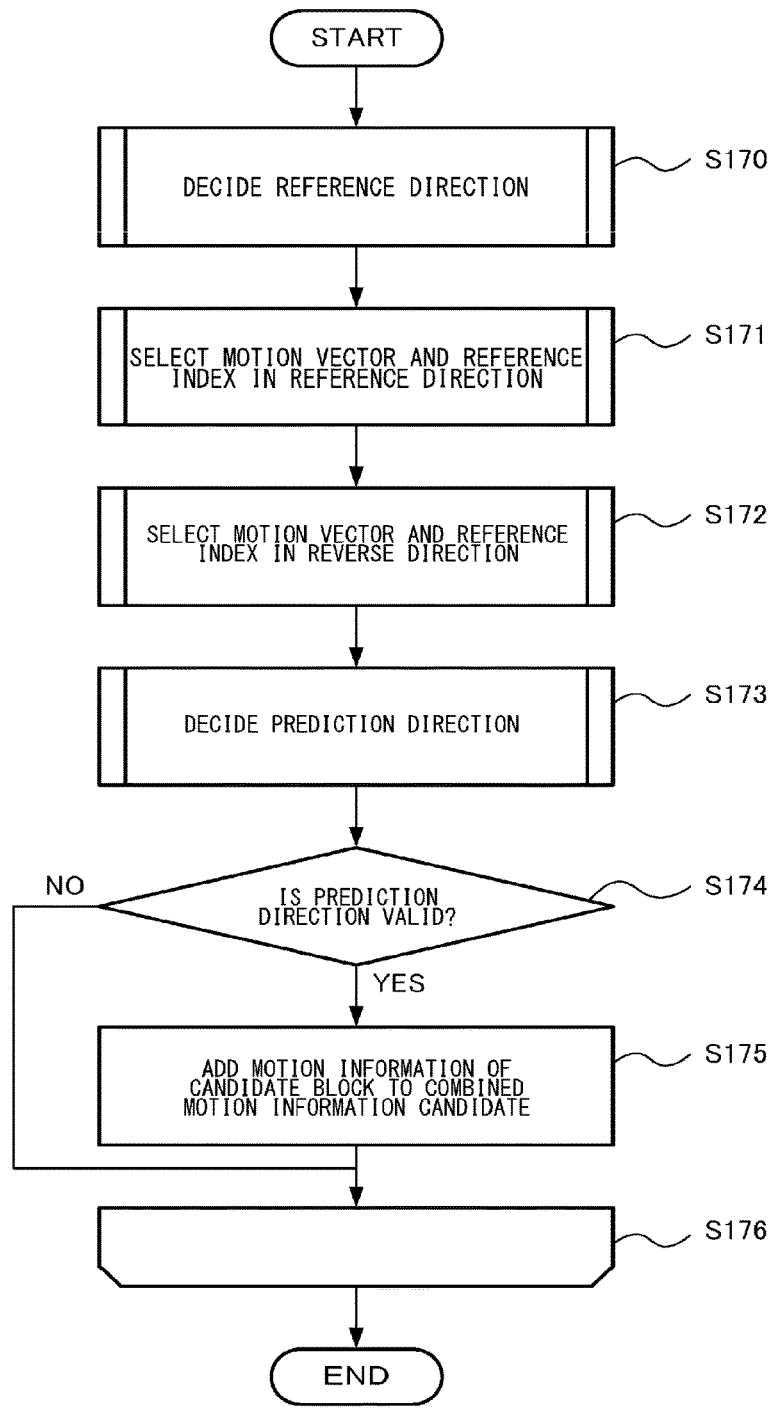
FIG. 27 is a flow chart illustrating the operation of constructing a bidirectional combined motion information candidate list.

Subsequently, a detailed operation of constructing a bidirectional combined motion information candidate list will be described using the flow chart in FIG. 27. It is assumed that the bidirectional combined motion information candidate list is empty. The reference direction decision unit 160 decides the reference direction of a bidirectional combined motion information candidate from a second combined motion information candidate list (S170). The reference direction for the bidirectional combined motion information candidate (BD0) whose reference direction is L0 is the L0 direction and the reference direction for the bidirectional combined motion information candidate (BD1) whose reference direction is L1 is the L1 direction.

The reference direction motion information decision unit 161 decides a motion vector and a reference picture index in the reference direction of the bidirectional combined motion information candidate from the reference direction and the second combined motion information candidate list supplied by the reference direction decision unit 160 (S171). A detailed operation of the reference direction motion information decision unit 161 will be described later.

The reverse direction motion information decision unit 162 decides a motion vector and a reference picture index in the reverse direction of the bidirectional combined motion information candidate from the reference direction, the motion vector and the reference picture index in the reference direction, and the second combined motion information candidate list supplied by the reference direction motion information decision unit 161 (S172). A detailed operation of the reverse direction motion information decision unit 162 will be described later.

The bidirectional motion information decision unit 163 decides the prediction direction of the bidirectional combined motion information candidate from the motion vector and the reference picture index in the reference direction and the motion vector and the reference picture index in the reverse direction supplied by the reverse direction motion information decision unit 162 (S173). A detailed operation of deciding the prediction direction of a bidirectional combined motion information candidate list will be described later.

The bidirectional motion information decision unit 163 inspects the validity of the prediction direction of the bidirectional combined motion information candidate is valid (S174). If the prediction direction of the bidirectional combined motion information candidate is valid (YES in S174), the bidirectional motion information decision unit 163 adds the bidirectional combined motion information candidate to the bidirectional combined motion information candidate list (S175). If the prediction direction of the bidirectional combined motion information candidate is invalid (NO in S174), step S175 is skipped.

Subsequently, a detailed operation of the reference direction motion information decision unit 161 will be described using the flow chart in FIG. 28. It is assumed that the LX direction (X is 0 or 1) is selected as the reference direction of the bidirectional combined motion information candidate. The validity of LX as the reference direction is set to "0" (S190). The following processing is repeated as many times as the number (NCands) of combined motion information candidates contained in the second combined motion information candidate list (S191 to S194). The validity of the LX direction of a combined motion information candidate is inspected (S192). If the LX direction of the combined motion information candidate is valid (YES in S192), the validity of LX as the reference direction is set to "1" and a motion vector and a reference index in the reference direction are set as a motion vector and a reference index in the LX direction of the combined motion information candidate before the processing being terminated (S193). If the LX direction of the combined motion information candidate is invalid (NO in S192), the next candidate is inspected (S194).

It is assumed here that inspection is carried out as many times as the number (NCands) of combined motion information candidates contained in the second combined motion information candidate list, but it is only necessary to be able to decide motion information in the reference direction of the bidirectional combined motion information candidate and the present embodiment is not limited to the above example. When, for example, bidirectional combined motion information candidates are generated only from combined motion information candidates with a high selection rate, throughput can be reduced by fixing the number of times of inspection to 2 or 3 and also code amount of merge indexes can be reduced by lowering the possibility of generating redundant bidirectional combined motion information candidates.

Figure 29:
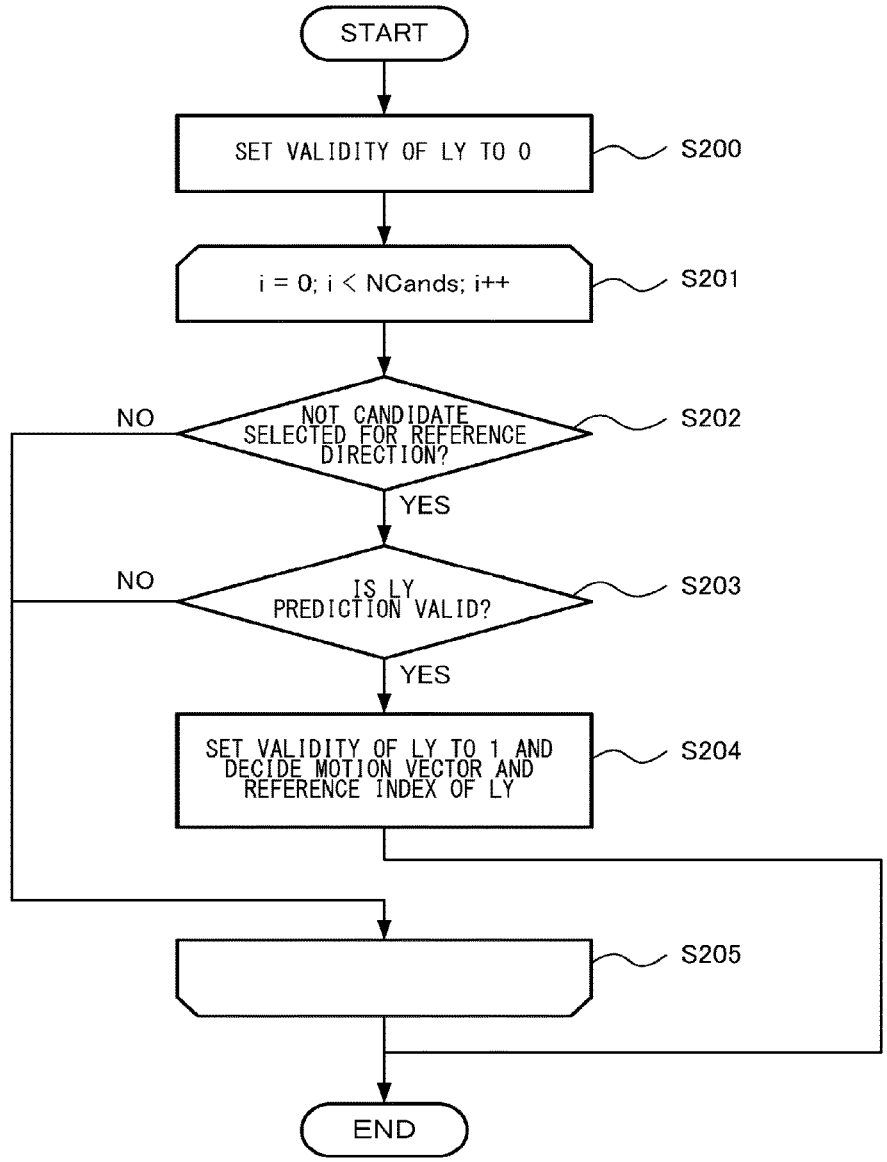
FIG. 29 is a flow chart illustrating the operation of a reverse direction motion information decision unit in FIG. 17.

Subsequently, a detailed operation of the reverse direction motion information decision unit 162 will be described using the flow chart in FIG. 29. The reverse direction of the reference direction is set as the reverse direction of the bidirectional combined motion information candidate. It is assumed that the LY direction (Y is 0 or 1) is selected. The validity of LY as the reverse direction is set to "0" (S200). The following processing is repeated as many times as the number (NCands) of combined motion information candidates contained in the second combined motion information candidate list (S201 to S205).

That the combined motion information candidate is not a candidate selected for the reference direction is checked (S202). If the combined motion information candidate is different from a candidate selected for the reference direction (YES in S202), the validity of the LY direction of the combined motion information candidate is inspected (S203). If the LY direction of the combined motion information candidate is valid (YES in S203), the validity of LY as the reverse direction is set to "1" and a motion vector and a reference index in the reverse direction are set as a motion vector and a reference index in the LY direction of the combined motion information candidate before the processing being terminated (S204). If the combined motion information candidate is a candidate selected for the reference direction (NO in S202) or the LY direction of the combined motion information candidate is invalid (NO in S203), the next candidate is inspected (S205).

It is assumed here that inspection is carried out as many times as the number (NCands) of combined motion information candidates contained in the second combined motion information candidate list, but it is only necessary to be able to decide motion information in the reverse direction of the bidirectional combined motion information candidate and the present embodiment is not limited to the above example. When, for example, bidirectional combined motion information candidates are generated only from combined motion information candidates with a high selection rate, throughput can be reduced by fixing the number of times of inspection to 2 or 3 and also code amount of merge indexes can be reduced by lowering the possibility of generating redundant bidirectional combined motion information candidates. In addition, by selecting the block where the inspection is started as the next combined motion information candidate of the combined motion information candidate selected in the reference direction, the possibility that BD0 and BD1 are the same is eliminated and so step S202 can be cut.

Subsequently, a detailed operation of deciding the prediction direction of a bidirectional combined motion information candidate will be described using the table in FIG. 30. If both of the LX direction and the LY direction are valid, the prediction direction is bidirectional (BI), if only the LX direction is valid, the prediction direction is unidirectional (LX direction), if only the LY direction is valid, the prediction direction is unidirectional (LY direction), and if both of the LX direction and the LY direction are invalid, the prediction direction is invalid. That is, when both of the LX direction and the LY direction are valid, a new bidirectional combined motion information candidate is generated after a combined motion information candidate having motion information in the LX direction and a combined motion information candidate having motion information in the LY direction, which is different from the combined motion information candidate having motion information in the LX direction, being combined. When only the LX direction is valid, if the prediction direction of a combined motion information candidate having a valid LX prediction is a bidirectional prediction, the prediction direction of the combined motion information candidate is converted into a unidirectional prediction. Similarly, when only the LY direction is valid, if the prediction direction of a combined motion information candidate having a valid LY prediction is a bidirectional prediction, the prediction direction of the combined motion information candidate is converted into a unidirectional prediction.

It is assumed here that the decision of the prediction direction of a bidirectional combined motion information candidate follows FIG. 30, but it is only necessary to be able to decide the prediction direction and the present embodiment is not limited to the above example. FIGS. 31A to 31C show extension examples of the decision of the prediction direction of bidirectional combined motion information candidates. For example, as shown in FIG. 31A, the prediction direction may be invalidated if at least one of the LX direction and the LY direction is invalid or, as shown in FIGS. 31B and 31C, the prediction direction may be forced to be bidirectional.

When the precision of a motion vector is relatively high, the prediction efficiency of a bidirectional prediction is generally higher than that of a unidirectional prediction. Thus, if not both of the LX direction and the LY direction are valid in FIG. 31A, the code amount of merge indexes can be reduced by invalidating the prediction direction of a bidirectional combined motion information candidate to reduce the number of combined motion information candidates. If, for example, there is a bidirectional prediction candidate among unidirectional combined motion information candidates, adaptation processing to invalidate the prediction direction of the bidirectional combined motion information candidate may be adopted.

In FIG. 31B, a motion vector whose prediction direction is invalid is set to (0, 0) and a reference index is set to "0". In this manner, a bidirectional combined motion information candidate can be forced to be bidirectional by setting a reference picture of the shortest distance as a prediction signal. This is because "0" of the reference index generally is the reference picture closest to the processing target picture and the reliability of the prediction signal of the shortest distance is the highest.

(Configuration of the Moving Picture Decoding Device 200)

Figure 32:
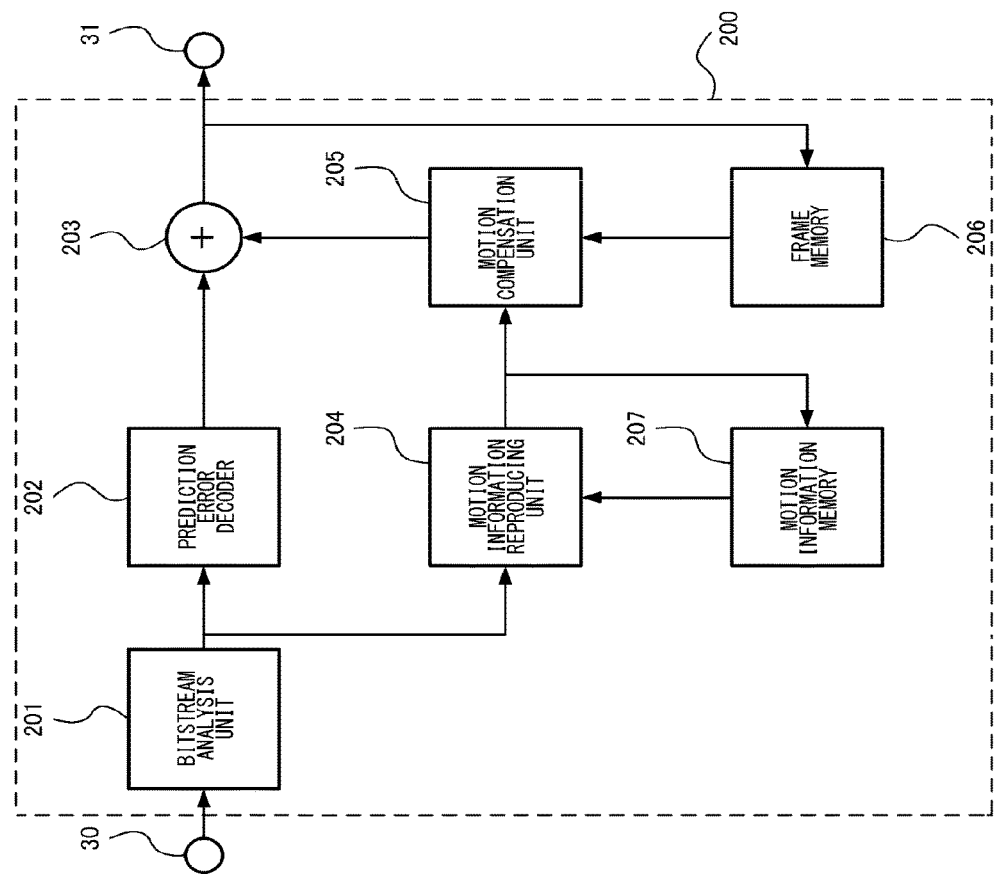
FIG. 32 is a diagram illustrating the configuration of a moving picture decoding device according to the first embodiment of the present invention.

Next, a moving picture decoding device according to the first embodiment will be described. FIG. 32 shows the moving picture decoding device 200 according to the first embodiment. The moving picture decoding device 200 is a device that decodes a bitstream encoded by the moving picture encoding device 100 to generate reproduced pictures.

The moving picture decoding device 200 is realized by hardware such as an information processing apparatus including a CPU (Central Processing Unit), frame memory, and hard disk. The moving picture decoding device 200 realizes functional elements described below with the above elements operating. The position information of the prediction block to be decoded and the prediction block size are assumed to be shared inside the moving picture decoding device 200 and are not illustrated. The maximum number of combined motion information candidates contained in the candidate number management table and the combined motion information candidate list is assumed to be shared in the moving picture decoding device 200 and is not illustrated.

The moving picture decoding device 200 according to the first embodiment includes a bitstream analysis unit 201, a prediction error decoder 202, an addition unit 203, a motion information reproducing unit 204, a motion compensation unit 205, a frame memory 206, and a motion information memory 207.

(Function of the Moving Picture Decoding Device 200)

The function of each unit will be described below. The bitstream analysis unit 201 decodes a bitstream supplied from a terminal 30 into prediction error coding data, a merge flag, a merge candidate number, the prediction direction of a motion compensation prediction, a reference picture index, a vector difference, and a vector predictor index according to syntax. Then, the bitstream analysis unit supplies the prediction error coding data to the prediction error decoder 202 and the merge flag, the merge candidate number, the prediction direction of a motion compensation prediction, the reference picture index, the vector difference, and the vector predictor index to the motion information reproducing unit 204. Incidentally, the merge candidate number is obtained by converting the merge index.

The prediction error decoder 202 generates a prediction error signal by performing processing such as inverse quantization and inverse orthogonal transformation on prediction error coding data supplied by the bitstream analysis unit 201 and supplies the prediction error signal to the addition unit 203.

The addition unit 203 generates a decoded picture signal by adding the prediction error signal supplied by the prediction error decoder 202 and a prediction signal supplied by the motion compensation unit 205 and supplies the decoded picture signal to the frame memory 206 and a terminal 31.

The motion information reproducing unit 204 reproduces motion information from the merge flag, merge candidate number, prediction direction of a motion compensation prediction, reference picture index, vector difference, and vector predictor index supplied by the bitstream analysis unit 201 and supplies the motion information to the motion compensation unit 205. A detailed configuration of the motion information reproducing unit 204 will be described later.

The motion compensation unit 205 generates a prediction signal by making motion compensation for a reference picture indicated by the reference picture index in the frame memory 206 based on motion information supplied by the motion information reproducing unit 204. If the prediction direction is bidirectional, an average of prediction signals in the L0 direction and the L1 direction is generated as a prediction signal and the prediction signal is supplied to the addition unit 203.

The frame memory 206 and the motion information memory 207 have the same functions as the frame memory 110 and the motion information memory 111 of the moving picture encoding device 100.

(Detailed Configuration of the Motion Information Reproducing Unit 204)

Figure 33:
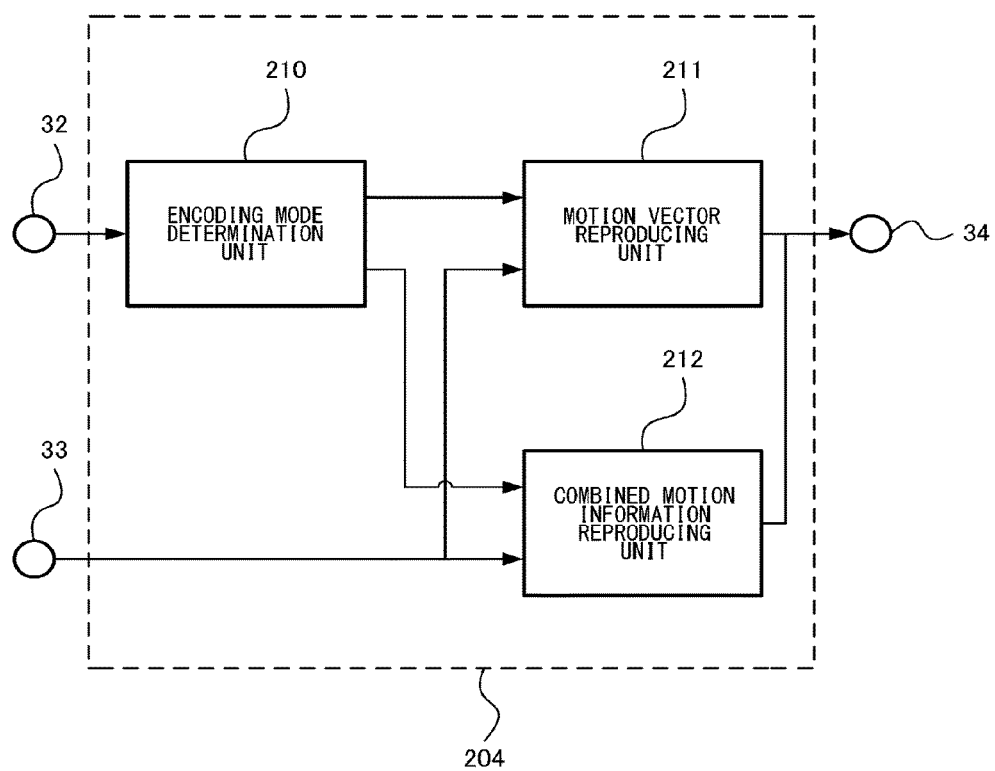
FIG. 33 is a diagram illustrating the configuration of a motion information reproducing unit in FIG. 32.

Subsequently, a detailed configuration of the motion information reproducing unit 204 featuring the first embodiment will be described using FIG. 33. FIG. 33 shows the configuration of the motion information reproducing unit 204. The motion information reproducing unit 204 includes an encoding mode determination unit 210, a motion vector reproducing unit 211, and a combined motion information reproducing unit 212. A terminal 32 is connected to the encoding mode determination unit 210, a terminal 33 is connected to the motion information memory 207, and a terminal 34 is connected to the motion compensation unit 205.

The function of each unit will be described below. If the merge flag supplied by the bitstream analysis unit 201 is "0", the encoding mode determination unit 210 supplies the prediction direction of a motion compensation prediction, a reference picture index, a vector difference, and a vector predictor index supplied by the bitstream analysis unit 201 to the motion vector reproducing unit 211. If the merge flag is "1", the encoding mode determination unit 210 supplies the merge candidate number supplied by the bitstream analysis unit 201 to the combined motion information reproducing unit 212.

The motion vector reproducing unit 211 reproduces motion information from the prediction direction of a motion compensation prediction, reference picture index, vector difference, and vector predictor index supplied by the encoding mode determination unit 210 and a candidate block group supplied from the terminal 33 and supplies the motion information to the terminal 34. A detailed configuration of the motion vector reproducing unit 211 will be described later.

The combined motion information reproducing unit 212 reproduces motion information from the merge candidate number supplied by the encoding mode determination unit 210 and the candidate block group supplied from the terminal 33 and supplies the motion information to the terminal 34. A detailed configuration of the combined motion information reproducing unit 212 will be described later.

Figure 34:
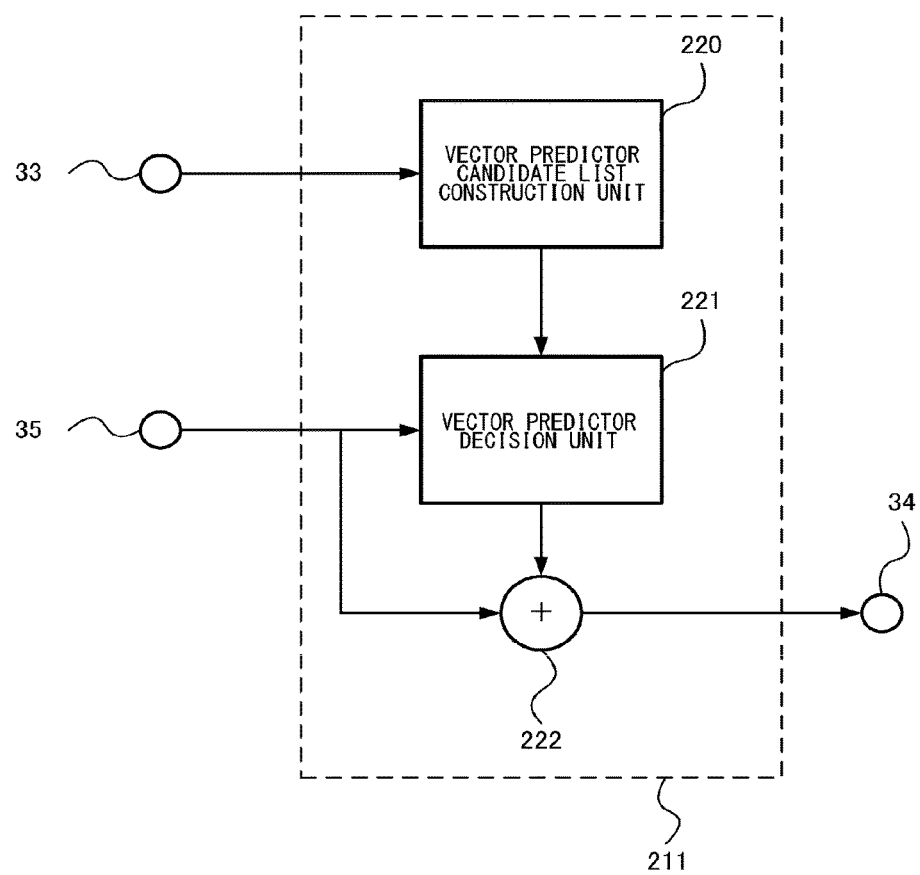
FIG. 34 is a diagram illustrating the configuration of a motion vector reproducing unit in FIG. 33.

Subsequently, a detailed configuration of the motion vector reproducing unit 211 will be described using FIG. 34. FIG. 34 shows the configuration of the motion vector reproducing unit 211. The motion vector reproducing unit 211 includes a vector predictor candidate list construction unit 220, a vector predictor decision unit 221, and an addition unit 222. A terminal 35 is connected to the encoding mode determination unit 210.

The function of each unit will be described below. The vector predictor candidate list construction unit 220 has the same function as the vector predictor candidate list construction unit 130 of the moving picture encoding device 100. The vector predictor decision unit 221 decides a vector predictor from a vector predictor candidate list supplied by the vector predictor candidate list construction unit 220 and a vector predictor index supplied from the terminal 35 and supplies the vector predictor to the addition unit 222.

The addition unit 222 calculates a motion vector by adding a vector difference supplied from the terminal 35 and the vector predictor supplied by the vector predictor decision unit 221 and supplies the motion vector to the terminal 34.

Figure 35:
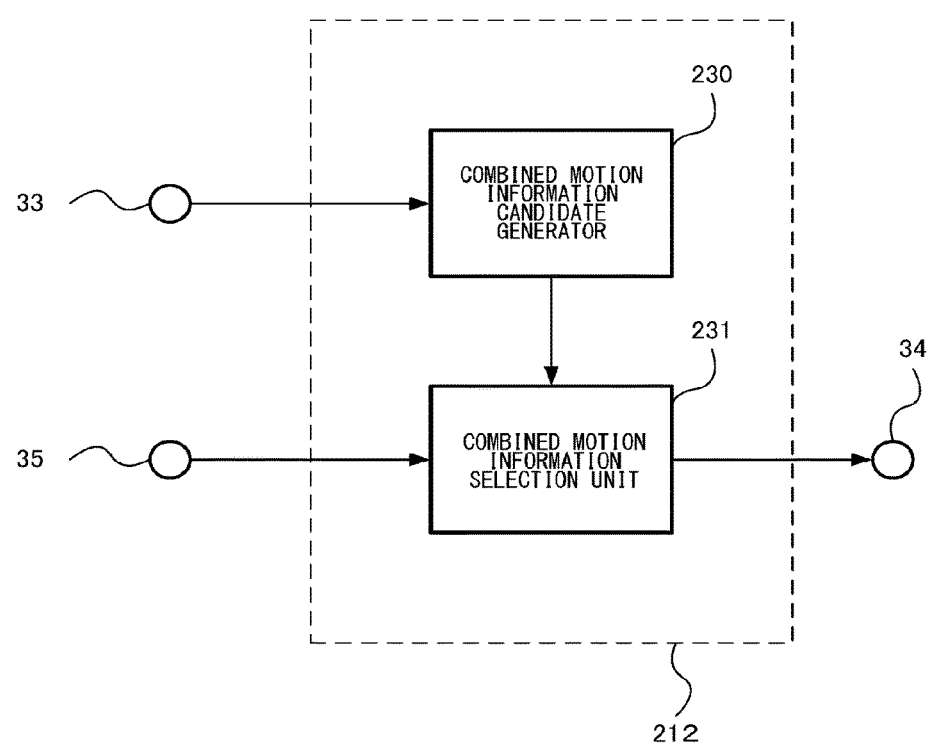
FIG. 35 is a diagram illustrating the configuration of a combined motion information reproducing unit in FIG. 33.

Subsequently, a detailed configuration of the combined motion information reproducing unit 212 will be described using FIG. 35. FIG. 35 shows the configuration of the combined motion information reproducing unit 212. The combined motion information reproducing unit 212 includes a combined motion information candidate generator 230 and a combined motion information selection unit 231.

The function of each unit will be described below. The combined motion information candidate generator 230 has the same function as the combined motion information candidate generator 140 shown in FIG. 15. The combined motion information selection unit 231 selects motion information from a combined motion information candidate list based on the combined motion information candidate list supplied by the combined motion information candidate generator 230 and a merge candidate number supplied from the terminal 35 and supplies the motion information to the terminal 34.

(Operation of the Moving Picture Decoding Device 200)

Figure 36:
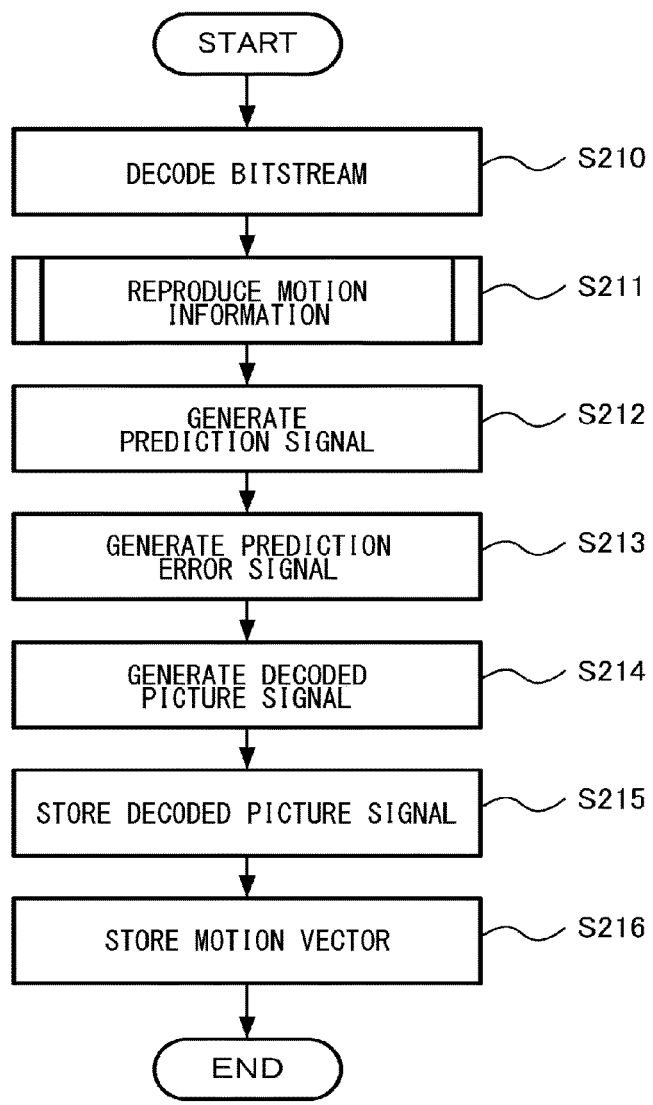
FIG. 36 is a flow chart illustrating the operation of decoding of the moving picture decoding device according to the first embodiment of the present invention.

Subsequently, the operation of decoding by the moving picture decoding device 200 according to the first embodiment will be described using the flow chart in FIG. 36. The bitstream analysis unit 201 decodes a bitstream supplied from the terminal 30 into prediction error coding data, a merge flag, a merge candidate number, the prediction direction of a motion compensation prediction, a reference picture index, a vector difference, and a vector predictor index according to syntax (S210).

The motion information reproducing unit 204 reproduces motion information from the merge flag, merge candidate number, prediction direction of a motion compensation prediction, reference picture index, vector difference, and vector predictor index supplied by the bitstream analysis unit 201 (S211).

The motion compensation unit 205 generates a prediction signal by making motion compensation for a reference picture indicated by the reference picture index in the frame memory 206 based on motion information supplied by the motion information reproducing unit 204. If the prediction direction is bidirectional, an average of prediction signals in the L0 direction and the L1 direction is generated as a prediction signal (S212).

The prediction error decoder 202 generates a prediction error signal by performing processing such as inverse quantization and inverse orthogonal transformation on prediction error coding data supplied by the bitstream analysis unit 201 (S213). The addition unit 203 generates a decoded picture signal by adding the prediction error signal supplied by the prediction error decoder 202 and the prediction signal supplied by the motion compensation unit 205 (S214).

The frame memory 206 stores the decoded picture signal supplied by the addition unit 203 (S215). The motion information memory 207 stores one picture of the motion vector supplied by the motion information reproducing unit 204 in the minimum prediction block size unit (S216).

Figure 37:
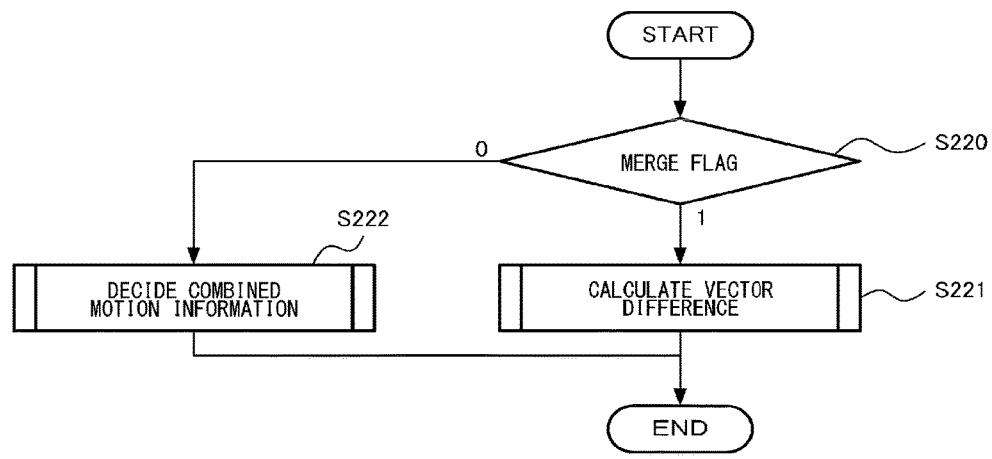
FIG. 37 is a flow chart illustrating the operation of the motion information reproducing unit in FIG. 32.

Subsequently, the operation of the motion information reproducing unit 204 will be described using the flow chart in FIG. 37. The encoding mode determination unit 210 determines whether the merge flag supplied by the bitstream analysis unit 201 is "0" or "1" (S220). If the merge flag is "1" (1 in S220), the combined motion information reproducing unit 212 reproduces motion information from a merge candidate number supplied by the encoding mode determination unit 210 and a candidate block group supplied from the terminal 33 (S221).

If the merge flag is "0" (0 in S220), the motion vector reproducing unit 211 reproduces motion information from the prediction direction of a motion compensation prediction, a reference picture index, a vector difference, and a vector predictor index supplied by the encoding mode determination unit 210 and the candidate block group supplied from the terminal 33 (S222).

Figure 38:
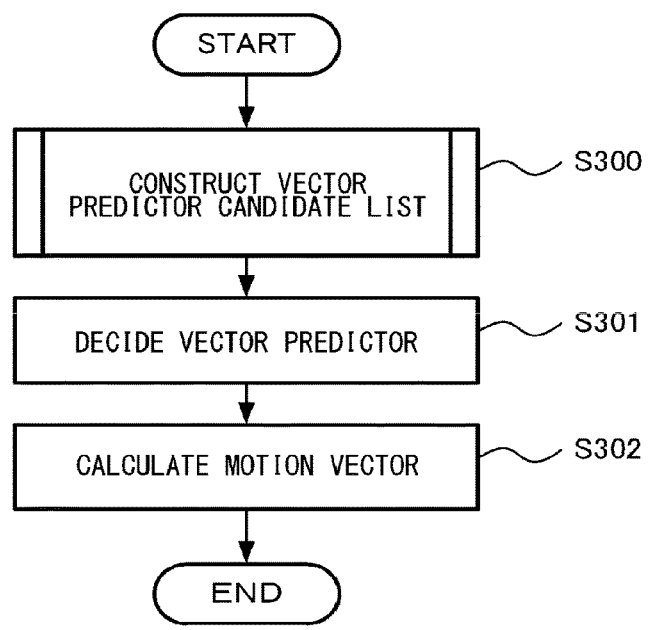
FIG. 38 is a flow chart illustrating the operation of the motion vector reproducing unit in FIG. 33.

Subsequently, the operation of the motion vector reproducing unit 211 will be described using the flow chart in FIG. 38. The vector predictor candidate list construction unit 220 constructs a vector predictor candidate list by the same function as that of the vector predictor candidate list construction unit 130 of the moving picture encoding device 100 (S300).

The vector predictor decision unit 221 decides a vector predictor by selecting the vector predictor indicated by a vector predictor index supplied from the terminal 35 from the vector predictor candidate list supplied by the vector predictor candidate list construction unit 220 (S301). The addition unit 222 calculates a motion vector by adding a vector difference supplied from the terminal 35 and the vector predictor supplied by the vector predictor decision unit 221 (S302).

Figure 39:
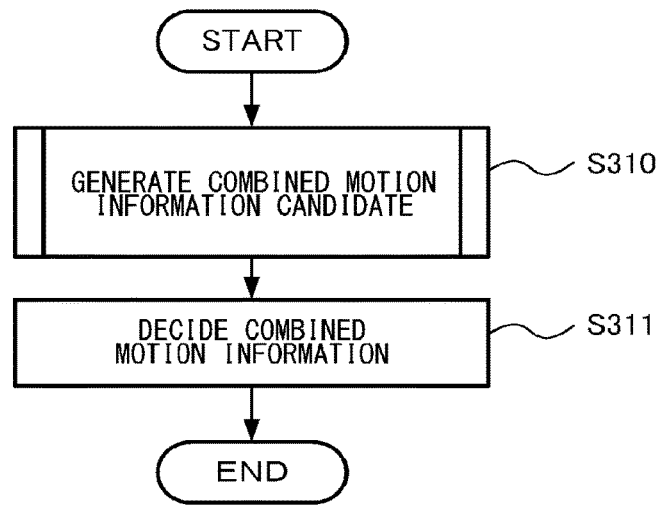
FIG. 39 is a flow chart illustrating the operation of the combined motion information reproducing unit in FIG. 33.

Subsequently, the operation of the combined motion information reproducing unit 212 will be described using the flow chart in FIG. 39. The combined motion information candidate generator 230 constructs a combined motion information candidate list by the same function as that of the combined motion information candidate generator 140 of the moving picture encoding device 100 (S310). The combined motion information selection unit 231 decides combined motion information by selecting the combined motion information candidate indicated by a merge candidate number supplied from the terminal 35 from the combined motion information candidate list supplied by the combined motion information candidate generator 230 (S311).

Modifications of the First Embodiment

The first embodiment can be modified as described below.

(First Modification: Order of the Merge Candidate Number)

In the first embodiment described above, FIG. 18 is cited as an example of the candidate number management table, it is only necessary that the maximum number of combined motion information candidates be larger than or equal to 1 and a decreasing merge candidate number be assigned to a combined motion information candidate with an increasing selection rate and the candidate number management table is not limited to FIG. 18. The maximum number of combined motion information candidates contained in the combined motion information candidate list is assumed to be 7 (the maximum number of merge indexes is 6), but the maximum number thereof only needs to be larger than or equal to 2. If, for example, the selection rate of a bidirectional combined motion information candidate is higher than the selection rate of a combined motion information candidate of the block C or the block E, the merge candidate number may be assigned as shown in FIG. 40A or 40B.

In addition, as shown in FIG. 41, the bidirectional combined motion information candidates can be increased. Each bidirectional combined motion information candidate (BD0 to BD3) will be described. It is assumed that the bidirectional combined motion information candidate (BD0) and the bidirectional combined motion information candidate (BD1) are assumed to be the same as in the first embodiment. The bidirectional combined motion information candidate (BD2) and the bidirectional combined motion information candidate (BD3) are different from the bidirectional combined motion information candidate (BD0) and the bidirectional combined motion information candidate (BD1) in the decision method of a motion vector and a reference index in the reference direction of a bidirectional combined motion information candidate in the reference direction and a motion vector and a reference index in the reference direction of a bidirectional combined motion information candidate in the reverse direction.

Figure 42:
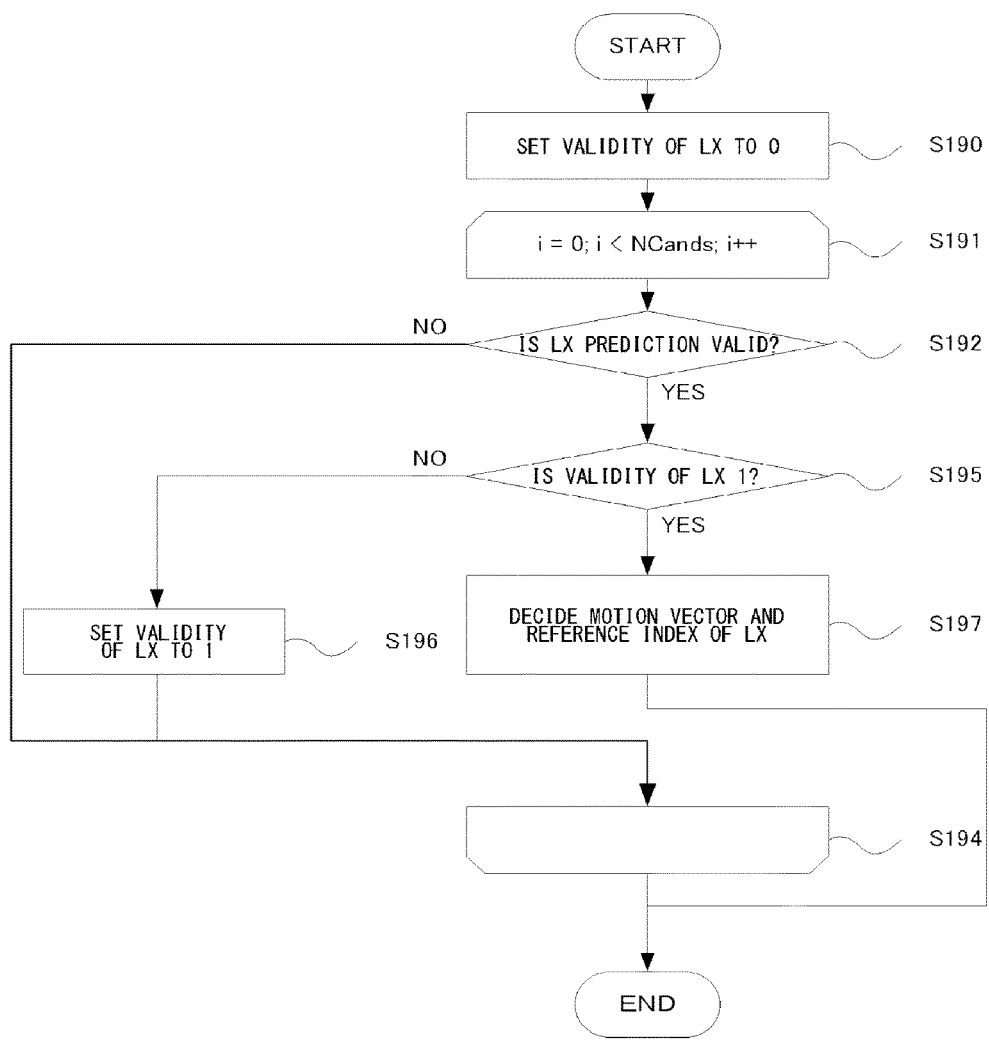
FIG. 42 is a flow chart illustrating derivation of a bidirectional combined motion information candidate (BD2)

FIG. 42 is a flow chart illustrating derivation of the bidirectional combined motion information candidate (BD2). FIG. 42 is obtained by replacing step S193 in the flow chart of FIG. 28 with steps S195 to S197. Hereinafter, steps S195 to S197 will be described. Whether the validity of LX is "1" is checked (S195). If the validity of LX is not "1" (NO in S195), the validity of LX is set to "1" (S196) and the next candidate is inspected (S194). If the validity of LX is "1" (YES in S195), a motion vector and a reference index in the reference direction are set as a motion vector and a reference index in the LX direction of the combined motion information candidate (S197) before the processing being terminated.

Figure 43:
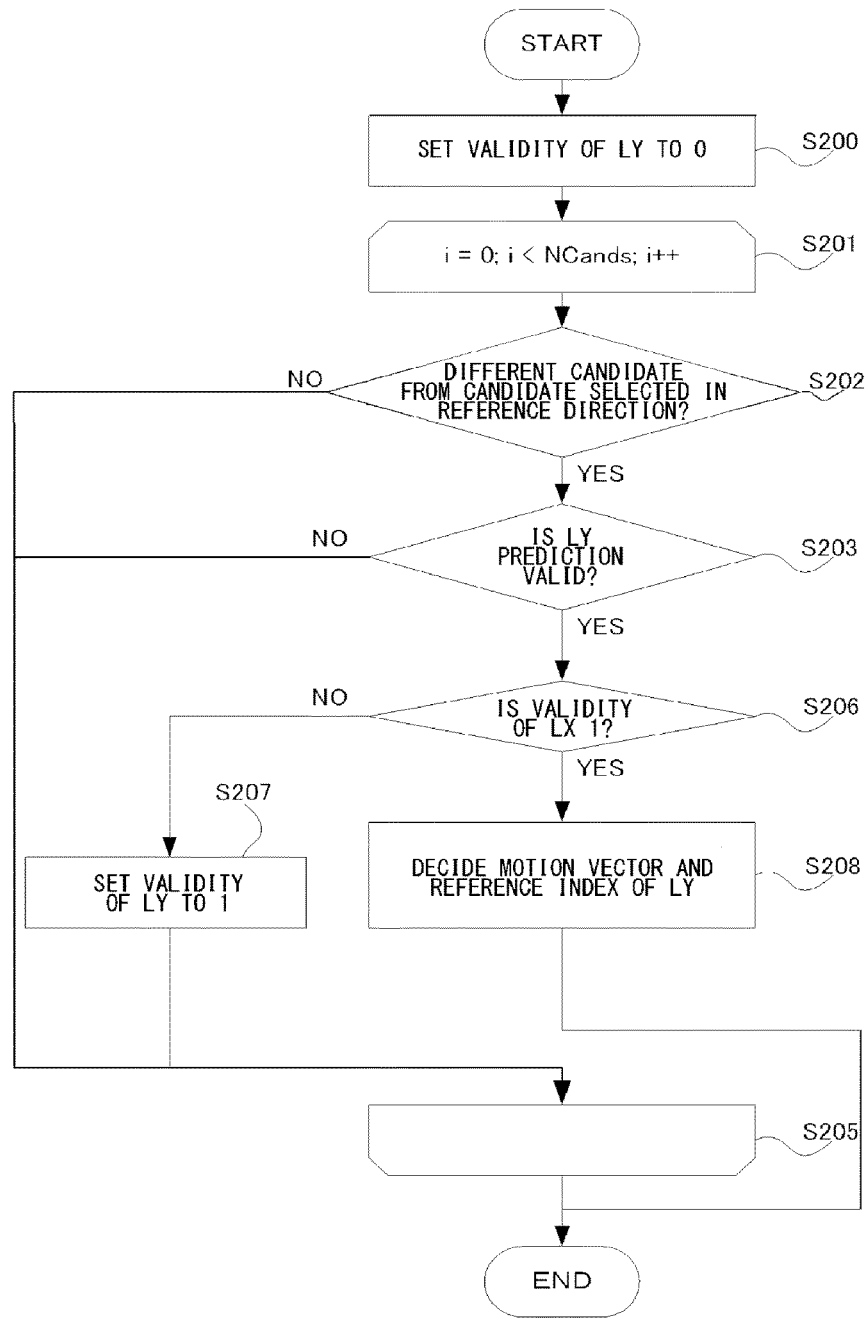
FIG. 43 is a flow chart illustrating derivation of a bidirectional combined motion information candidate (BD3)

FIG. 43 is a flow chart illustrating derivation of the bidirectional combined motion information candidate (BD3). FIG. 43 is obtained by replacing step S204 in the flow chart of FIG. 29 with steps S206 to S208. Hereinafter, steps S206 to S208 will be described. Whether the validity of LY is "1" is checked (S206). If the validity of LY is not "1" (NO in S206), the validity of LY is set to "1" (S207) and the next candidate is inspected (S205). If the validity of LY is "1" (YES in S206), a motion vector and a reference index in the reference direction are set as a motion vector and a reference index in the LY direction of the combined motion information candidate (S208) before the processing being terminated.

That is, the bidirectional combined motion information candidate (BD2) is a bidirectional combined motion information candidate using a motion vector and a reference index in the reference direction of the combined motion information candidate that becomes valid in the reference direction as the second candidate and a motion vector and a reference index in the reverse direction of the combined motion information candidate that is not the same candidate in the reference direction and becomes valid in the reverse direction as the first candidate.

That is, the bidirectional combined motion information candidate (BD3) is a bidirectional combined motion information candidate using a motion vector and a reference index in the reference direction of the combined motion information candidate that becomes valid in the reference direction as the first candidate and a motion vector and a reference index in the reverse direction of the combined motion information candidate that is not the same candidate in the reference direction and becomes valid in the reverse direction as the second candidate.

By increasing the combination of bidirectional combined motion information candidates as shown above, the encoding efficiency of motion information can be improved by increasing the selection rate of combined motion information candidates.

(Second Modification: Identity Determination of Bidirectional Combined Motion Information Candidates)

Figure 44:
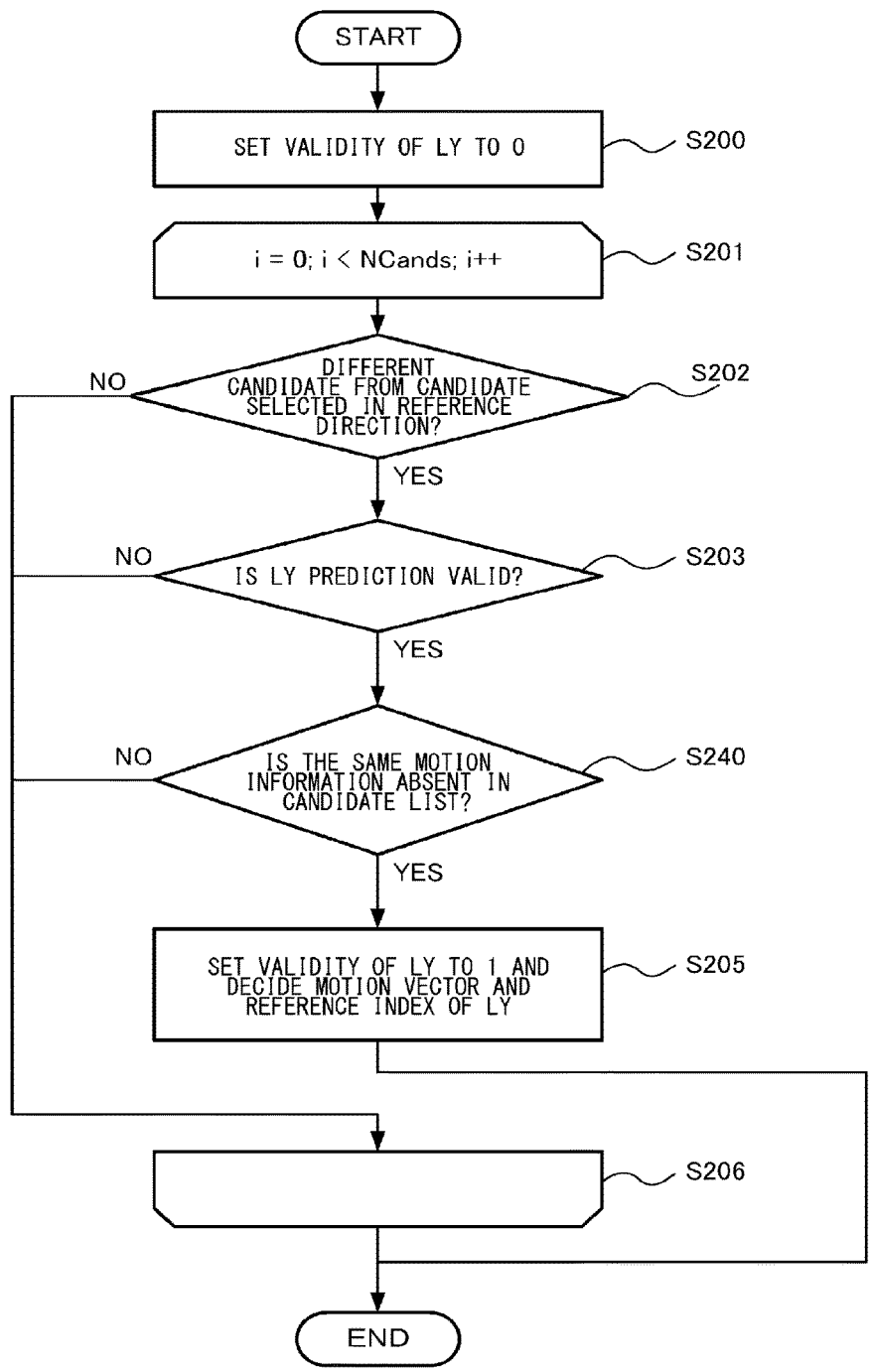
FIG. 44 is a flow chart illustrating the operation of a reverse direction motion information decision unit according to a second modification of the first embodiment.

In the first embodiment described above, FIG. 29 is cited as an operation example of the reverse direction motion information decision unit 162, but only a bidirectional combined motion information candidate needs to be generated and the present embodiment is not limited to the above example. For example, as shown in FIG. 44, step S240 is added for the purpose of increasing validity of a bidirectional combined motion information candidate, that is, preventing deletion by the second combined motion information candidate list deletion unit 153.

That a combined motion information candidate having the same motion information as that of a bidirectional combined motion information candidate using a motion vector and a reference index in the reference direction and a motion vector and a reference index in the reverse direction of the combined motion information candidate to be inspected is absent in a second combined motion information candidate list is checked (S240). If the same combined motion information candidate is absent (YES in S240), step S205 is performed. If the same combined motion information candidate is not absent (NO in S240), the next candidate is inspected (S206). In this case, the second combined motion information candidate list deletion unit 153 in FIG. 16 and step S146 in FIG. 24 can be omitted.

Accordingly, a bidirectional combined motion information candidate will not deleted by the second combined motion information candidate list deletion unit 153 and the encoding efficiency of motion information can be improved by increasing the selection rate of combined motion information candidates.

(Third Modification: Identity Determination in the Reference Direction of Bidirectional Combined Motion Information Candidates)

Figure 45:
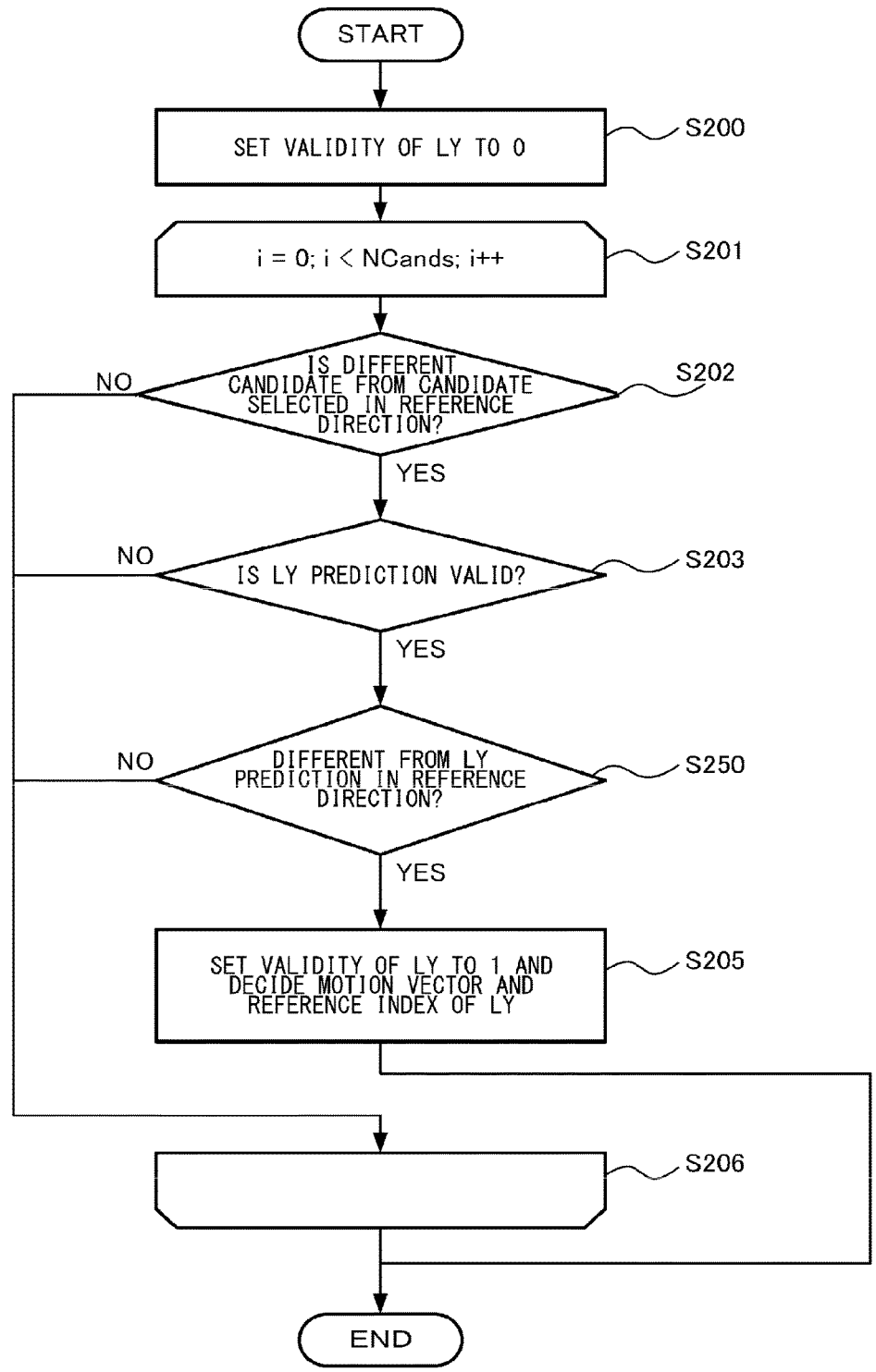
FIG. 45 is a flow chart illustrating the operation of a reverse direction motion information decision unit according to a third modification of the first embodiment.

In the first embodiment described above, FIG. 29 is cited as an operation example of the reverse direction motion information decision unit 162, but as shown in FIG. 45, step S250 may be added.

That a motion vector and a reference index in the reverse direction of a combined motion information candidate selected in the reference direction and a motion vector and a reference index in the reverse direction of the combined motion information candidate to be inspected are not the same (S250). If the motion vectors and reference indexes are not the same (YES in S250), step S205 is performed. If the motion vectors and reference indexes are the same (NO in S250), the next candidate is inspected (S206).

Accordingly, a bidirectional combined motion information candidate will not be the same as a combined motion information candidate selected in the reference direction and the encoding efficiency of motion information can be improved by increasing validity of the bidirectional combined motion information candidate and increasing the selection rate of the combined motion information candidate.

(Fourth Modification: Unification of the Deletion Process)

Figure 46:
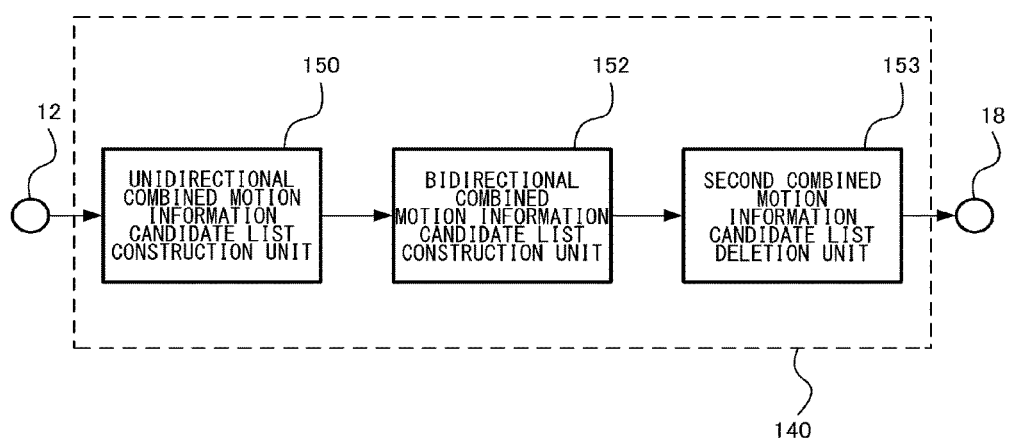
FIG. 46 is a flow chart illustrating the configuration of a combined motion information candidate generator according to a fourth modification of the first embodiment.

In the first embodiment described above, FIG. 16 is cited as an example of the configuration of the combined motion information candidate generator 140, but as a simpler configuration, the deletion unit can be unified by, as shown in FIG. 46, retaining only the second combined motion information candidate list deletion unit 153 while eliminating the first combined motion information candidate list deletion unit 151.

In this case, however, redundant combined motion information candidates are supplied to the bidirectional combined motion information candidate list construction unit 152 and thus, if the first two unidirectional combined motion information candidates are the same, the bidirectional combined motion information candidate (BD0) whose reference direction is L0 and the bidirectional combined motion information candidate (BD1) whose reference direction is L1 become the same motion information. Therefore, as shown in FIG. 47B, the probability of generating the same bidirectional combined motion information candidate can be lowered by changing the inspection order in FIGS. 28 and 29 depending on whether the reference direction is L0 or L1.

Fifth Embodiment: Using the Same Direction

In the first embodiment described above, regarding the reverse direction of the reverse direction motion information decision unit 162, an example in which the reverse direction becomes the L1 direction if the reference direction is the L0 direction and the reverse direction becomes the L0 direction if the reference direction is the L1 direction is cited. In this respect, the L0 direction may be set as the reverse direction if the reference direction is the L0 direction and the L1 direction may be set as the reverse direction if the reference direction is the L1 direction. When, as shown in FIG. 48, only motion information of the same prediction direction is present in combined motion information candidates contained in the second combined motion information candidate list, the encoding efficiency of motion information can be improved by increasing the probability of generating a bidirectional combined motion information candidate and increasing the selection rate of a combined motion information candidate.

(Sixth Modification: Preset Combination)

In the first embodiment described above, a bidirectional combined motion information candidate is generated by searching for combined motion information candidate blocks that are valid in the reference direction and the reverse direction and using motion information in the reference direction and the reverse direction. While the validity of a bidirectional combined motion information candidate can be improved by performing a search in the reference direction and the reverse direction, the throughput increases.

Thus, by defining a bidirectional combined motion information candidate, as shown in FIGS. 49A and 49B, as a preset combination of highly reliable combined motion information candidate blocks, the encoding efficiency can be improved by omitting search processing and improving the selection rate of a bidirectional combined motion information candidate.

FIG. 49A is an example in which the prediction direction of the bidirectional combined motion information candidate (BD0) whose reference direction is L0 is defined as a bidirectional prediction by combining motion information in the L0 direction of the most reliable candidate block A and motion information in the L1 direction of the second most reliable candidate block B, and the prediction direction of the bidirectional combined motion information candidate (BD1) whose reference direction is L1 is defined as a bidirectional prediction by combining motion information in the L1 direction of the most reliable candidate block A and motion information in the L0 direction of the second most reliable candidate block B.

FIG. 49B is an example of defining the prediction direction as a unidirectional prediction in which the bidirectional combined motion information candidate (BD0) whose reference direction is L0 is defined as motion information in the L0 direction of the most reliable candidate block A and the bidirectional combined motion information candidate (BD1) whose reference direction is L1 is defined as motion information in the L1 direction of the most reliable candidate block A. Other combinations are also allowed if more reliable candidate blocks are combined.

(Seventh Modification: BD0, BD1 Adaptation)

In the first embodiment described above, a smaller merge candidate number is assigned to the bidirectional combined motion information candidate (BD0) whose reference direction is L0, but the present embodiment is not limited to such an example. For example, the encoding efficiency can also be improved by preferentially assigning a smaller merge candidate number to a bidirectional combined motion information candidate whose prediction direction is bidirectional to assign a smaller merge candidate number to a bidirectional combined motion information candidate of bidirectional prediction with high prediction efficiency. Further, when both of BD0 and BD1 are bidirectional predictions, a smaller merge candidate number can preferentially be assigned to a bidirectional combined motion information candidate whose motion information in the reference direction is unidirectional. This is because if a unidirectional prediction is selected even if a bidirectional prediction has higher prediction efficiency than a unidirectional prediction, the reliability of motion information thereof is high.

Effect of the First Embodiment (Effect Example of Bidirectional Combined Motion Information of a Bidirectional Prediction)

The effect of the first embodiment will be described using FIG. 50. Hereinafter, the motion vector in the L0 direction of a block N is represented as mvL0N, the motion vector in the L1 direction as mvL1N, the reference picture index in the L0 direction as refIdxL0N, the reference picture index in the L1 direction as refIdxL1N, the vector difference in the L0 direction as dmvL0N, the vector difference in the L1 direction as dmvL1N, the difference of reference picture indexes in the L0 direction as drefIdxL0N, and the difference of reference picture indexes in the L1 direction as drefIdxL1N.

The motion information that minimizes the prediction error for the processing target block (Z) is assumed that the prediction direction is bidirectional (BI), mvL0Z=(2,8), mvL1Z=(4,2), refIdxL0Z=0, and refIdxL1N=0.

In this case, unidirectional combined motion information candidates are assumed to be A, B, COL, C, and E in FIG. 50. Among these unidirectional combined motion information candidates, there is no motion information that minimizes the prediction error for the processing target block (Z). Thus, the unidirectional combined motion information candidate that minimizes the rate distortion evaluation value will be selected from these unidirectional combined motion information candidates. Then, the rate distortion evaluation value of the selected candidate and the rate distortion evaluation value calculated by the vector difference calculation unit 120 are compared and the merge mode is used as the encoding mode only if the former is smaller than the latter.

When the merge mode is selected as the encoding mode, it is because of the optimum balance between the encoding efficiency of motion information and a prediction error and the prediction error is not the optimum error. On the other hand, when a non-merge mode is selected as the encoding mode, the encoding efficiency of motion information is not the optimum efficiency.

Here, bidirectional combined motion information candidates generated according to the first embodiment include BD0 and BD1 in FIG. 50. The bidirectional combined motion information candidate (BD0) whose reference direction is L0 is a bidirectional combined motion information candidate formed from motion information in the L0 direction of the block A and motion information in the L1 direction of the block B. The bidirectional combined motion information candidate (BD1) whose reference direction is L1 is a bidirectional combined motion information candidate formed from motion information in the L1 direction of the block A and motion information in the L0 direction of the block B. In this case, it is clear that the bidirectional combined motion information candidate (BD0) whose reference direction is L0 has the same motion information as the motion information that minimizes the prediction error for the processing target block (Z). That is, by selecting the bidirectional combined motion information candidate (BD0) whose reference direction is L0, it becomes possible to minimize the prediction error and optimize the encoding efficiency of motion information.

(Effect Example of Bidirectional Combined Motion Information of a Unidirectional Prediction)

The effect of a unidirectional prediction according to the first embodiment will be described using FIG. 51. The motion information that minimizes the prediction error for the processing target block (Z) is assumed that the prediction direction is unidirectional (UNI), mvL0Z=(0,8), and refIdxL0Z=2.

It is assumed that the unidirectional combined motion information candidates B, C, COL are invalid (X) and the valid unidirectional combined motion information candidates A, E have motion information as shown in FIG. 51. Also in this case, among unidirectional combined motion information candidates, there is no motion information that minimizes the prediction error for the processing target block (Z).

Here, bidirectional combined motion information candidates generated according to the first embodiment also include BD0 and BD1 in FIG. 51. The bidirectional combined motion information candidate (BD0) whose reference direction is L0 is a bidirectional combined motion information candidate formed from motion information in the L0 direction of the block A and whose prediction direction is unidirectional. The bidirectional combined motion information candidate (BD1) whose reference direction is L1 is a bidirectional combined motion information candidate formed from motion information in the L0 direction of the block E and motion information in the L1 direction of the block A. It is clear that the bidirectional combined motion information candidate (BD0) whose reference direction is L0 has the same motion information as the motion information that minimizes the prediction error for the processing target block (Z). That is, by selecting the bidirectional combined motion information candidate (BD0) whose reference direction is L0, it becomes possible to minimize the prediction error and optimize the encoding efficiency of motion information.

(Effect Example of Bidirectional Combined Motion Information by a Combination of Unidirectional Predictions)

The effect of combining motion information whose prediction direction is unidirectional according to the first embodiment will be described using FIG. 52. The motion information that minimizes the prediction error for the processing target block (Z) is assumed that the prediction direction is bidirectional (BI), mvL0Z=(2,2), refIdxL0Z=0, mvL1Z=(−2,2), and refIdxL1Z=0.

It is assumed that the unidirectional combined motion information candidates A, COL, C are invalid (X) and the valid unidirectional combined motion information candidates B, E have motion information as shown in FIG. 52. Also in this case, among unidirectional combined motion information candidates, there is no motion information that minimizes the prediction error for the processing target block (Z).

Here, bidirectional combined motion information candidates generated according to the first embodiment also include BD0 and BD1 in FIG. 52. The bidirectional combined motion information candidate (BD0) whose reference direction is L0 is a bidirectional combined motion information candidate formed from motion information in the L0 direction of the block B and motion information in the L1 direction of the block E. It is clear that the bidirectional combined motion information candidate (BD0) whose reference direction is L0 has the same motion information as the motion information that minimizes the prediction error for the processing target block (Z). That is, by selecting the bidirectional combined motion information candidate (BD0) whose reference direction is L0, it becomes possible to minimize the prediction error and optimize the encoding efficiency of motion information.

(Bidirectional Combined Motion Information Candidate)

By generating a bidirectional combined motion information candidate using motion information in the L0 direction and the L1 direction of unidirectional combined motion information candidates as described above, encoding can be performed using only the index without encoding motion information even if the motion of the processing target block is shifted from the motion of the block in the same position of another encoded picture or neighboring blocks of the processing target block. Therefore, a moving picture encoding device and a moving picture decoding device capable of optimizing the encoding efficiency and prediction efficiency can be realized.

(Unidirectional Combined Motion Information Candidate)

Also when a new unidirectional combined motion information candidate is generated using motion information in the L0 direction and the L1 direction of unidirectional combined motion information candidates, the same effect as when a new bidirectional combined motion information candidate is generated using motion information in the L0 direction and the L1 direction of unidirectional combined motion information candidates is achieved.

(Bidirectional Combined Motion Information Using the Same Direction)

Also when a bidirectional combined motion information candidate is generated using motion information in the same prediction direction of unidirectional combined motion information candidates, the same effect as when a bidirectional combined motion information candidate is generated using motion information in the L0 direction and the L1 direction of unidirectional combined motion information candidates is achieved.

(Simplification of the Moving Picture Decoding Processing)

By generating a bidirectional combined motion information candidate using motion information in each direction of unidirectional combined motion information candidates as described above, even if the motion of the processing target block is shifted from the motion of the block in the same position of another encoded picture or neighboring blocks of the processing target block, the need for decoding the prediction direction, reference index, and vector difference and addition processing of the vector predictor and vector difference can be eliminated so that processing of the moving picture decoding device can be reduced.

(Deletion Process)

By setting up the first combined motion information candidate list deletion unit 151, bidirectional combined motion information candidate (BD0) whose reference direction is L0 and the bidirectional combined motion information candidate (BD1) whose reference direction is L1 can be prevented from having the same motion information in the bidirectional combined motion information candidate list construction unit 152 and the encoding efficiency can be improved by increasing validity of bidirectional combined motion information candidates.

(Merge Candidate Number Assignment in Order of Selection Rate)

By assigning a decreasing merge candidate number to a combined motion information candidate with an increasing selection rate, it becomes possible to increase the selection rate of more probable motion information in each direction and to generate a high-precision bidirectional combined motion information candidate using highly precise motion information in each direction. In addition, the processing of search can be simplified and a decrease of the encoding efficiency can be inhibited even if the number of processing of search is limited.

(Memory Lead Time)

By generating bidirectional combined motion information candidate using motion information in each direction of unidirectional combined motion information candidates as described above, the number of combined motion information candidates can be increased without increasing the number of unidirectional combined motion information candidates. Therefore, in a moving picture encoding device and a moving picture decoding device using a general LSI in which the memory lead time increases with an increasing number of unidirectional combined motion information candidates, an increase of the memory lead time due to an increase of the number of unidirectional combined motion information candidates can be inhibited.

(Adaptation Switching)

By preferentially assigning a smaller merge candidate number to a bidirectional combined motion information candidate whose prediction direction is bidirectional, the selection rate of a bidirectional combined motion information candidate whose prediction efficiency is high and whose prediction direction is bidirectional can be increased, and by preferentially assigning a smaller merge candidate number to a bidirectional combined motion information candidate whose motion information in the prediction direction is unidirectional, the encoding efficiency can be improved by increasing the selection rate of a bidirectional combined motion information candidate using highly reliable motion information.

Second Embodiment (Syntax)

The configuration of a moving picture encoding device according to the second embodiment is the same as the configuration of the moving picture encoding device according to the first embodiment excluding an upper function of the moving picture encoding device and the function of the bitstream generator 104. Hereinafter, differences of the upper function of the moving picture encoding device in the second embodiment and the function of the bitstream generator 104 from those in the first embodiment will be described.

The upper function of the moving picture encoding device in the second embodiment has a function to change a candidate number management table in bitstream units or for each slice as a portion of a bitstream. The bitstream generator 104 transmits a candidate number management table by encoding the table, as shown in FIGS. 53A and 53B, in a bitstream. FIGS. 53A and 53B shows examples of syntax that encodes a candidate number management table based on SPS (Sequence Parameter Set) for the control in bitstream units and Slice_header for the control in slice units respectively.

"modified_merge_index_flag" specifies whether to change the standard relationship of the merge candidate number and combined motion information candidate, "max_no_of_merge_index_minus1" specifies the number of redefinitions, and "merge_mode [i]" specifies the order of candidate blocks contained in a combined motion information candidate list. In addition, "bd_merge_base_direction" as information to specify the reference direction of a bidirectional combined motion information candidate can be set up.

For example, it is assumed that the standard relationship between the merge candidate number and the combined motion information candidate is given by FIG. 18 and the candidate number management table to be redefined is given by FIG. 40A.

FIGS. 53A and 53B are examples of syntax and the syntax only needs to be able to specify the merge candidate number assigned to a bidirectional combined motion information candidate in a bitstream and specifying the reference direction of the bidirectional combined motion information candidate and is not limited to the above examples.

The configuration of a moving picture decoding device according to the second embodiment is the same as the configuration of the moving picture decoding device 200 according to the first embodiment excluding the function of the bitstream analysis unit 201. Hereinafter, a difference of the function of the bitstream analysis unit 201 of the moving picture decoding device according to the second embodiment from that in the first embodiment will be described. The bitstream analysis unit 201 decodes a candidate number management table according to the syntax in FIGS. 53A and 53B.

Effect of the Second Embodiment

By sharing the optimum relationship between the merge candidate number and the combined motion information candidate in stream units or slice units by the moving picture encoding device and the moving picture decoding device according to the second embodiment, the encoding efficiency of the merge index can be improved when characteristics of motion change in stream units or slice units.

Third Embodiment (Replacement of Combined Motion Information Candidates)

The configuration of a moving picture encoding device according to the third embodiment is the same as the configuration of the moving picture encoding device 100 according to the first embodiment excluding the function of the combined motion information candidate generator 140. First, it is assumed that the candidate number management table in the third embodiment is given by FIG. 54 and the maximum number of combined motion information candidates contained in a combined motion information candidate list is 5. The third embodiment is different in that the maximum number of combined motion information candidates contained in a combined motion information candidate list is 5 and no merge candidate number is assigned to a bidirectional combined motion information candidate. Hereinafter, a difference of the combined motion information candidate generator 140 in the third embodiment from that in the first embodiment will be described using FIG. 55.

Figure 55:
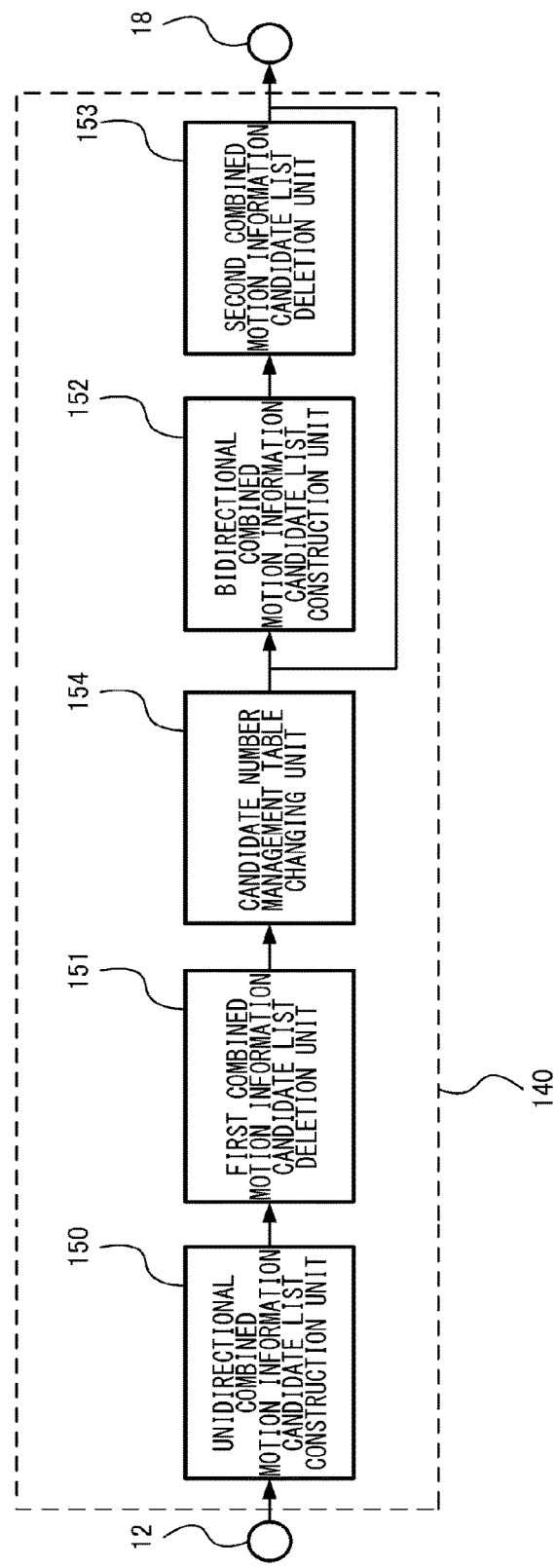
FIG. 55 is a diagram illustrating the configuration of a combined motion information candidate generator according to the third embodiment.

The combined motion information candidate generator 140 in FIG. 55 has a configuration in which a candidate number management table changing unit 154 is added to the combined motion information candidate generator 140 in FIG. 16. Hereinafter, the function of the candidate number management table changing unit 154 will be described. The candidate number management table changing unit 154 calculates the valid number of bidirectional combined motion information candidates from a second combined motion information candidate list supplied by the combined motion information candidate list deletion unit 151. If the valid number of bidirectional combined motion information candidates is larger than or equal to 1, the candidate number management table is changed and the second combined motion information candidate list is supplied to the bidirectional combined motion information candidate list construction unit 152. If the valid number of bidirectional combined motion information candidates is 0, the second combined motion information candidate list is supplied to the terminal 18 as a combined motion information candidate list.

Figure 56:
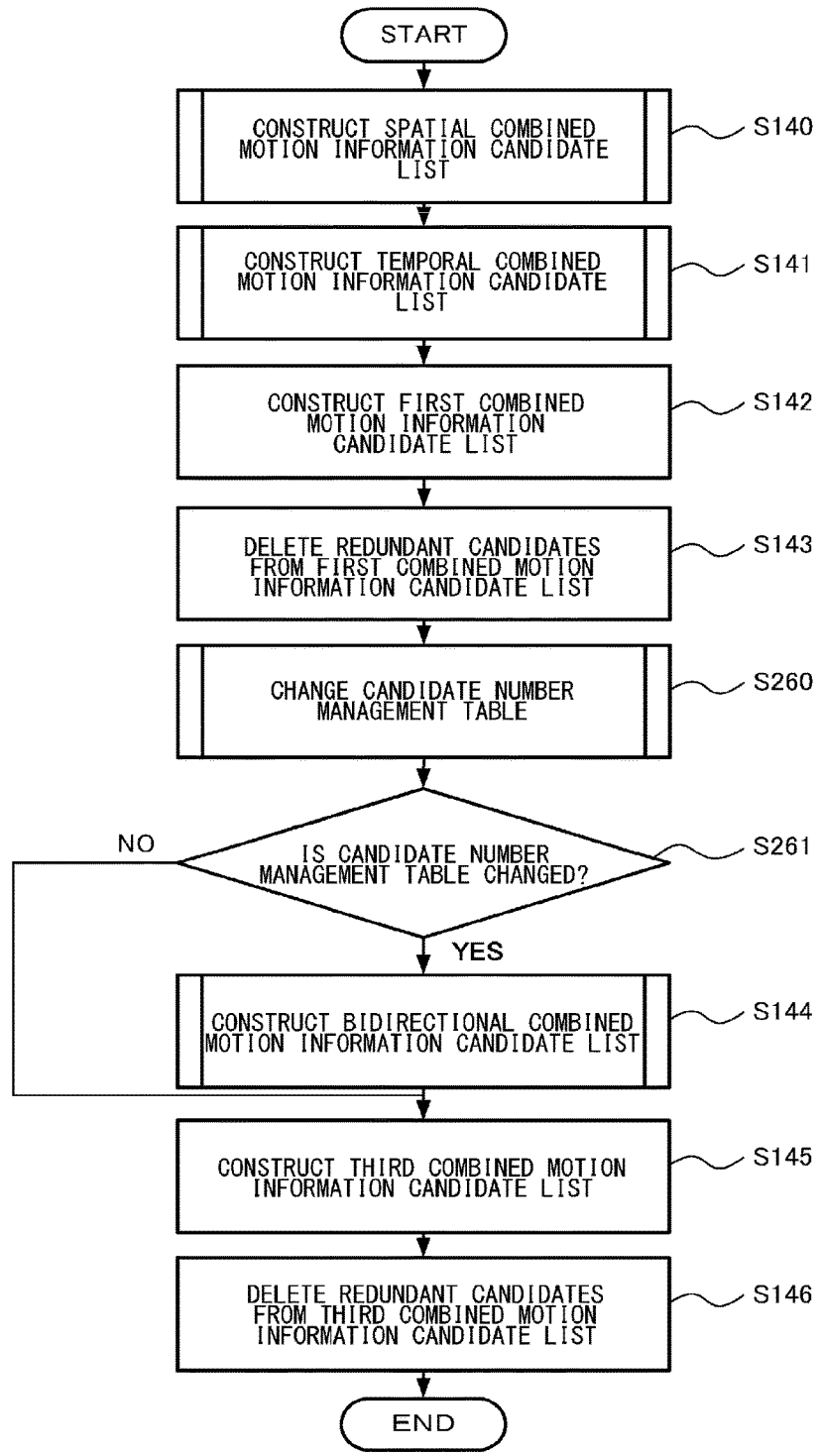
FIG. 56 is a flow chart illustrating the configuration of the combined motion information candidate generator according to the third embodiment.

Hereinafter, a difference of the operation of the combined motion information candidate generator 140 in the third embodiment from that in the first embodiment will be described using FIG. 56. The flow chart in FIG. 56 is obtained by adding the following two steps to the flow chart in FIG. 24. The candidate number management table changing unit 154 changes the candidate number management table (S260). Whether the candidate number management table is changed is checked (S261). If the candidate number management table is changed (YES in S261), step S144 is performed. If the candidate number management table is not changed (NO in S261), step S144 is skipped.

Figure 57:
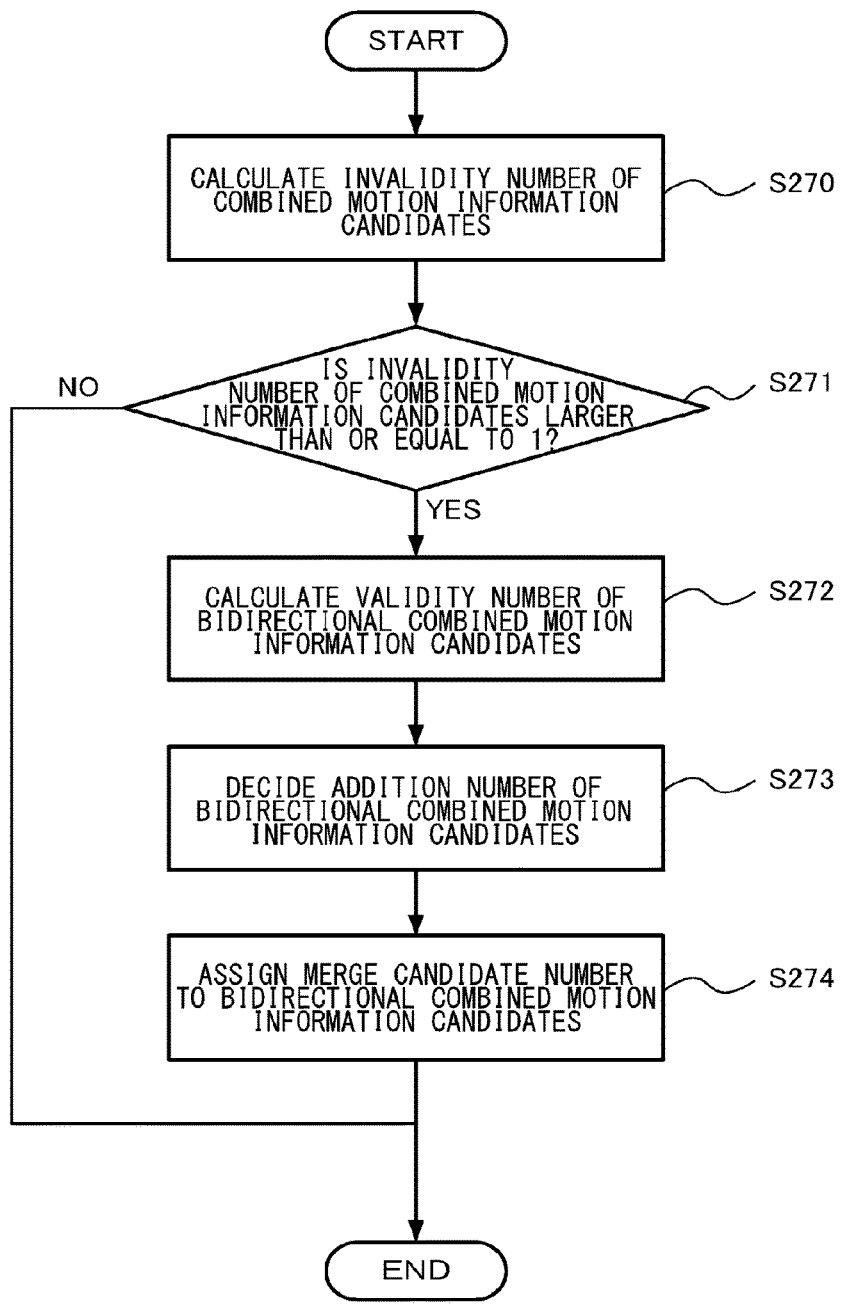
FIG. 57 is a flow chart illustrating the operation of a candidate number management table changing unit according to the third embodiment.

Hereinafter, the operation of the candidate number management table changing unit 154 will be described using FIG. 57. First, the candidate number management table changing unit 154 counts the number of invalid combined motion information candidates that are not contained in the second combined motion information candidate list to calculate the invalid number of combined motion information candidates (S270). In the third embodiment, the invalid number of combined motion information candidates is set as the number of invalid combined motion information candidates contained in the second combined motion information candidate list, but it is only necessary to be able to calculate the number of invalid combined motion information candidates and the present embodiment is not limited to the above example. For example, the number of invalid combined motion information candidates may be determined by subtracting the number of valid combined motion information candidates contained in the second combined motion information candidate list from 5, which is the total of the maximum number 4 of spatial combined motion information candidates and the maximum number 1 of temporal combined motion information candidates. When combined motion information with a high selection rate is invalid, the selection rate of a bidirectional combined motion information candidate is expected to decrease and thus, the number of invalid combined motion information candidates whose merge candidate number is larger than or equal to 2 may be counted.

The candidate number management table changing unit 154 checks whether the invalid number of combined motion information candidates is larger than or equal to 1 (S271). If the invalid number of combined motion information candidates is larger than or equal to 1 (YES in S271), the subsequent processing is performed to change the candidate number management table. If the invalid number of combined motion information candidates is 0 (NO in S271), the processing is terminated.

The candidate number management table changing unit 154 counts the number of valid bidirectional combined motion information candidates to calculate the valid number of bidirectional combined motion information candidates (S272). That is, when both of BD0 and BD1 are valid, the valid number of bidirectional combined motion information candidates is 2, when one of BD0 and BD1 is valid, the valid number of bidirectional combined motion information candidates is 1, and when both of BD0 and BD1 are invalid, the valid number of bidirectional combined motion information candidates is 0.

The candidate number management table changing unit 154 sets the smaller of the invalid number of combined motion information candidates and the valid number of bidirectional combined motion information candidates as an addition number of bidirectional combined motion information candidates (S273). The candidate number management table changing unit 154 assigns invalid merge candidate numbers to as many bidirectional combined motion information candidates as the addition number of bidirectional combined motion information candidates (S274).

Hereinafter, change examples of the candidate number management table by the candidate number management table changing unit 154 will be described using FIGS. 58A to 58C. FIG. 58A shows an example in which the invalid number of combined motion information candidates is 1 and the valid number of bidirectional combined motion information candidates is larger than or equal to 1. BD0 is assigned to the first invalid merge candidate number 1. If BD1 is valid, BD1 may be assigned. FIG. 58B shows an example in which the invalid number of combined motion information candidates is 2 and the valid number of bidirectional combined motion information candidates is 2. BD0 is assigned to the first invalid merge candidate number 2 and BD1 is assigned to the second invalid merge candidate number 4. FIG. 58C shows an example in which the invalid number of combined motion information candidates is 2 and the valid number of bidirectional combined motion information candidates is 1 (BD1 is valid). BD1 is assigned to the first invalid merge candidate number 2.

The configuration of a moving picture decoding device according to the third embodiment is the same as the configuration of the moving picture decoding device 200 according to the first embodiment excluding the function of the combined motion information candidate generator 140. The combined motion information candidate generator 140 of the moving picture decoding device according to the third embodiment is the same as the combined motion information candidate generator 140 of a moving picture encoding device according to the third embodiment.

Modifications of the Third Embodiment

The third embodiment can be modified as described below.

(First Modification: Unidirectional Combined Motion Information Candidate Precedence)

In the third embodiment described above, FIG. 57 is cited as an operation example of the candidate number management table changing unit 154, but the changed candidate number management table is only required that a decreasing merge candidate number should be assigned to a combined motion information candidate with an increasing selection rate and the present embodiment is not limited to the above table.

Figure 59:
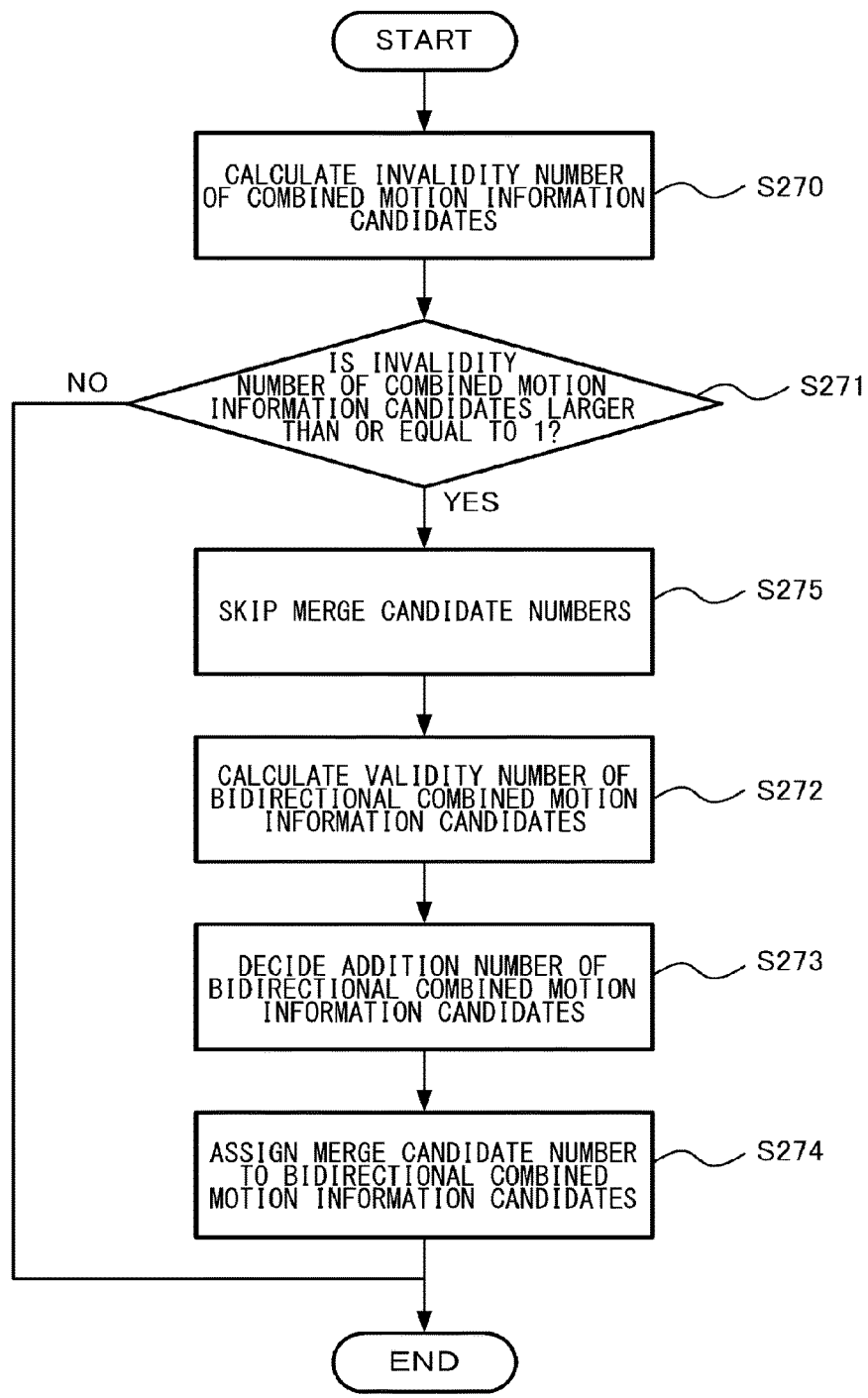
FIG. 59 is a flow chart illustrating the operation of a candidate number management table changing unit according to a first modification of the third embodiment.

If, for example, the reliability of existing unidirectional combined motion information candidates is sufficiently high, as shown in FIG. 59, step S275 shown below may be added to the operation of the candidate number management table changing unit 154. The flow chart in FIG. 59 is obtained by adding step S275 to the flow chart in FIG. 57. The candidate number management table changing unit 154 skips the merge candidate numbers of invalid combined motion information candidates (S274).

Hereinafter, change examples of the candidate number management table by the candidate number management table changing unit 154 will be described using FIGS. 60A and 60B. FIG. 60A shows an example in which the invalid number of combined motion information candidates is 1 and the valid number of bidirectional combined motion information candidates is larger than or equal to 1. After an invalid merge candidate number (merge candidate number 1) being skipped, BD0 is assigned to the first invalid merge candidate number 4. If BD1 is valid, BD1 may be assigned. FIG. 60B shows an example in which the invalid number of combined motion information candidates is 2 and the valid number of bidirectional combined motion information candidates is 2. After an invalid merge candidate number (merge candidate number 2) being skipped, BD0 is assigned to the first invalid merge candidate number 3 and BD1 is assigned to the second invalid merge candidate number 4. In this manner, a larger merge candidate number is assigned to a bidirectional combined motion information candidate than a unidirectional combined motion information candidate.

(Second Modification: Predetermined Block Dependency)

Figure 61:
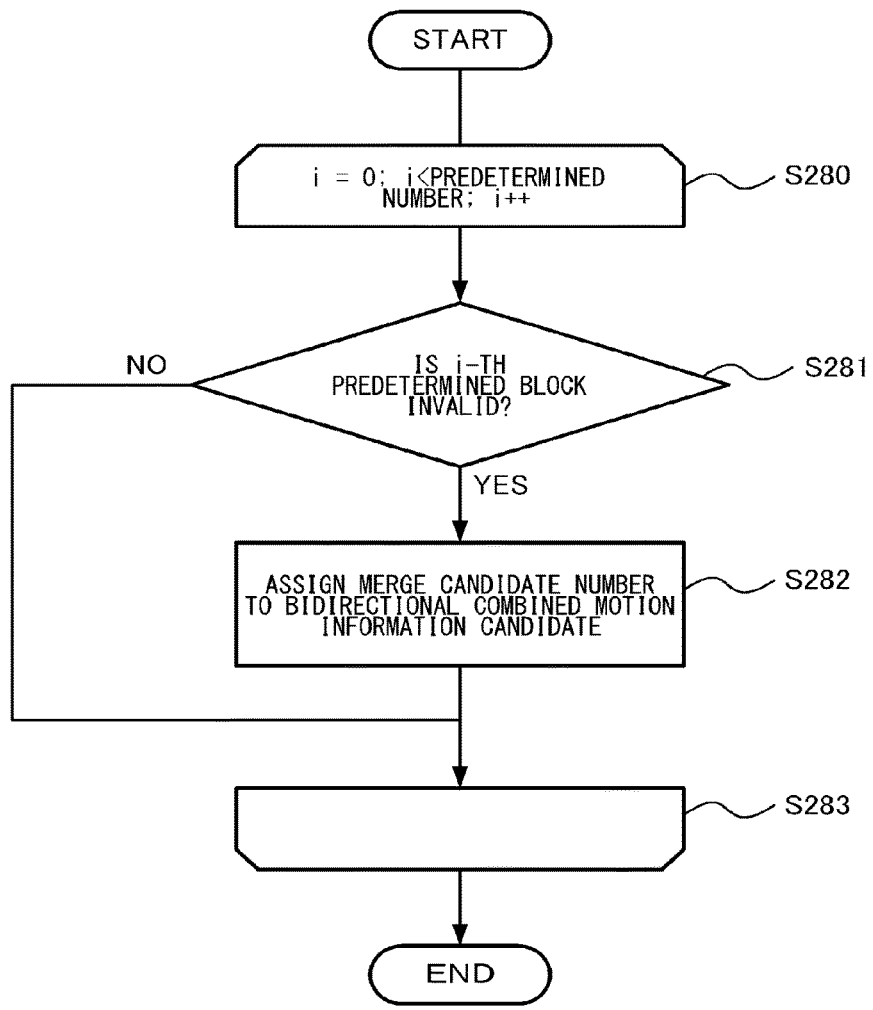
FIG. 61 is a flow chart illustrating the operation of a candidate number management table changing unit according to a second modification of the third embodiment.

The operation of the candidate number management table changing unit 154 can further be modified. First, it is assumed in the present modification that a predetermined bidirectional combined motion information candidate is associated with a predetermined block and BD0 is associated with the block C and BD1 is associated with the block D. Hereinafter, another modification of the operation of the candidate number management table changing unit 154 will be described using FIG. 61. The following processing is repeated as many times as the number of associated blocks (S280 to S284). Check whether the i-th predetermined block is invalid (S281). If the i-th predetermined block is invalid (YES in S281), the subsequent processing is performed to change the candidate number management table. If the i-th predetermined block is not invalid (NO in S281), the next predetermined block is inspected.

In the second modification, predetermined combined motion information candidates are assumed to be two blocks of the block C of the merge candidate number 3 and the block E of the merge candidate number 4. Thus, the candidate number management table changing unit 154 assigns the bidirectional combined motion information candidate (BD0) to the first predetermined invalid merge candidate number and the bidirectional combined motion information candidate (BD1) to the second predetermined invalid merge candidate number (S282).

As described above, in the bidirectional combined motion information candidate list construction unit 152 according to the second modification, when a predetermined combined motion information candidate is invalid, a bidirectional combined motion information candidate becomes valid. The block C and the block E are assumed to be predetermined combined motion information candidates, but it is only necessary that a bidirectional combined motion information candidate should be generated when a combined motion information candidate having a larger merge candidate number and a low selection rate is invalid.

(Third Modification: Replacement of Combined Motion Information Candidates of the Unidirectional Prediction)

Figure 62:
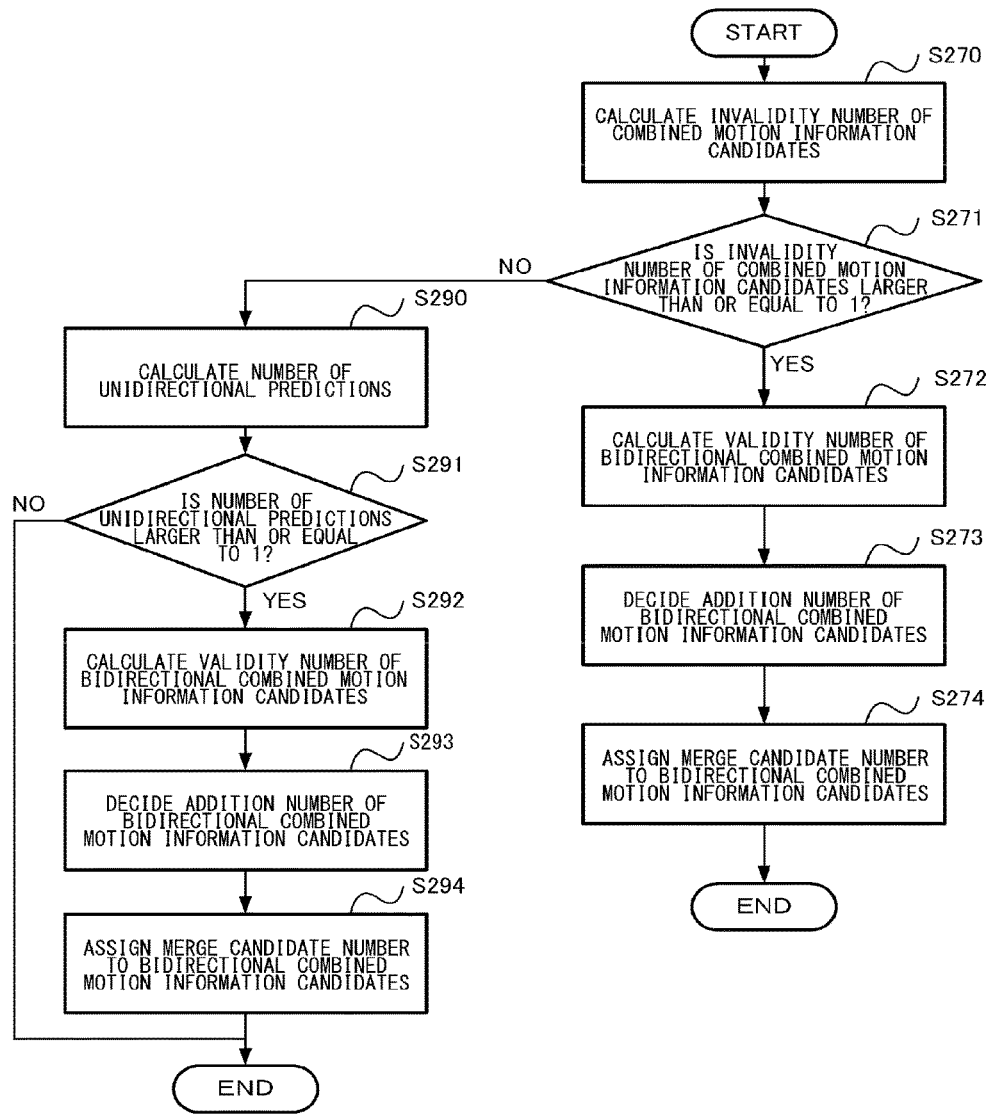
FIG. 62 is a flow chart illustrating the operation of a candidate number management table changing unit according to a third modification of the third embodiment.

The operation of the candidate number management table changing unit 154 can further be modified. Hereinafter, a modification of the operation of the candidate number management table changing unit 154 will be described using FIG. 62. If the invalid number of combined motion information candidates is 0 (NO in S271), the candidate number management table changing unit 154 counts combined motion information candidates contained in the second combined motion information candidate list and whose prediction direction is unidirectional (the L0 direction or the L1 direction) to calculate the number of unidirectional predictions. Whether the number of unidirectional predictions is larger than or equal to 1 (S291). If the valid number of unidirectional combined motion information candidates is larger than or equal to 1 (YES in S291), the subsequent processing is performed to change the candidate number management table. If the number of unidirectional predictions is 0 (NO in S291), the processing is terminated. The candidate number management table changing unit 154 counts the number of bidirectional combined motion information candidates whose prediction direction is bidirectional to calculate the valid number of bidirectional combined motion information candidates (S292). The candidate number management table changing unit 154 assigns merge candidate numbers of combined motion information candidates whose prediction direction is unidirectional to as many bidirectional combined motion information candidates as the addition number of bidirectional combined motion information candidates (S294).

As a concrete example, if the prediction direction of the bidirectional combined motion information candidate (BD0) is bidirectional, the candidate number management table changing unit 154 assigns the last merge candidate number whose prediction direction is unidirectional to the bidirectional combined motion information candidate (BD0). If the direction of motion compensation prediction of the bidirectional combined motion information candidate (BD1) is bidirectional, the candidate number management table changing unit 154 assigns the second last merge candidate number whose prediction direction is unidirectional to the bidirectional combined motion information candidate (BD1). In the third modification of the third embodiment, the number of unidirectional predictions is set as the number of combined motion information candidates contained in the second combined motion information candidate list and whose prediction direction is unidirectional, but it is only necessary to be able to calculate the number of unidirectional predictions and the present modification is not limited to the above example. For example, combined motion information with a high selection rate is considered to be highly reliable even if its prediction direction is unidirectional and thus, the number of combined motion information candidates whose merge candidate number is larger than or equal to 3 and whose prediction direction is unidirectional. If the invalid number of combined motion information candidates is 0, the number of combined motion information candidates whose prediction direction is unidirectional is counted, it is only necessary to be able to assign a merge candidate number to a bidirectional combined motion information candidate with the total number of the invalid number of combined motion information candidates and the number of unidirectional predictions set as an upper limit.

As described above, the bidirectional combined motion information candidate list construction unit 152 according to the third embodiment replaces a combined motion information candidate whose prediction direction is unidirectional with a bidirectional combined motion information candidate whose prediction direction is bidirectional.

Effect of the Third Embodiment

By using an invalid merge index as a merge candidate number of a bidirectional combined motion information candidate as described above, an increase of the code amount of merge indexes due to an increase of the merge candidate numbers can be inhibited and the encoding efficiency can be improved by increasing the selection rate of a combined motion information candidate.

When the reliability of motion information in the time direction or space direction is high, as described above, the encoding efficiency of merge indexes can be improved by using the merge candidate number such that the merge candidate number of a bidirectional combined motion information candidate becomes larger than the merge candidate number of a unidirectional combined motion information candidate.

By associating a combined motion information candidate having a large merge candidate number with a bidirectional combined motion information candidate, as described above, while retaining combined motion information candidates of blocks having high reliability and a high selection rate, a combined motion information candidate having a low selection rate and a bidirectional combined motion information candidate can adaptively be switched. Therefore, an increase of the code amount of merge indexes due to an increase of the merge candidate numbers can be inhibited and the encoding efficiency can be improved by increasing the selection rate of a combined motion information candidate.

By replacing a combined motion information candidate whose prediction direction is unidirectional with a bidirectional combined motion information candidate whose prediction direction is bidirectional, as described above, the number of bidirectional combined motion information candidates having high prediction efficiency and whose prediction direction is bidirectional can be increased and the encoding efficiency can be improved by increasing the selection rate of a combined motion information candidate.

Fourth Embodiment (Precedence of Motion Information of the Unidirectional Prediction)

The configuration of a moving picture encoding device according to the fourth embodiment is the same as the configuration of the moving picture encoding device 100 according to the first embodiment excluding the function of the reference direction motion information decision unit 161. Hereinafter, a difference of the reference direction motion information decision unit 161 in the fourth embodiment from that in the first embodiment will be described. The operation of the reference direction motion information decision unit 161 in the fourth embodiment will be described using FIG. 63.

Figure 28:
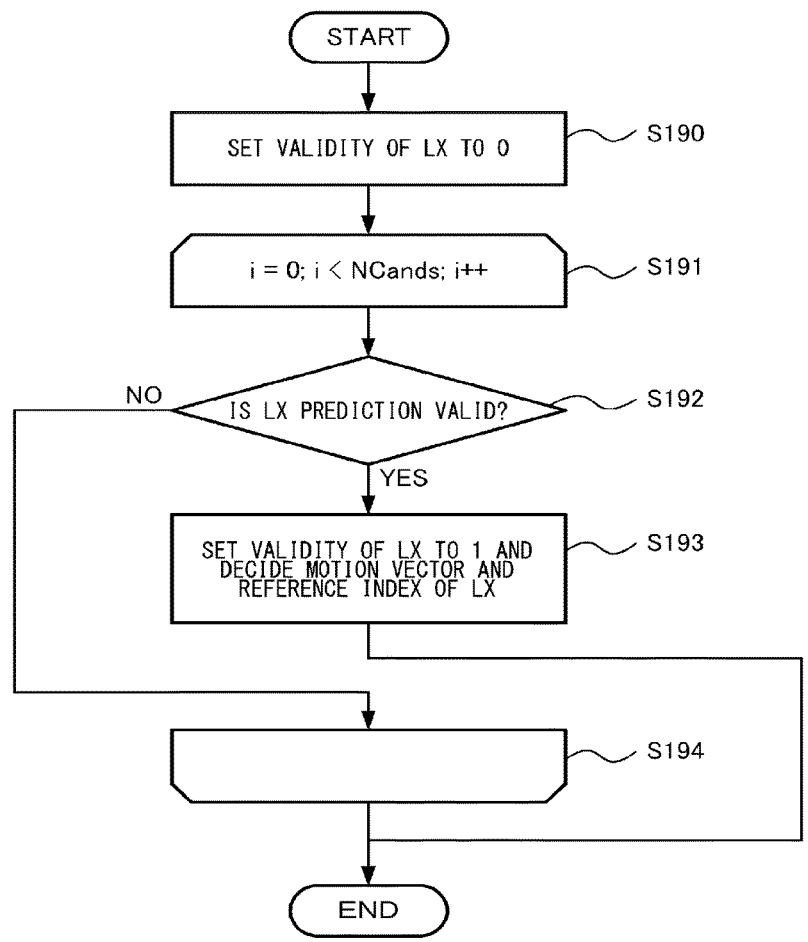
FIG. 28 is a flow chart illustrating the operation of a reference direction motion information decision unit in FIG. 17.
Figure 63:
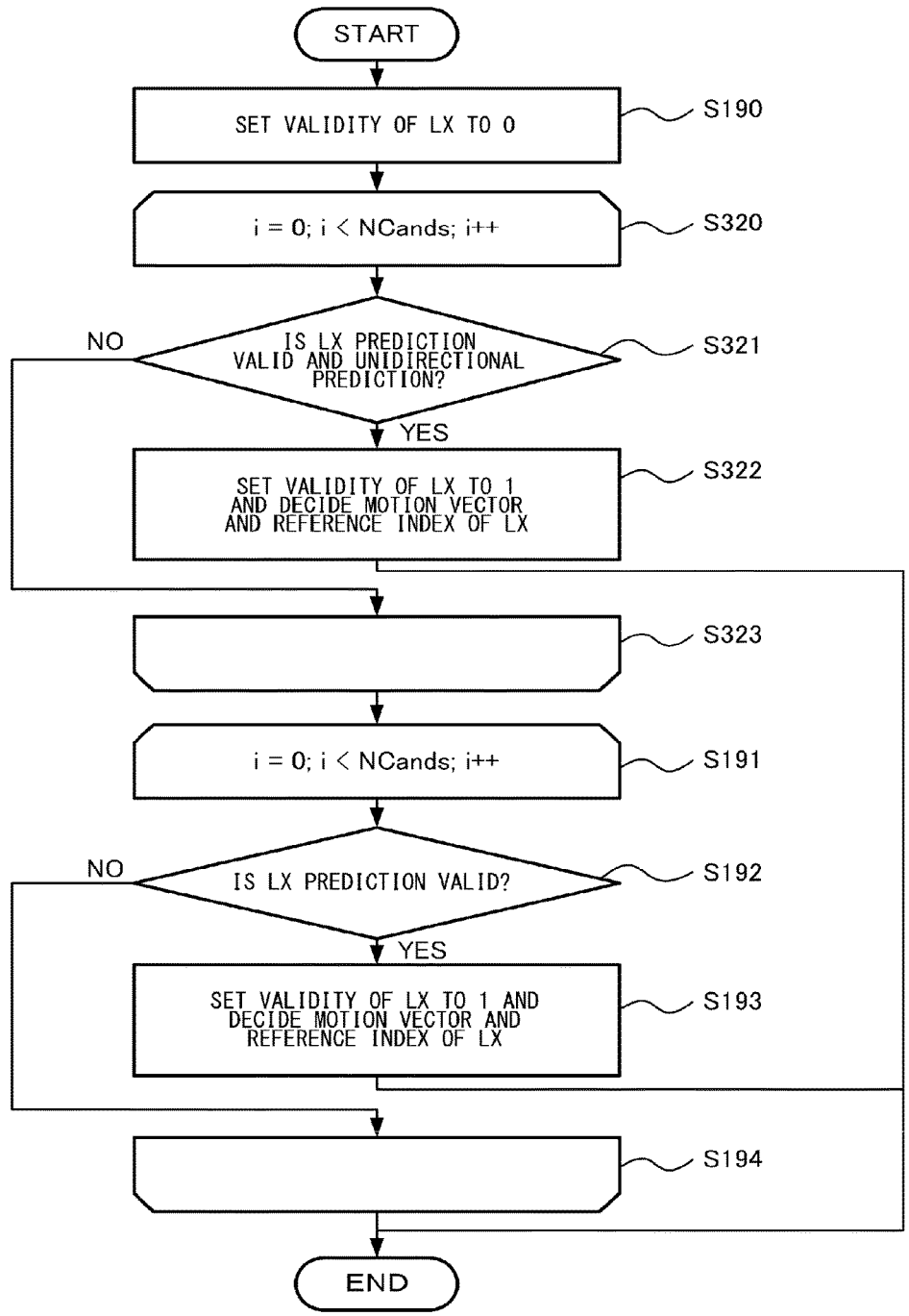
FIG. 63 is a flow chart illustrating the operation of a reference direction motion information decision unit according to a fourth embodiment.

The flow chart in FIG. 63 is obtained by adding steps S320 to S323 to the flow chart in FIG. 28 and features step S321. First, the validity of LX as the reference direction is set to "0" (S190). The following processing is repeated as many times as the number (NCands) of combined motion information candidates contained in the second combined motion information candidate list (S320 to S323). The validity of the LX direction of a combined motion information candidate and whether the prediction direction thereof is a unidirectional prediction are checked (S321). If the LX direction of the combined motion information candidate is valid and the prediction direction thereof is a unidirectional prediction (YES in S321), the validity of LX as the reference direction is set to "1" and a motion vector and a reference index in the reference direction are set as a motion vector and a reference index in the LX direction of the combined motion information candidate before the processing being terminated (S322). If the LX direction of the combined motion information candidate is valid and the prediction direction thereof is not a unidirectional prediction (NO in S321), the next candidate is inspected (S323).

If the LX direction of a combined motion information candidates is valid and a motion information candidate of the unidirectional prediction is not present, the following processing is repeated as many times as the number (NCands) of combined motion information candidates contained in the second combined motion information candidate list (S191 to S194). The validity of the LX direction of a combined motion information candidate is inspected (S192). If the LX direction of the combined motion information candidate is valid (YES in S192), the validity of LX as the reference direction is set to "1" and a motion vector and a reference index in the reference direction are set as a motion vector and a reference index in the LX direction of the combined motion information candidate before the processing being terminated (S193). If the LX direction of the combined motion information candidate is invalid (NO in S192), the next candidate is inspected (S194). Thus, the reference direction motion information decision unit 161 in the fourth embodiment is different from that in the first embodiment in that unidirectional motion information takes precedence in the decision of motion information in the reference direction.

The configuration of a moving picture decoding device according to the fourth embodiment is the same as the configuration of the moving picture decoding device 200 according to the first embodiment excluding the function of the reference direction motion information decision unit 161. The combined motion information candidate generator 140 of the moving picture decoding device according to the fourth embodiment is the same as the combined motion information candidate generator 140 of a moving picture encoding device according to the fourth embodiment.

Modifications of the Fourth Embodiment

The fourth embodiment can be modified as described below.

(First Modification: Limited to Unidirectional)

In the fourth embodiment described above, FIG. 63 is cited as an operation example of the reference direction motion information decision unit 161, but it is only necessary that unidirectional motion information should take precedence in the decision of motion information and the present embodiment is not limited to such an example. For example, motion information in the reference direction may be limited to unidirectional motion information by deleting steps S191 to S194 in FIG. 63.

(Precedence of the Reverse Unidirectional Direction)

In the fourth embodiment described above, FIG. 63 is cited as an operation example of the reference direction motion information decision unit 161, but it is only necessary that unidirectional motion information should take precedence in the decision of motion information and the present embodiment is not limited to such an example. For example, also in the decision of motion information in the reverse direction of the reverse direction motion information decision unit 162, like the reference direction motion information decision unit 161 in the fourth embodiment, unidirectional motion information may take precedence. In the decision of motion information in the reverse direction of the reverse direction motion information decision unit 162, like the reference direction motion information decision unit 161 in the first modification of the fourth embodiment, motion information may be selected by limiting to unidirectional motion information.

Effect of the Fourth Embodiment

In the fourth embodiment, by giving precedence to unidirectional motion information in the decision of motion information in the reference direction, highly reliable motion information can be used as motion information in the reference direction and the encoding efficiency can be improved by increasing the selection rate of a bidirectional combined motion information candidate.

Fifth Embodiment (Deletion Process in Each Direction)

The configuration of a moving picture encoding device according to the fifth embodiment is the same as the configuration of the moving picture encoding device 100 according to the first embodiment excluding the function of the combined motion information candidate generator 140. Hereinafter, a difference of the combined motion information candidate generator 140 in the fifth embodiment from that in the first embodiment will be described.

Figure 64:
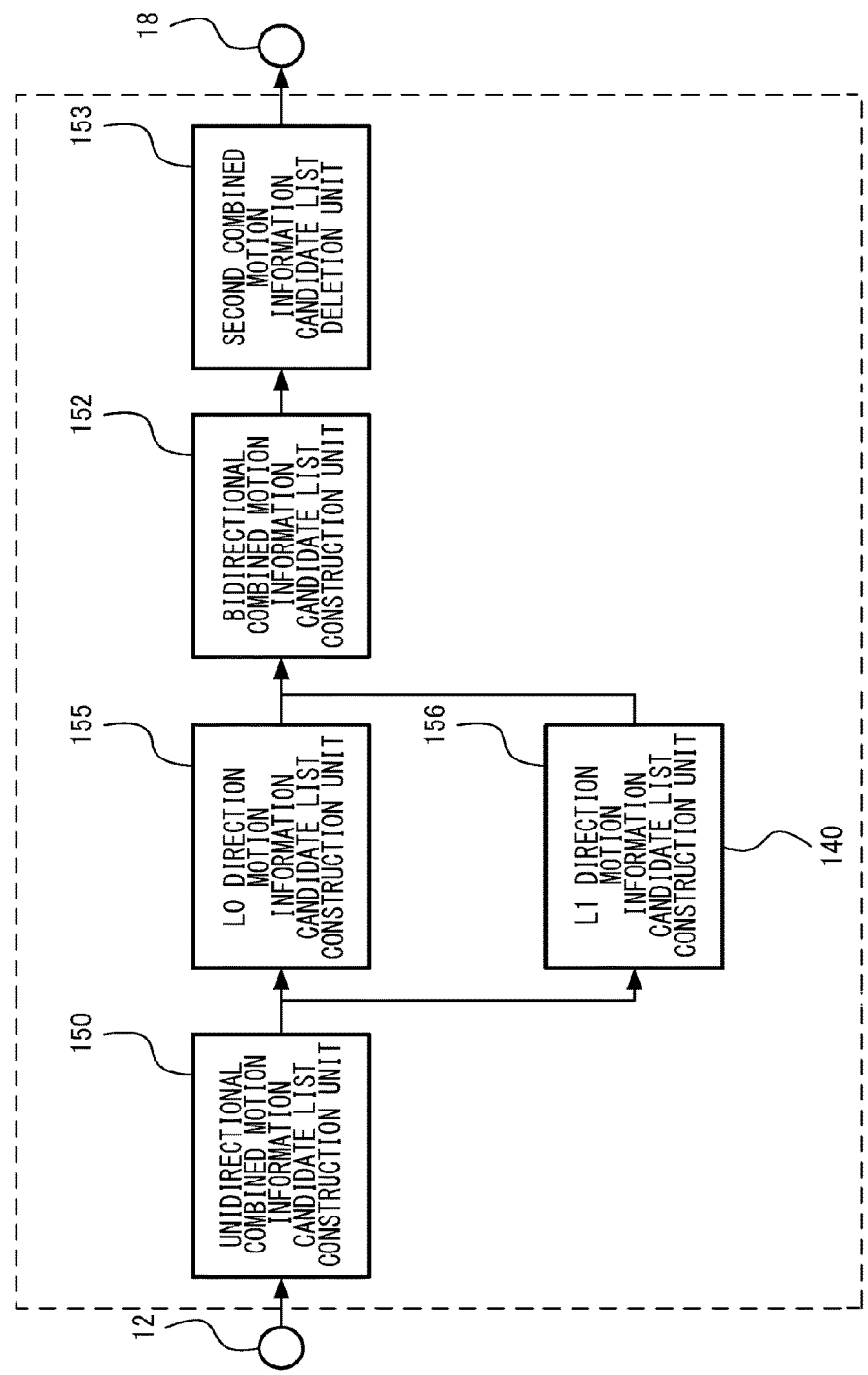
FIG. 64 is a diagram illustrating the configuration of a combined motion information candidate generator according to a fifth embodiment.

The configuration of the combined motion information candidate generator 140 in the fifth embodiment from that in the first embodiment will be described using FIG. 64. In FIG. 64, instead of the first combined motion information candidate list deletion unit 151 in FIG. 16, an L0 direction motion information candidate list construction unit 155 and an L1 direction motion information candidate list construction unit 156 are provided.

The function of the combined motion information candidate generator 140 in the fifth embodiment will be described. If a plurality of combined motion information candidates having duplicate motion information in the L0 direction is present among motion information candidates contained in the first combined motion information candidate list, the L0 direction motion information candidate list construction unit 155 constructs an L0 direction motion information candidate list by retaining one combined motion information candidate and supplies the L0 direction motion information candidate list to the bidirectional combined motion information candidate list construction unit 152.

If a plurality of combined motion information candidates having duplicate motion information in the L1 direction is present among motion information candidates contained in the first combined motion information candidate list, the L1 direction motion information candidate list construction unit 156 constructs an L1 direction motion information candidate list by retaining one combined motion information candidate and supplies the L1 direction motion information candidate list to the bidirectional combined motion information candidate list construction unit 152.

The bidirectional combined motion information candidate list construction unit 152 constructs a bidirectional combined motion information candidate list from an L0 direction motion information candidate list supplied by the L0 direction motion information candidate list construction unit 155 and an L1 direction motion information candidate list supplied by the L1 direction motion information candidate list construction unit 156.

The configuration of a moving picture decoding device according to the fifth embodiment is the same as the configuration of the moving picture decoding device 200 according to the first embodiment excluding the function of the combined motion information candidate generator 140. The combined motion information candidate generator 140 of the moving picture decoding device according to the fifth embodiment is the same as the combined motion information candidate generator 140 of a moving picture encoding device according to the fifth embodiment.

Effect of the Fifth Embodiment

In the fifth embodiment, generation of the same bidirectional combined motion information is inhibited by reducing redundancy of motion information in the L0 direction and the L1 direction and the encoding efficiency can be improved by increasing validity of a bidirectional combined motion information candidate.

Sixth Embodiment (Selective Use of Bidirectional Combined Motion Information Candidates)

Figure 66:
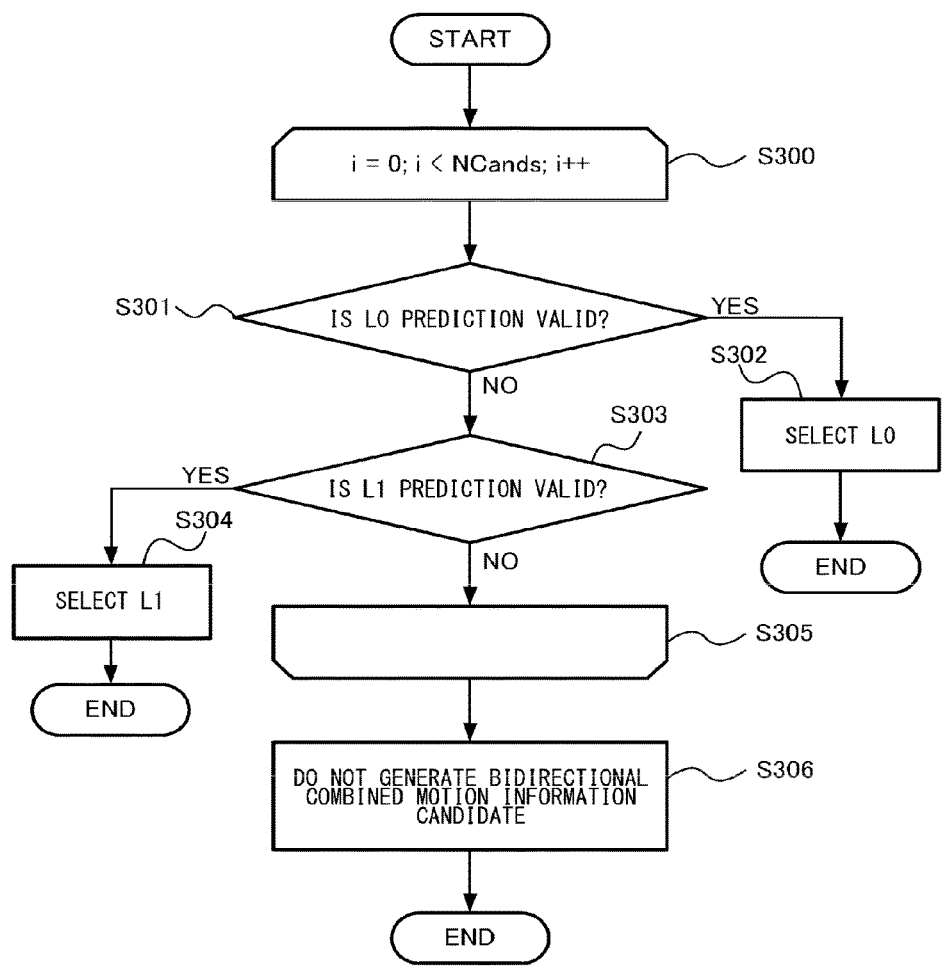
FIG. 66 is a flow chart illustrating the configuration of a reference direction decision unit according to the sixth embodiment.

The configuration of a moving picture encoding device according to the sixth embodiment is the same as the configuration of the moving picture encoding device 100 according to the first embodiment excluding the function of the reference direction decision unit 160. First, it is assumed that the candidate number management table in the sixth embodiment is given by FIG. 65 and the maximum number of combined motion information candidates contained in a combined motion information candidate list is 6. The sixth embodiment is different in that the maximum number of combined motion information candidates contained in a combined motion information candidate list is 6 and only one merge candidate number is assigned to a bidirectional combined motion information candidate. Hereinafter, a difference of the reference direction decision unit 160 in the sixth embodiment from that in the first embodiment will be described. The operation of the reference direction decision unit 160 in the sixth embodiment will be described using FIG. 66.

The reference direction decision unit 160 repeats the following processing as many times as the number (NCands) of combined motion information candidates contained in the second combined motion information candidate list (S300 to S305). The validity of the L0 direction of a combined motion information candidate is inspected (S301). If the L0 direction of the combined motion information candidate is valid (YES in S301), the reference direction is set to L0 before the processing being terminated (S302). If the L0 direction of the combined motion information candidate is invalid (NO in S301), the validity of the L1 direction of the combined motion information candidate is inspected (S303). If the L1 direction of the combined motion information candidate is valid (YES in S303), the reference direction is set to L1 before the processing being terminated (S304). If the L1 direction of the combined motion information candidate is invalid (NO in S303), the next candidate is inspected (S305). If the reference direction cannot be set, no bidirectional combined motion information candidate will be generated (S306).

The configuration of a moving picture decoding device according to the sixth embodiment is the same as the configuration of the moving picture decoding device 200 according to the first embodiment excluding the function of the reference direction decision unit 160. The reference direction decision unit 160 of the moving picture decoding device in the sixth embodiment is the same as the reference direction decision unit 160 of a moving picture encoding device in the sixth embodiment.

Effect of the Sixth Embodiment

In the sixth embodiment, by determining whether to adopt the L0 direction or the L1 direction as the reference direction depending on the prediction direction of a combined motion information candidate contained in the combined motion information candidate list, if only one bidirectional combined motion information candidate is valid, the validity of the bidirectional combined motion information candidate is increased and selectivity of the bidirectional combined motion information candidate is increased so that the encoding efficiency can be improved.

A bitstream of moving pictures output from a moving picture encoding device according to the first to sixth embodiments described above has a specific data format so as to be decodable in accordance with the encoding method used in the first to sixth embodiments. A moving picture decoding device corresponding to the moving picture encoding device can decode a bitstream in the specific data format.

More specifically, the merge index showing a bidirectional combined motion information candidate and a candidate number management table are encoded in a bitstream. A candidate number management table may not be encoded in a bitstream by encoding the merge index showing a bidirectional combined motion information candidate and sharing the candidate number management table between the moving picture encoding device and the moving picture decoding device.

When a wire or wireless network is used to exchange a bitstream between the moving picture encoding device and the moving picture decoding device, the bitstream may be transmitted after being converted into a data format suitable for the transmission form of a communication path. In such a case, a moving picture transmission device that transmits a bitstream output by the moving picture encoding device after the bitstream being converted into coding data in a data format suitable for the transmission form of a communication path to a network and a moving picture reception device that restores a bitstream after coding data being received from the network and supplies the bitstream to the moving picture decoding device.

The moving picture transmission device includes a memory that buffers a bitstream output by the moving picture encoding device, a packet processing unit that packetizes a bitstream, and a transmission unit that transmits packetized coding data via a network. The moving picture reception device includes a reception unit that receives packetized coding data via a network, a memory that buffers the received coding data, and a packet processing unit that that generates a bitstream by performing a packet processing of coding data and provides the bitstream to the moving picture decoding device.

The above processing of encoding and decoding can naturally be realized not only as transmission, accumulation, and reception devices using hardware, but also by firmware stored in ROM (TRead Only Memory) or flash memory or software of a computer or the like. The firmware program or software program can be provided by recording in a computer readable recording medium, from a server through a wire or wireless network, or as data broadcasting of terrestrial or satellite digital broadcasting.

In the foregoing, the present invention has been described based on its embodiments. Those skilled in the art understand that such embodiments are illustrative and combinations of each element and each process thereof can be modified and such modifications are also included in the scope of the present invention.

Subsequently, the operation of constructing a temporal combined motion information candidate list has been described using the flow chart in FIG. 26. The flow chart includes processing to calculate a motion vector of a temporal combined motion information candidate (S164). For the temporal combined motion information candidate, bidirectional motion information is calculated in reference to a reference picture ColRefPic and a motion vector mvCol in the prediction direction valid in motion information of the candidate block. If the prediction direction of the candidate block is unidirectional (the L0 direction of the L1 direction), a reference picture and a motion vector in the prediction direction are selected as a reference. If the prediction direction of the candidate block is bidirectional, a reference picture and a motion vector in one of the L0 direction and the L1 direction are selected as a reference. After the reference picture and the motion vector to be a reference for generating bidirectional motion information are selected, a motion vector of the temporal combined motion information candidate is calculated.

A technique of calculating motion vectors mvL0t, mvL1t of temporal combined motion information candidates from the motion vector ColMv and the reference picture ColRefPic as a reference for generating bidirectional motion information will be described using FIG. 67.

If the distance between pictures ColPic and ColRefPic is ColDist, the distance between the reference picture ColL0Pic in the L0 direction of a temporal combined motion information candidate and a processing target picture CurPic is CurL0Dist, and the distance between the reference picture ColL0Pic in the L1 direction of the temporal combined motion information candidate and the processing target picture CurPic is CurL1Dist, the motion vector in Formula 1 below obtained by scaling ColMv in the distance ratio of ColDist to CurL0Dist, CurL0Dist is set as the motion vector of the temporal combined motion information candidate. The distance between pictures is calculated using POC and has a positive or negative sign.

$$mvL0t = mvCol \times CurrL0Dist/ColDist$$

$$mvL1t = mvCol \times CurrL1Dist/ColDist \quad \text{(Formula 1)}$$

Figure 67:
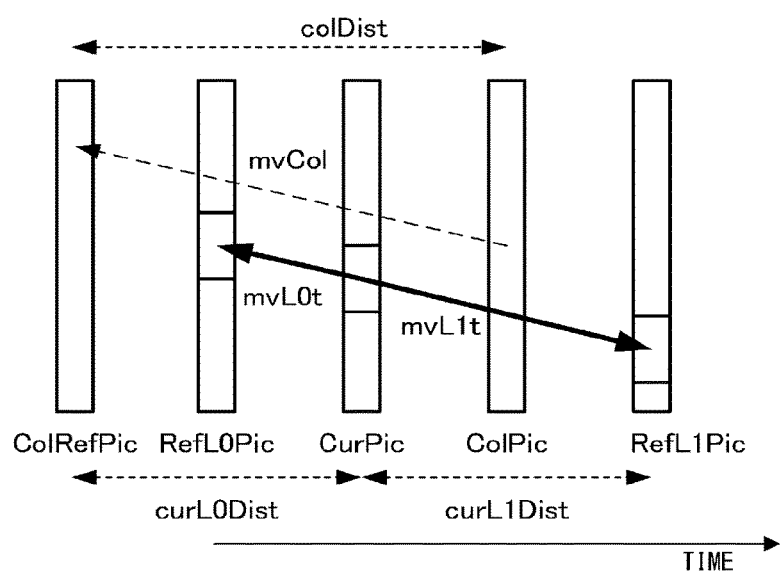
FIG. 67 is a flowchart illustrating a calculation technique of motion vectors mvL0t, mvL1t of temporal combined motion information candidates.

ColPic, ColRefPic, ColL0Pic, and ColL0Pic in FIG. 67 are only an example and other relationships may also be adopted.

[Item 1]

A picture encoding device with a motion compensation prediction comprising:

a candidate list construction unit configured to select a plurality of blocks each having one or two pieces of motion information containing at least information about a motion vector and information about a reference picture from a plurality of neighboring encoded blocks of an encoding target block and to construct a candidate list containing candidates of the motion information used for the motion compensation prediction from the motion information of the selected blocks;

a first motion information deriving unit configured to derive the motion information of a first prediction list from a first candidate contained in the candidates;

a second motion information deriving unit configured to derive the motion information of a second prediction list from a second candidate contained in the candidates; and a selected candidate generator configured to generate a new candidate of the motion information by combining the motion information of the first prediction list derived by the first motion information deriving unit and the motion information of the second prediction list derived by the second motion information deriving unit.

[Item 2]

The picture encoding device according to item 1, wherein when a number of the candidates does not reach a set maximum number, the candidate list construction unit constructs a candidate list including a new candidate generated by the selected candidate generator.

[Item 3]

The picture encoding device according to item 2, wherein the candidate list construction unit constructs the candidate list including at least the one candidate generated by the selected candidate generator such that the number of the candidates does not exceed the maximum number.

[Item 4]

The picture encoding device according to any of items 1 to 3, further including:

a bitstream generator configured to encode candidate identification information to identify the candidate of the motion information used for the motion compensation prediction in the candidate list.

[Item 5]

The picture encoding device according to item 4, wherein the candidate list construction unit assigns the candidate identification information larger than that of the candidates to the new candidate generated by the selected candidate generator.

[Item 6]

The picture encoding device according to any of items 1 to 5, wherein the first prediction list and the second prediction list are different prediction lists.

[Item 7]

The picture encoding device according to any of items 1 to 6, wherein the candidate list construction unit includes the motion information derived from the motion information of the block of a picture temporally different from the picture including the encoding target block in the candidate list.

[Item 8]

The picture encoding device according to any of items 1 to 7, wherein the first motion information deriving unit searches the candidates according to a first priority order for the candidate that becomes valid to set the candidate as the first candidate, and the second motion information deriving unit searches the candidates according to a second priority order for the candidate that becomes valid to set the candidate as the second candidate.

[Item 9]

The picture encoding device according to any of items 1 to 7, wherein the first motion information deriving unit sets a preset candidate among the candidates as the first candidate, and the second motion information deriving unit sets another preset candidate among the candidates as the second candidate.

[Item 10]

The picture encoding device according to any of items 1 to 9, wherein when both of the motion information of the first prediction list and the motion information of the second prediction list derived by the first motion information deriving unit and the second motion information deriving unit respectively are valid, the selected candidate generator generates the new candidate.

[Item 11]

The picture encoding device according to any of items 1 to 10, wherein the new candidate holds two pieces of the motion information.

[Item 12]

The picture encoding device according to any of items 1 to 9, wherein the new candidate holds one piece of the motion information.

[Item 13]

A picture encoding method with a motion compensation prediction comprising:

selecting a plurality of blocks each having one or two pieces of motion information containing at least information about a motion vector and information about a reference picture from a plurality of neighboring encoded blocks of an encoding target block and constructing a candidate list containing candidates of the motion information used for the motion compensation prediction from the motion information of the selected blocks;

deriving the motion information of a first prediction list from a first candidate contained in the candidates;

deriving the motion information of a second prediction list from a second candidate contained in the candidates; and generating a new candidate of the motion information by combining the motion information of the first prediction list and the motion information of the second prediction list.

[Item 14]

A picture encoding program with a motion compensation prediction, the program causing a computer to execute:

selecting a plurality of blocks each having one or two pieces of motion information containing at least information about a motion vector and information about a reference picture from a plurality of neighboring encoded blocks of an encoding target block and constructing a candidate list containing candidates of the motion information used for the motion compensation prediction from the motion information of the selected blocks;

deriving the motion information of a first prediction list from a first candidate contained in the candidates;

deriving the motion information of a second prediction list from a second candidate contained in the candidates; and generating a new candidate of the motion information by combining the motion information of the first prediction list and the motion information of the second prediction list.

[Item 15]

A picture decoding device with a motion compensation prediction comprising:

a candidate list construction unit configured to select a plurality of blocks each having one or two pieces of motion information containing at least information about a motion vector and information about a reference picture from a plurality of neighboring decoded blocks of a decoding target block and to construct a candidate list containing candidates of the motion information used for the motion compensation prediction from the motion information of the selected blocks;

a first motion information deriving unit configured to derive the motion information of a first prediction list from the first candidate contained in the candidates;

a second motion information deriving unit configured to derive the motion information of a second prediction list from a second candidate contained in the candidates; and a selected candidate generator configured to generate a new candidate of the motion information by combining the motion information of the first prediction list derived by the first motion information deriving unit and the motion information of the second prediction list derived by the second motion information deriving unit.

[Item 16]

The picture decoding device according to item 15, wherein when a number of the candidates does not reach a set maximum number, the candidate list construction unit constructs a candidate list including a new candidate generated by the selected candidate generator.

[Item 17]

The picture decoding device according to item 16, wherein the candidate list construction unit constructs the candidate list including at least the one candidate generated by the selected candidate generator such that the number of the candidates does not exceed the maximum number.

[Item 18]

The picture decoding device according to any of items 15 to 17, further comprising:

a bitstream analysis unit configured to decode candidate identification information to identify the candidate of the motion information used for the motion compensation prediction in the candidate list, and a selection unit configured to select one candidate from the candidates contained in the candidate list by using the decoded candidate identification information.

[Item 19]

The picture decoding device according to item 18, wherein the candidate list construction unit assigns the candidate identification information larger than that of the candidates to the new candidate generated by the selected candidate generator.

[Item 20]

The picture decoding device according to any of items 15 to 19, wherein the first prediction list and the second prediction list are different prediction lists.

[Item 21]

The picture decoding device according to any of items 15 to 20, wherein the candidate list construction unit includes the motion information derived from the motion information of the block of a picture temporally different from the picture including the decoding target block in the candidate list.

[Item 22]

The picture decoding device according to any of items 15 to 21, wherein the first motion information deriving unit searches the candidates according to a first priority order for the candidate that becomes valid to set the candidate as the first candidate, and the second motion information deriving unit searches the candidates according to a second priority order for the candidate that becomes valid to set the candidate as the second candidate.

[Item 23]

The picture decoding device according to any of items 15 to 21, wherein the first motion information deriving unit sets a preset candidate among the candidates as the first candidate, and the second motion information deriving unit sets another preset candidate among the candidates as the second candidate.

[Item 24]

The picture encoding device according to any of items 15 to 23, wherein when both of the motion information of the first prediction list and the motion information of the second prediction list derived by the first motion information deriving unit and the second motion information deriving unit respectively are valid, the selected candidate generator generates the new candidate.

[Item 25]
The picture decoding device according to any of items 15 to 24, wherein
the new candidate holds two pieces of the motion information.

[Item 26]
The picture decoding device according to any of items 15 to 23, wherein
the new candidate holds one piece of the motion information.

[Item 27]
A picture decoding method with a motion compensation prediction comprising:
selecting a plurality of blocks each having one or two pieces of motion information containing at least information about a motion vector and information about a reference picture from a plurality of neighboring decoded blocks of a decoding target block and constructing a candidate list containing candidates of the motion information used for the motion compensation prediction from the motion information of the selected blocks;
deriving the motion information of a first prediction list from a first candidate contained in the candidates;
deriving the motion information of a second prediction list from a second candidate contained in the candidates; and
generating a new candidate of the motion information by combining the motion information of the first prediction list and the motion information of the second prediction list.

[Item 28]
A picture decoding program with a motion compensation prediction,
the program causing a computer to execute:
selecting a plurality of blocks each having one or two pieces of motion information containing at least information about a motion vector and information about a reference picture from a plurality of neighboring decoded blocks of a decoding target block and constructing a candidate list containing candidates of the motion information used for the motion compensation prediction from the motion information of the selected blocks;
deriving the motion information of a first prediction list from a first candidate contained in the candidates;
deriving the motion information of a second prediction list from a second candidate contained in the candidates; and
generating a new candidate of the motion information by combining the motion information of the first prediction list and the motion information of the second prediction list.

What is claimed is:

1. A picture encoding device with a motion compensation prediction comprising:
a candidate list construction unit configured to:
select a plurality of blocks each having one or two pieces of motion information containing at least:
information about a motion vector, and
information about a reference picture from a plurality of neighboring encoded blocks of a encoding target block, and
construct a candidate list containing a plurality of candidates of the motion information used for the motion compensation prediction from the motion information of the selected plurality of blocks;

a first motion information deriving unit configured to derive, from a first candidate contained in the plurality of candidates, first motion information in a first direction;
a second motion information deriving unit configured to derive, from a second candidate different from the first candidate contained in the plurality of candidates, second motion information in a second direction different from the first direction;
a selected candidate generator configured to generate a first new candidate of the motion information by combining the first motion information and the second motion information;
a selection unit configured to select one candidate from the plurality of candidates contained in the candidate list; and
a bitstream generator configured to encode candidate identification information to identify a selected candidate in the candidate list, wherein:
the second motion information deriving unit adds the first new candidate of the motion information in which a first prediction direction is bidirectional to the candidate list when both the first motion information and the second motion information are valid, and does not add the first new candidate of the motion information in which the first prediction direction is bidirectional and unidirectional to the candidate list when at least one of the first motion information and the second motion information is invalid,
the first motion information deriving unit further derives, from the second candidate, third motion information in the first direction,
the second motion information deriving unit further derives, from the first candidate, fourth motion information in the second direction,
the selected candidate generator generates a second new candidate of the motion information by combining the third motion information and the fourth motion information, and
the second motion information deriving unit adds the second new candidate of the motion information in which a second prediction direction is bidirectional to the candidate list when both the third motion information and the fourth motion information are valid, and does not add the first new candidate of the motion information in which the second prediction direction is bidirectional and unidirectional to the candidate list when at least one of the third motion information and the fourth motion information is invalid.

2. A picture encoding method with a motion compensation prediction comprising:
selecting a plurality of blocks each having one or two pieces of motion information containing at least:
information about a motion vector, and
information about a reference picture from a plurality of neighboring encoded blocks of an encoding target block;
constructing a candidate list containing a plurality of candidates of the motion information used for the motion compensation prediction from the motion information of the selected plurality of blocks;
deriving, from a first candidate contained in the plurality of candidates, first motion information in a first direction;
deriving, from a second candidate different from the first candidate contained in the plurality of candidates, second motion information in a second direction different from the first direction;
generating a first new candidate of the motion information by combining the first motion information and the second motion information;
selecting one candidate from the plurality of candidates contained in the candidate list;
encoding candidate identification information to identify a selected candidate in the candidate list;
adding the first new candidate of the motion information in which a first prediction direction is bidirectional to the candidate list when both the first motion information and the second motion information are valid, and does not add the first new candidate of the motion information in which the first prediction direction is bidirectional and unidirectional to the candidate list when at least one of the first motion information and the second motion information is invalid;
deriving, from the second candidate, third motion information in the first direction;
deriving, from the first candidate, fourth motion information in the second direction;
generating a second new candidate of the motion information by combining the third motion information and the fourth motion information, and
adding the second new candidate of the motion information in which a second prediction direction is bidirectional to the candidate list when both the third motion information and the fourth motion information are valid, and does not add the first new candidate of the motion information in which the second prediction direction is bidirectional and unidirectional to the candidate list when at least one of the third motion information and the fourth motion information is invalid.

3. A non-transitory computer-readable recording medium storing a picture encoding program with a motion compensation prediction that, in response to execution, causes a computer to perform operations comprising:
selecting a plurality of blocks each having one or two pieces of motion information containing at least:
information about a motion vector, and
information about a reference picture from a plurality of neighboring encoded blocks of an encoding target block;
constructing a candidate list containing a plurality of candidates of the motion information used for the motion compensation prediction from the motion information of the selected plurality of blocks;
deriving, from a first candidate contained in the plurality of candidates, first motion information in a first direction;
deriving, from a second candidate different from the first candidate contained in the plurality of candidates, second motion information in a second direction different from the first direction;
generating a first new candidate of the motion information by combining the first motion information and the second motion information;
selecting one candidate from the plurality of candidates contained in the candidate list;
encoding candidate identification information to identify a selected candidate in the candidate list;
adding the first new candidate of the motion information in which a first prediction direction is bidirectional to the candidate list when both the first motion information and the second motion information are valid, and does not add the first new candidate of the motion information in which the first prediction direction is bidirectional and unidirectional to the candidate list when at least one of the first motion information and the second motion information is invalid;
deriving, from the second candidate, third motion information in the first direction;
deriving, from the first candidate, fourth motion information in the second direction;
generating a second new candidate of the motion information by combining the third motion information and the fourth motion information, and
adding the second new candidate of the motion information in which a second prediction direction is bidirectional to the candidate list when both the third motion information and the fourth motion information are valid, and does not add the first new candidate of the motion information in which the second prediction direction is bidirectional and unidirectional to the candidate list when at least one of the third motion information and the fourth motion information is invalid.

4. A picture decoding device with a motion compensation prediction comprising:
a candidate list construction unit configured to:
select a plurality of blocks each having one or two pieces of motion information containing at least:
information about a motion vector, and
information about a reference picture from a plurality of neighboring decoded blocks of a decoding target block, and
construct a candidate list containing a plurality of candidates of the motion information used for the motion compensation prediction from the motion information of the selected plurality of blocks;
a first motion information deriving unit configured to derive, from a first candidate contained in the plurality of candidates, first motion information in a first direction;
a second motion information deriving unit configured to derive, from a second candidate different from the first candidate contained in the plurality of candidates, second motion information in a second direction different from the first direction; and
a selected candidate generator configured to generate a first new candidate of the motion information by combining the first motion information and the second motion information;
a bitstream analysis unit configured to decode candidate identification information to identify a candidate of the motion information used for the motion compensation prediction in the candidate list; and
a selection unit configured to select one candidate from the plurality of candidates contained in the candidate list by using the decoded candidate identification information, wherein:
the second motion information deriving unit adds the first new candidate of the motion information in which a first prediction direction is bidirectional to the candidate list when both the first motion information and the second motion information are valid, and does not add the first new candidate of the motion information in which the first prediction direction is bidirectional and unidirectional to the candidate list when at least one of the first motion information and the second motion information is invalid,
the first motion information deriving unit further derives, from the second candidate, third motion information in the first direction, the second motion information deriving unit further derives, from the first candidate, fourth motion information in the second direction, the selected candidate generator generates a second new candidate of the motion information by combining the third motion information and the fourth motion information, and the second motion information deriving unit adds the second new candidate of the motion information in which a second prediction direction is bidirectional to the candidate list when both the third motion information and the fourth motion information are valid, and does not add the first new candidate of the motion information in which the second prediction direction is bidirectional and unidirectional to the candidate list when at least one of the third motion information and the fourth motion information is invalid.

5. A picture decoding method with a motion compensation prediction comprising:
selecting a plurality of blocks each having one or two pieces of motion information containing at least:
information about a motion vector, and
information about a reference picture from a plurality of neighboring decoded blocks of a decoding target block;
constructing a candidate list containing a plurality of candidates of the motion information used for the motion compensation prediction from the motion information of the selected plurality of blocks;
deriving, from a first candidate contained in the plurality of candidates, first motion information in a first direction;
deriving, from a second candidate different from the first candidate contained in the plurality of candidates, second motion information in a second direction different from the first direction;
generating a first new candidate of the motion information by combining the first motion information and the second motion information;
adding the first new candidate of the motion information in which a first prediction direction is bidirectional to the candidate list when both the first motion information and the second motion information are valid, and does not add the first new candidate of the motion information in which the first prediction direction is bidirectional and unidirectional to the candidate list when at least one of the first motion information and the second motion information is invalid;
deriving, from the second candidate, third motion information in the first direction;
deriving, from the first candidate, fourth motion information in the second direction;
generating a second new candidate of the motion information by combining the third motion information and the fourth motion information;
adding the second new candidate of the motion information in which a second prediction direction is bidirectional to the candidate list when both the third motion information and the fourth motion information are valid, and does not add the first new candidate of the motion information in which the second prediction direction is bidirectional and unidirectional to the candidate list when at least one of the third motion information and the fourth motion information is invalid;

analyzing a bitstream, the analyzing the bitstream including decoding candidate identification information to identify a candidate of the motion information used for the motion compensation prediction in the candidate list; and selecting one candidate from the plurality of candidates contained in the candidate list by using the decoded candidate identification information.

6. A non-transitory computer-readable recording medium storing a picture decoding program with a motion compensation prediction that, in response to execution, causes a computer to perform operations comprising:
selecting a plurality of blocks each having one or two pieces of motion information containing at least:
information about a motion vector, and
information about a reference picture from a plurality of neighboring decoded blocks of a decoding target block;
constructing a candidate list containing a plurality of candidates of the motion information used for the motion compensation prediction from the motion information of the selected plurality of blocks;
deriving from a first candidate contained in the plurality of candidates, first motion information in a first direction;
deriving from a second candidate, different from the first candidate, contained in the plurality of candidates, second motion information in a second direction different from the first direction; a
generating a first new candidate of the motion information by combining the first motion information and the second motion information;
adding the first new candidate of the motion information in which a first prediction direction is bidirectional to the candidate list when both the first motion information and the second motion information are valid, and does not add the first new candidate of the motion information in which the first prediction direction is bidirectional and unidirectional to the candidate list when at least one of the first motion information and the second motion information is invalid;
deriving, from the second candidate, third motion information in the first direction,
deriving, from the first candidate, fourth motion information in the second direction,
generating a second new candidate of the motion information by combining the third motion information and the fourth motion information,
adding the second new candidate of the motion information in which a second prediction direction is bidirectional to the candidate list when both the third motion information and the fourth motion information are valid, and does not add the first new candidate of the motion information in which the second prediction direction is bidirectional and unidirectional to the candidate list when at least one of the third motion information and the fourth motion information is invalid;
analyzing a bitstream, the analyzing the bitstream including decoding candidate identification information to identify a candidate of the motion information used for the motion compensation prediction in the candidate list; and
selecting one candidate from candidates contained in the candidate list by using the decoded candidate identification information.

* * * * *